US012599848B2

(12) United States Patent
Harrison et al.

(10) Patent No.: US 12,599,848 B2
(45) Date of Patent: Apr. 14, 2026

(54) SYSTEMS, ANALYZERS, CONTROLLERS, AND ASSOCIATED METHODS TO ENHANCE FLUID SEPARATION FOR DISTILLATION OPERATIONS

(71) Applicant: MARATHON PETROLEUM COMPANY LP, Findlay, OH (US)

(72) Inventors: Chris A. Harrison, Findlay, OH (US); Vidyashankar Kuppuraj, Findlay, OH (US); Joseph John Boyce, Findlay, OH (US); Jeffrey A Sexton, Findlay, OH (US); Scott Christopher Flanagan, Findlay, OH (US); Roy Roger Bledsoe, Jr., Findlay, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 0 days.

(21) Appl. No.: 18/948,759

(22) Filed: Nov. 15, 2024

(65) Prior Publication Data

US 2025/0367572 A1 Dec. 4, 2025

Related U.S. Application Data

(60) Provisional application No. 63/660,196, filed on Jun. 14, 2024, provisional application No. 63/658,825, (Continued)

(51) Int. Cl.
B01D 3/42 (2006.01)
B01D 3/14 (2006.01)
(Continued)

(52) U.S. Cl.
CPC ........... B01D 3/4294 (2013.01); B01D 3/143 (2013.01); C10L 1/04 (2013.01); G05B 13/0265 (2013.01);
(Continued)

(58) Field of Classification Search
CPC ........ B01D 3/4294; B01D 3/143; B01D 3/00; G01N 30/02; G01N 30/86; G06N 20/00
See application file for complete search history.

(56) References Cited

U.S. PATENT DOCUMENTS

| | | |
|---|---|---|
| 981,434 A | 1/1911 | Lander |
| 1,526,301 A | 2/1925 | Stevens |
| | (Continued) | |

FOREIGN PATENT DOCUMENTS

| | | |
|---|---|---|
| AT | 11772 U1 | 4/2011 |
| BR | PI0701518 | 11/2008 |
| | (Continued) | |

OTHER PUBLICATIONS

Bollas et al., "Modeling Small-Diameter FCC Riser Reactors. A Hydrodynamic and Kinetic Approach", Industrial and Engineering Chemistry Research, 41(22), 5410-5419, 2002.

(Continued)

*Primary Examiner* — Sharon Pregler

(74) *Attorney, Agent, or Firm* — Ray Quinney & Nebeker; Paul N. Taylor

(57) ABSTRACT

Embodiments of systems and methods for enhancing control of a distillation operation are disclosed. The method includes obtaining data for a plurality of ongoing and continuous distillation operations from one or more of (a) a plurality of sensors or (b) a plurality of analyzers configured to analyze fluid output via the distillation operations. The method may include determining one or more parameters for each one or more of one or more distillation columns or distillation control devices based on application of the data to a machine learning model. The method may include in response to determination of the one or more parameters, operating each of the one or more distillation columns or distillation control (Continued)

devices based on the one or more parameters, thereby to enhance operation of the one or more distillation column.

30 Claims, 15 Drawing Sheets

Related U.S. Application Data filed on Jun. 11, 2024, provisional application No. 63/655,589, filed on Jun. 3, 2024.

(51) Int. Cl.
  *C10L 1/04* (2006.01)
  *G05B 13/02* (2006.01)
(52) U.S. Cl.
  CPC ..... *C10L 2290/543* (2013.01); *C10L 2290/58* (2013.01)

(56) References Cited

U.S. PATENT DOCUMENTS

| | | | |
|---|---|---|---|
| 1,572,922 A | 2/1926 | Govers et al. |
| 1,867,143 A | 7/1932 | Fohl |
| 2,401,570 A | 6/1946 | Koehler |
| 2,498,442 A | 2/1950 | Morey |
| 2,516,097 A | 7/1950 | Woodham et al. |
| 2,664,744 A | 1/1954 | Bilhartz et al. |
| 2,686,728 A | 8/1954 | Wallace |
| 2,691,621 A | 10/1954 | Gagle |
| 2,691,773 A | 10/1954 | Lichtenberger |
| 2,731,282 A | 1/1956 | Mcmanus et al. |
| 2,740,616 A | 4/1956 | Walden |
| 2,792,908 A | 5/1957 | Glanzer |
| 2,804,165 A | 8/1957 | Blomgren |
| 2,867,913 A | 1/1959 | Faucher |
| 2,888,239 A | 5/1959 | Slemmons |
| 2,909,482 A | 10/1959 | Williams et al. |
| 2,925,144 A | 2/1960 | Kroll |
| 2,963,423 A | 12/1960 | Birchfield |
| 3,063,681 A | 11/1962 | Duguid |
| 3,070,990 A | 1/1963 | Stanley |
| 3,109,481 A | 11/1963 | Yahnke |
| 3,167,305 A | 1/1965 | Backx et al. |
| 3,188,184 A | 6/1965 | Rice et al. |
| 3,199,876 A | 8/1965 | Magos et al. |
| 3,203,460 A | 8/1965 | Kuhne |
| 3,279,441 A | 10/1966 | Lippert et al. |
| 3,307,574 A | 3/1967 | Anderson |
| 3,364,134 A | 1/1968 | Hamblin |
| 3,400,049 A | 9/1968 | Wolfe |
| 3,545,411 A | 12/1970 | Vollradt |
| 3,660,057 A | 5/1972 | Ilnyckyj |
| 3,719,027 A | 3/1973 | Salka |
| 3,720,601 A | 3/1973 | Coonradt |
| 3,771,638 A | 11/1973 | Schneider et al. |
| 3,775,294 A | 11/1973 | Peterson |
| 3,795,607 A | 3/1974 | Adams |
| 3,838,036 A | 9/1974 | Stine et al. |
| 3,839,484 A | 10/1974 | Zimmerman, Jr. |
| 3,840,209 A | 10/1974 | James |
| 3,841,144 A | 10/1974 | Baldwin |
| 3,854,843 A | 12/1974 | Penny |
| 3,874,399 A | 4/1975 | Ishihara |
| 3,901,951 A | 8/1975 | Nishizaki |
| 3,906,780 A | 9/1975 | Baldwin |
| 3,912,307 A | 10/1975 | Totman |
| 3,928,172 A | 12/1975 | Davis et al. |
| 3,937,660 A | 2/1976 | Yates et al. |
| 4,006,075 A | 2/1977 | Luckenbach |
| 4,017,214 A | 4/1977 | Smith |
| 4,066,425 A | 1/1978 | Nett |
| 4,085,078 A | 4/1978 | McDonald |
| 4,144,759 A | 3/1979 | Slowik |
| 4,149,756 A | 4/1979 | Tackett |

| | | | |
|---|---|---|---|
| 4,151,003 A | 4/1979 | Smith et al. |
| 4,167,492 A | 9/1979 | Varady |
| 4,176,052 A | 11/1979 | Bruce et al. |
| 4,217,116 A | 8/1980 | Seever |
| 4,260,068 A | 4/1981 | McCarthy et al. |
| 4,299,687 A | 11/1981 | Myers et al. |
| 4,302,324 A | 11/1981 | Chen et al. |
| 4,308,968 A | 1/1982 | Thiltgen et al. |
| 4,312,645 A | 1/1982 | Mavros |
| 4,328,947 A | 5/1982 | Reimpell et al. |
| 4,332,671 A | 6/1982 | Boyer |
| 4,340,204 A | 7/1982 | Heard |
| 4,353,812 A | 10/1982 | Lomas et al. |
| 4,357,603 A | 11/1982 | Roach et al. |
| 4,392,870 A | 7/1983 | Chieffo et al. |
| 4,404,095 A | 9/1983 | Haddad et al. |
| 4,422,925 A | 12/1983 | Williams et al. |
| 4,434,044 A | 2/1984 | Busch et al. |
| 4,439,533 A | 3/1984 | Lomas et al. |
| 4,468,975 A | 9/1984 | Sayles et al. |
| 4,482,451 A | 11/1984 | Kemp |
| 4,495,063 A | 1/1985 | Walters et al. |
| 4,539,012 A | 9/1985 | Ohzeki et al. |
| 4,554,313 A | 11/1985 | Hagenbach et al. |
| 4,554,799 A | 11/1985 | Pallanch |
| 4,570,942 A | 2/1986 | Diehl et al. |
| 4,583,859 A | 4/1986 | Hall, II |
| 4,601,303 A | 7/1986 | Jensen |
| 4,615,792 A | 10/1986 | Greenwood |
| 4,621,062 A | 11/1986 | Stewart et al. |
| 4,622,210 A | 11/1986 | Hirschberg et al. |
| 4,624,771 A | 11/1986 | Lane et al. |
| 4,647,313 A | 3/1987 | Clementoni |
| 4,654,748 A | 3/1987 | Rees |
| 4,661,241 A | 4/1987 | Dabkowski et al. |
| 4,673,490 A | 6/1987 | Subramanian et al. |
| 4,674,337 A | 6/1987 | Jonas |
| 4,684,759 A | 8/1987 | Lam |
| 4,686,027 A | 8/1987 | Bonilla et al. |
| 4,728,348 A | 3/1988 | Nelson et al. |
| 4,733,888 A | 3/1988 | Toelke |
| 4,741,819 A | 5/1988 | Robinson et al. |
| 4,764,347 A | 8/1988 | Milligan |
| 4,765,631 A | 8/1988 | Kohnen et al. |
| 4,771,176 A | 9/1988 | Scheifer et al. |
| 4,798,463 A | 1/1989 | Koshi |
| 4,816,137 A | 3/1989 | Swint et al. |
| 4,820,404 A | 4/1989 | Owen |
| 4,824,016 A | 4/1989 | Cody et al. |
| 4,844,133 A | 7/1989 | von Meyerinck et al. |
| 4,844,927 A | 7/1989 | Morris et al. |
| 4,849,182 A | 7/1989 | Luetzelschwab |
| 4,854,855 A | 8/1989 | Rajewski |
| 4,875,994 A | 10/1989 | Haddad et al. |
| 4,877,513 A | 10/1989 | Haire et al. |
| 4,901,751 A | 2/1990 | Story et al. |
| 4,914,249 A | 4/1990 | Benedict |
| 4,916,938 A | 4/1990 | Aikin et al. |
| 4,917,790 A | 4/1990 | Owen |
| 4,923,834 A | 5/1990 | Lomas |
| 4,928,760 A | 5/1990 | Freitas |
| 4,940,900 A | 7/1990 | Lambert |
| 4,957,511 A | 9/1990 | Ljusberg-Wahren |
| 4,960,503 A | 10/1990 | Haun et al. |
| 4,963,745 A | 10/1990 | Maggard |
| 4,972,867 A | 11/1990 | Ruesch |
| 5,000,841 A | 3/1991 | Owen |
| 5,002,459 A | 3/1991 | Swearingen et al. |
| 5,008,653 A | 4/1991 | Kidd et al. |
| 5,009,768 A | 4/1991 | Galiasso et al. |
| 5,013,537 A | 5/1991 | Patarin et al. |
| 5,022,266 A | 6/1991 | Cody et al. |
| 5,032,154 A | 7/1991 | Wright |
| 5,034,115 A | 7/1991 | Avidan |
| 5,045,177 A | 9/1991 | Cooper et al. |
| 5,050,603 A | 9/1991 | Stokes et al. |
| 5,053,371 A | 10/1991 | Williamson |
| 5,056,758 A | 10/1991 | Bramblet |
| 5,059,305 A | 10/1991 | Sapre |

(56) References Cited

U.S. PATENT DOCUMENTS

| | | |
|---|---|---|
| 5,061,467 A | 10/1991 | Johnson et al. |
| 5,066,049 A | 11/1991 | Staples |
| 5,076,910 A | 12/1991 | Rush |
| 5,082,985 A | 1/1992 | Crouzet et al. |
| 5,096,566 A | 3/1992 | Dawson et al. |
| 5,097,677 A | 3/1992 | Holtzapple |
| 5,111,882 A | 5/1992 | Tang et al. |
| 5,112,357 A | 5/1992 | Bjerklund |
| 5,114,562 A | 5/1992 | Haun et al. |
| 5,115,686 A | 5/1992 | Walker et al. |
| 5,120,517 A | 6/1992 | Elshout |
| 5,121,337 A | 6/1992 | Brown |
| 5,128,109 A | 7/1992 | Owen |
| 5,128,292 A | 7/1992 | Lomas |
| 5,129,624 A | 7/1992 | Icenhower et al. |
| 5,138,891 A | 8/1992 | Johnson |
| 5,139,649 A | 8/1992 | Owen et al. |
| 5,145,785 A | 9/1992 | Maggard et al. |
| 5,149,261 A | 9/1992 | Suwa et al. |
| 5,154,558 A | 10/1992 | McCallion |
| 5,160,426 A | 11/1992 | Avidan |
| 5,170,911 A | 12/1992 | Della Riva |
| 5,174,250 A | 12/1992 | Lane |
| 5,174,345 A | 12/1992 | Kesterman et al. |
| 5,178,363 A | 1/1993 | Icenhower et al. |
| 5,196,110 A | 3/1993 | Swart et al. |
| 5,201,850 A | 4/1993 | Lenhardt et al. |
| 5,203,370 A | 4/1993 | Block et al. |
| 5,211,838 A | 5/1993 | Staubs et al. |
| 5,212,129 A | 5/1993 | Lomas |
| 5,221,463 A | 6/1993 | Kamienski et al. |
| 5,223,714 A | 6/1993 | Maggard |
| 5,225,679 A | 7/1993 | Clark et al. |
| 5,230,498 A | 7/1993 | Wood et al. |
| 5,235,999 A | 8/1993 | Lindquist et al. |
| 5,236,765 A | 8/1993 | Cordia et al. |
| 5,243,546 A | 9/1993 | Maggard |
| 5,246,860 A | 9/1993 | Hutchins et al. |
| 5,246,868 A | 9/1993 | Busch et al. |
| 5,248,408 A | 9/1993 | Owen |
| 5,250,807 A | 10/1993 | Sontvedt |
| 5,257,530 A | 11/1993 | Beattie et al. |
| 5,258,115 A | 11/1993 | Heck et al. |
| 5,258,117 A | 11/1993 | Kolstad et al. |
| 5,262,645 A | 11/1993 | Lambert et al. |
| 5,263,682 A | 11/1993 | Covert et al. |
| 5,301,560 A | 4/1994 | Anderson et al. |
| 5,302,294 A | 4/1994 | Schubert |
| 5,316,448 A | 5/1994 | Ziegler et al. |
| 5,320,671 A | 6/1994 | Schilling |
| 5,326,074 A | 7/1994 | Spock et al. |
| 5,328,505 A | 7/1994 | Schilling |
| 5,328,591 A | 7/1994 | Raterman |
| 5,332,492 A | 7/1994 | Maurer et al. |
| 5,338,439 A | 8/1994 | Owen et al. |
| 5,348,645 A | 9/1994 | Maggard et al. |
| 5,349,188 A | 9/1994 | Maggard |
| 5,349,189 A | 9/1994 | Maggard |
| 5,354,451 A | 10/1994 | Goldstein et al. |
| 5,354,453 A | 10/1994 | Bhatia |
| 5,361,643 A | 11/1994 | Boyd et al. |
| 5,362,965 A | 11/1994 | Maggard |
| 5,370,146 A | 12/1994 | King et al. |
| 5,370,790 A | 12/1994 | Maggard et al. |
| 5,372,270 A | 12/1994 | Rosenkrantz |
| 5,372,352 A | 12/1994 | Smith et al. |
| 5,381,002 A | 1/1995 | Morrow et al. |
| 5,388,805 A | 2/1995 | Bathrick et al. |
| 5,389,232 A | 2/1995 | Adewuyi et al. |
| 5,404,015 A | 4/1995 | Chimenti et al. |
| 5,415,025 A | 5/1995 | Bartman et al. |
| 5,416,323 A | 5/1995 | Hoots et al. |
| 5,417,843 A | 5/1995 | Swart et al. |
| 5,417,846 A | 5/1995 | Renard |
| 5,423,446 A | 6/1995 | Johnson |
| 5,431,067 A | 7/1995 | Anderson et al. |
| 5,433,120 A | 7/1995 | Boyd et al. |
| 5,435,436 A | 7/1995 | Manley et al. |
| 5,443,716 A | 8/1995 | Anderson et al. |
| 5,446,681 A | 8/1995 | Gethner et al. |
| 5,452,232 A | 9/1995 | Espinosa et al. |
| RE35,046 E | 10/1995 | Hettinger et al. |
| 5,459,677 A | 10/1995 | Kowalski et al. |
| 5,472,875 A | 12/1995 | Monticello |
| 5,474,607 A | 12/1995 | Holleran |
| 5,475,612 A | 12/1995 | Espinosa et al. |
| 5,476,117 A | 12/1995 | Pakula |
| 5,490,085 A | 2/1996 | Lambert et al. |
| 5,492,617 A | 2/1996 | Trimble et al. |
| 5,494,079 A | 2/1996 | Tiedemann |
| 5,507,326 A | 4/1996 | Cadman et al. |
| 5,510,265 A | 4/1996 | Monticello |
| 5,516,969 A | 5/1996 | Krasznai et al. |
| 5,532,487 A | 7/1996 | Brearley et al. |
| 5,540,893 A | 7/1996 | English |
| 5,549,814 A | 8/1996 | Zinke |
| 5,556,222 A | 9/1996 | Chen |
| 5,559,295 A | 9/1996 | Sheryll |
| 5,560,509 A | 10/1996 | Laverman et al. |
| 5,569,808 A | 10/1996 | Cansell et al. |
| 5,573,032 A | 11/1996 | Lenz et al. |
| 5,584,985 A | 12/1996 | Lomas |
| 5,596,196 A | 1/1997 | Cooper et al. |
| 5,600,134 A | 2/1997 | Ashe et al. |
| 5,647,961 A | 7/1997 | Lofland |
| 5,652,145 A | 7/1997 | Cody et al. |
| 5,675,071 A | 10/1997 | Cody et al. |
| 5,681,749 A | 10/1997 | Ramamoorthy |
| 5,684,580 A | 11/1997 | Cooper et al. |
| 5,699,269 A | 12/1997 | Ashe et al. |
| 5,699,270 A | 12/1997 | Ashe et al. |
| 5,712,481 A | 1/1998 | Welch et al. |
| 5,712,797 A | 1/1998 | Descales et al. |
| 5,713,401 A | 2/1998 | Weeks |
| 5,716,055 A | 2/1998 | Wilkinson et al. |
| 5,717,209 A | 2/1998 | Bigman et al. |
| 5,740,073 A | 4/1998 | Bages et al. |
| 5,744,024 A | 4/1998 | Sullivan, III et al. |
| 5,744,702 A | 4/1998 | Roussis et al. |
| 5,746,906 A | 5/1998 | McHenry et al. |
| 5,751,415 A | 5/1998 | Smith et al. |
| 5,758,514 A | 6/1998 | Genung et al. |
| 5,763,883 A | 6/1998 | Descales et al. |
| 5,800,697 A | 9/1998 | Lengemann |
| 5,817,517 A | 10/1998 | Perry et al. |
| 5,822,058 A | 10/1998 | Adler-Golden et al. |
| 5,834,539 A | 11/1998 | Krivohlavek |
| 5,837,130 A | 11/1998 | Crossland |
| 5,853,455 A | 12/1998 | Gibson |
| 5,856,869 A | 1/1999 | Cooper et al. |
| 5,858,207 A | 1/1999 | Lomas |
| 5,858,210 A | 1/1999 | Richardson |
| 5,858,212 A | 1/1999 | Darcy |
| 5,861,228 A | 1/1999 | Descales et al. |
| 5,862,060 A | 1/1999 | Murray, Jr. |
| 5,865,441 A | 2/1999 | Orlowski |
| 5,883,363 A | 3/1999 | Motoyoshi et al. |
| 5,885,439 A | 3/1999 | Glover |
| 5,892,228 A | 4/1999 | Cooper et al. |
| 5,895,506 A | 4/1999 | Cook et al. |
| 5,916,433 A | 6/1999 | Tejada et al. |
| 5,919,354 A | 7/1999 | Bartek |
| 5,935,415 A | 8/1999 | Haizmann et al. |
| 5,940,176 A | 8/1999 | Knapp |
| 5,972,171 A | 10/1999 | Ross et al. |
| 5,979,491 A | 11/1999 | Gonsior |
| 5,997,723 A | 12/1999 | Wiehe et al. |
| 6,015,440 A | 1/2000 | Noureddini |
| 6,025,305 A | 2/2000 | Aldrich et al. |
| 6,026,841 A | 2/2000 | Kozik |
| 6,040,186 A | 3/2000 | Lewis |
| 6,047,602 A | 4/2000 | Lynnworth |
| 6,056,005 A | 5/2000 | Piotrowski et al. |
| 6,062,274 A | 5/2000 | Pettesch |

(56)            References Cited

U.S. PATENT DOCUMENTS

| | | | |
|---|---|---|---|
| 6,063,263 | A | 5/2000 | Palmas |
| 6,063,265 | A | 5/2000 | Chiyoda et al. |
| 6,070,128 | A | 5/2000 | Descales et al. |
| 6,072,576 | A | 6/2000 | McDonald et al. |
| 6,076,864 | A | 6/2000 | Levivier et al. |
| 6,087,662 | A | 7/2000 | Wilt et al. |
| 6,093,867 | A | 7/2000 | Ladwig et al. |
| 6,099,607 | A | 8/2000 | Haslebacher |
| 6,099,616 | A | 8/2000 | Jenne et al. |
| 6,100,975 | A | 8/2000 | Smith et al. |
| 6,102,655 | A | 8/2000 | Kreitmeier |
| 6,105,441 | A | 8/2000 | Conner et al. |
| 6,107,631 | A | 8/2000 | He |
| 6,117,812 | A | 9/2000 | Gao et al. |
| 6,130,095 | A | 10/2000 | Shearer |
| 6,140,647 | A | 10/2000 | Welch et al. |
| 6,153,091 | A | 11/2000 | Sechrist et al. |
| 6,155,294 | A | 12/2000 | Cornford et al. |
| 6,162,644 | A | 12/2000 | Choi et al. |
| 6,165,350 | A | 12/2000 | Lokhandwala et al. |
| 6,169,218 | B1 | 1/2001 | Hearn |
| 6,171,052 | B1 | 1/2001 | Aschenbruck et al. |
| 6,174,501 | B1 | 1/2001 | Noureddini |
| 6,190,535 | B1 | 2/2001 | Kalnes et al. |
| 6,203,585 | B1 | 3/2001 | Majerczak |
| 6,235,104 | B1 | 5/2001 | Chattopadhyay et al. |
| 6,258,987 | B1 | 7/2001 | Schmidt et al. |
| 6,271,518 | B1 | 8/2001 | Boehm et al. |
| 6,274,785 | B1 | 8/2001 | Gore |
| 6,284,128 | B1 | 9/2001 | Glover et al. |
| 6,296,812 | B1 | 10/2001 | Gauthier et al. |
| 6,312,586 | B1 | 11/2001 | Kalnes et al. |
| 6,315,815 | B1 | 11/2001 | Spadaccini |
| 6,324,895 | B1 | 12/2001 | Chitnis et al. |
| 6,328,348 | B1 | 12/2001 | Cornford et al. |
| 6,331,436 | B1 | 12/2001 | Richardson et al. |
| 6,348,074 | B2 | 2/2002 | Wenzel |
| 6,350,371 | B1 | 2/2002 | Lokhandwala et al. |
| 6,368,495 | B1 | 4/2002 | Kocal et al. |
| 6,382,633 | B1 | 5/2002 | Hashiguchi et al. |
| 6,390,673 | B1 | 5/2002 | Camburn |
| 6,395,228 | B1 | 5/2002 | Maggard et al. |
| 6,398,518 | B1 | 6/2002 | Ingistov |
| 6,399,800 | B1 | 6/2002 | Haas et al. |
| 6,420,181 | B1 | 7/2002 | Novak |
| 6,422,035 | B1 | 7/2002 | Phillippe |
| 6,435,279 | B1 | 8/2002 | Howe et al. |
| 6,446,446 | B1 | 9/2002 | Cowans |
| 6,446,729 | B1 | 9/2002 | Bixenman et al. |
| 6,451,197 | B1 | 9/2002 | Kalnes |
| 6,454,935 | B1 | 9/2002 | Lesieur et al. |
| 6,467,303 | B2 | 10/2002 | Ross |
| 6,482,762 | B1 | 11/2002 | Ruffin et al. |
| 6,503,460 | B1 | 1/2003 | Miller et al. |
| 6,528,047 | B2 | 3/2003 | Arif et al. |
| 6,540,797 | B1 | 4/2003 | Scott et al. |
| 6,558,531 | B2 | 5/2003 | Steffens et al. |
| 6,589,323 | B1 | 7/2003 | Korin |
| 6,592,448 | B1 | 7/2003 | Williams |
| 6,609,888 | B1 | 8/2003 | Ingistov |
| 6,622,490 | B2 | 9/2003 | Ingistov |
| 6,644,935 | B2 | 11/2003 | Ingistov |
| 6,660,895 | B1 | 12/2003 | Brunet et al. |
| 6,672,858 | B1 | 1/2004 | Benson et al. |
| 6,733,232 | B2 | 5/2004 | Ingistov et al. |
| 6,733,237 | B2 | 5/2004 | Ingistov |
| 6,736,961 | B2 | 5/2004 | Plummer et al. |
| 6,740,226 | B2 | 5/2004 | Mehra et al. |
| 6,772,581 | B2 | 8/2004 | Ojiro et al. |
| 6,772,741 | B1 | 8/2004 | Pittel et al. |
| 6,814,941 | B1 | 11/2004 | Naunheimer et al. |
| 6,824,673 | B1 | 11/2004 | Ellis et al. |
| 6,827,841 | B2 | 12/2004 | Kiser et al. |
| 6,835,223 | B2 | 12/2004 | Walker et al. |
| 6,841,133 | B2 | 1/2005 | Niewiedzial et al. |
| 6,842,702 | B2 | 1/2005 | Haaland et al. |
| 6,854,346 | B2 | 2/2005 | Nimberger |
| 6,858,128 | B1 | 2/2005 | Hoehn et al. |
| 6,866,771 | B2 | 3/2005 | Lomas et al. |
| 6,869,521 | B2 | 3/2005 | Lomas |
| 6,897,071 | B2 | 5/2005 | Sonbul |
| 6,962,484 | B2 | 11/2005 | Brandl et al. |
| 7,013,718 | B2 | 3/2006 | Ingistov et al. |
| 7,035,767 | B2 | 4/2006 | Archer et al. |
| 7,048,254 | B2 | 5/2006 | Laurent et al. |
| 7,074,321 | B1 | 7/2006 | Kalnes |
| 7,078,005 | B2 | 7/2006 | Smith et al. |
| 7,087,153 | B1 | 8/2006 | Kalnes |
| 7,156,123 | B2 | 1/2007 | Welker et al. |
| 7,172,686 | B1 | 2/2007 | Ji et al. |
| 7,174,715 | B2 | 2/2007 | Armitage et al. |
| 7,194,369 | B2 | 3/2007 | Lundstedt et al. |
| 7,213,413 | B2 | 5/2007 | Battiste et al. |
| 7,225,840 | B1 | 6/2007 | Craig et al. |
| 7,228,250 | B2 | 6/2007 | Naiman et al. |
| 7,244,350 | B2 | 7/2007 | Kar et al. |
| 7,252,755 | B2 | 8/2007 | Kiser et al. |
| 7,255,531 | B2 | 8/2007 | Ingistov |
| 7,260,499 | B2 | 8/2007 | Watzke et al. |
| 7,291,257 | B2 | 11/2007 | Ackerson et al. |
| 7,332,132 | B2 | 2/2008 | Hedrick et al. |
| 7,404,411 | B2 | 7/2008 | Welch et al. |
| 7,419,583 | B2 | 9/2008 | Nieskens et al. |
| 7,445,936 | B2 | 11/2008 | O'Connor et al. |
| 7,459,081 | B2 | 12/2008 | Koenig |
| 7,485,801 | B1 | 2/2009 | Pulter et al. |
| 7,487,955 | B1 | 2/2009 | Buercklin |
| 7,501,285 | B1 | 3/2009 | Triche et al. |
| 7,551,420 | B2 | 6/2009 | Cerqueira et al. |
| 7,571,765 | B2 | 8/2009 | Themig |
| 7,637,970 | B1 | 12/2009 | Fox et al. |
| 7,669,653 | B2 | 3/2010 | Craster et al. |
| 7,682,501 | B2 | 3/2010 | Soni et al. |
| 7,686,280 | B2 | 3/2010 | Lowery |
| 7,857,964 | B2 | 12/2010 | Mashiko et al. |
| 7,866,346 | B1 | 1/2011 | Walters |
| 7,895,011 | B2 | 2/2011 | Youssefi et al. |
| 7,914,601 | B2 | 3/2011 | Farr et al. |
| 7,931,803 | B2 | 4/2011 | Buchanan |
| 7,932,424 | B2 | 4/2011 | Fujimoto et al. |
| 7,939,335 | B1 | 5/2011 | Triche et al. |
| 7,981,361 | B2 | 7/2011 | Bacik |
| 7,988,753 | B1 | 8/2011 | Fox et al. |
| 7,993,514 | B2 | 8/2011 | Schlueter |
| 8,007,662 | B2 | 8/2011 | Lomas et al. |
| 8,017,910 | B2 | 9/2011 | Sharpe |
| 8,029,662 | B2 | 10/2011 | Varma et al. |
| 8,037,938 | B2 | 10/2011 | Jardim De Azevedo et al. |
| 8,038,774 | B2 | 10/2011 | Peng |
| 8,064,052 | B2 | 11/2011 | Feitisch et al. |
| 8,066,867 | B2 | 11/2011 | Dziabala |
| 8,080,426 | B1 | 12/2011 | Moore et al. |
| 8,127,845 | B2 | 3/2012 | Assal |
| 8,147,570 | B1 | 4/2012 | Turocy |
| 8,193,401 | B2 | 6/2012 | McGehee et al. |
| 8,236,566 | B2 | 8/2012 | Carpenter et al. |
| 8,286,673 | B1 | 10/2012 | Recker et al. |
| 8,354,065 | B1 | 1/2013 | Sexton |
| 8,360,118 | B2 | 1/2013 | Fleischer et al. |
| 8,370,082 | B2 | 2/2013 | De Peinder et al. |
| 8,388,830 | B2 | 3/2013 | Sohn et al. |
| 8,389,285 | B2 | 3/2013 | Carpenter et al. |
| 8,397,803 | B2 | 3/2013 | Crabb et al. |
| 8,397,820 | B2 | 3/2013 | Fehr et al. |
| 8,404,103 | B2 | 3/2013 | Dziabala |
| 8,434,800 | B1 | 5/2013 | LeBlanc |
| 8,481,942 | B2 | 7/2013 | Mertens |
| 8,506,656 | B1 | 8/2013 | Turocy |
| 8,518,131 | B2 | 8/2013 | Mattingly et al. |
| 8,524,180 | B2 | 9/2013 | Canari et al. |
| 8,569,068 | B2 | 10/2013 | Carpenter et al. |
| 8,579,139 | B1 | 11/2013 | Sablak |
| 8,591,814 | B2 | 11/2013 | Hodges |
| 8,609,048 | B1 | 12/2013 | Beadle |

(56) References Cited

U.S. PATENT DOCUMENTS

| | | | |
|---|---|---|---|
| 8,647,415 | B1 | 2/2014 | De Haan et al. |
| 8,670,945 | B2 | 3/2014 | van Schie |
| 8,685,232 | B2 | 4/2014 | Mandal et al. |
| 8,735,820 | B2 | 5/2014 | Mertens |
| 8,753,502 | B1 | 6/2014 | Sexton et al. |
| 8,764,970 | B1 | 7/2014 | Moore et al. |
| 8,778,823 | B1 | 7/2014 | Oyekan et al. |
| 8,781,757 | B2 | 7/2014 | Farquharson et al. |
| 8,784,645 | B2 | 7/2014 | Iguchi et al. |
| 8,829,258 | B2 | 9/2014 | Gong et al. |
| 8,916,041 | B2 | 12/2014 | Van Den Berg et al. |
| 8,932,458 | B1 | 1/2015 | Gianzon et al. |
| 8,986,402 | B2 | 3/2015 | Kelly |
| 8,987,537 | B1 | 3/2015 | Droubi et al. |
| 8,999,011 | B2 | 4/2015 | Stern et al. |
| 8,999,012 | B2 | 4/2015 | Kelly et al. |
| 9,011,674 | B2 | 4/2015 | Milam et al. |
| 9,057,035 | B1 | 6/2015 | Kraus et al. |
| 9,097,423 | B2 | 8/2015 | Kraus et al. |
| 9,109,176 | B2 | 8/2015 | Stern et al. |
| 9,109,177 | B2 | 8/2015 | Freel et al. |
| 9,138,738 | B1 | 9/2015 | Glover et al. |
| 9,216,376 | B2 | 12/2015 | Liu et al. |
| 9,272,241 | B2 | 3/2016 | Königsson |
| 9,273,867 | B2 | 3/2016 | Buzinski et al. |
| 9,279,748 | B1 | 3/2016 | Hughes et al. |
| 9,289,715 | B2 | 3/2016 | Høy-Petersen et al. |
| 9,315,403 | B1 | 4/2016 | Laur et al. |
| 9,371,493 | B1 | 6/2016 | Oyekan |
| 9,371,494 | B2 | 6/2016 | Oyekan et al. |
| 9,377,340 | B2 | 6/2016 | Hägg |
| 9,393,520 | B2 | 7/2016 | Gomez |
| 9,410,102 | B2 | 8/2016 | Eaton et al. |
| 9,428,695 | B2 | 8/2016 | Narayanaswamy et al. |
| 9,453,169 | B2 | 9/2016 | Stippich, Jr. et al. |
| 9,458,396 | B2 | 10/2016 | Weiss et al. |
| 9,487,718 | B2 | 11/2016 | Kraus et al. |
| 9,499,758 | B2 | 11/2016 | Droubi et al. |
| 9,500,300 | B2 | 11/2016 | Daigle |
| 9,506,649 | B2 | 11/2016 | Rennie et al. |
| 9,580,662 | B1 | 2/2017 | Moore |
| 9,624,448 | B2 | 4/2017 | Joo et al. |
| 9,650,580 | B2 | 5/2017 | Merdrignac et al. |
| 9,657,241 | B2 | 5/2017 | Craig et al. |
| 9,662,597 | B1 | 5/2017 | Formoso |
| 9,663,729 | B2 | 5/2017 | Baird et al. |
| 9,665,693 | B2 | 5/2017 | Saeger et al. |
| 9,709,545 | B2 | 7/2017 | Mertens |
| 9,757,686 | B2 | 9/2017 | Peng |
| 9,789,290 | B2 | 10/2017 | Forsell |
| 9,803,152 | B2 | 10/2017 | Kar et al. |
| 9,834,731 | B2 | 12/2017 | Weiss et al. |
| 9,840,674 | B2 | 12/2017 | Weiss et al. |
| 9,873,080 | B2 | 1/2018 | Richardson |
| 9,878,300 | B2 | 1/2018 | Norling |
| 9,890,907 | B1 | 2/2018 | Highfield et al. |
| 9,891,198 | B2 | 2/2018 | Sutan |
| 9,895,649 | B2 | 2/2018 | Brown et al. |
| 9,896,630 | B2 | 2/2018 | Weiss et al. |
| 9,914,094 | B2 | 3/2018 | Jenkins et al. |
| 9,920,270 | B2 | 3/2018 | Robinson et al. |
| 9,925,486 | B1 | 3/2018 | Botti |
| 9,982,788 | B1 | 5/2018 | Maron |
| 9,988,585 | B2 | 6/2018 | Hayasaka et al. |
| 10,018,458 | B2 | 7/2018 | Wade et al. |
| 10,047,299 | B2 | 8/2018 | Rubin-Pitel et al. |
| 10,048,100 | B1 | 8/2018 | Workman, Jr. |
| 10,087,397 | B2 | 10/2018 | Phillips et al. |
| 10,099,175 | B2 | 10/2018 | Takashashi et al. |
| 10,150,078 | B2 | 12/2018 | Komatsu et al. |
| 10,228,708 | B2 | 3/2019 | Lambert et al. |
| 10,239,034 | B1 | 3/2019 | Sexton |
| 10,253,269 | B2 | 4/2019 | Cantley et al. |
| 10,266,779 | B2 | 4/2019 | Weiss et al. |
| 10,295,521 | B2 | 5/2019 | Mertens |
| 10,308,884 | B2 | 6/2019 | Klussman |
| 10,316,263 | B2 | 6/2019 | Rubin-Pitel et al. |
| 10,384,157 | B2 | 8/2019 | Balcik |
| 10,435,339 | B2 | 10/2019 | Larsen et al. |
| 10,435,636 | B2 | 10/2019 | Johnson et al. |
| 10,443,000 | B2 | 10/2019 | Lomas |
| 10,443,006 | B1 | 10/2019 | Fruchey et al. |
| 10,457,881 | B2 | 10/2019 | Droubi et al. |
| 10,479,943 | B1 | 11/2019 | Liu et al. |
| 10,494,579 | B2 | 12/2019 | Wrigley et al. |
| 10,495,570 | B2 | 12/2019 | Owen et al. |
| 10,501,699 | B2 | 12/2019 | Robinson et al. |
| 10,526,547 | B2 | 1/2020 | Larsen et al. |
| 10,533,141 | B2 | 1/2020 | Moore et al. |
| 10,563,130 | B2 | 2/2020 | Narayanaswamy et al. |
| 10,563,132 | B2 | 2/2020 | Moore et al. |
| 10,563,133 | B2 | 2/2020 | Moore et al. |
| 10,570,078 | B2 | 2/2020 | Larsen et al. |
| 10,577,551 | B2 | 3/2020 | Kraus et al. |
| 10,584,287 | B2 | 3/2020 | Klussman et al. |
| 10,604,709 | B2 | 3/2020 | Moore et al. |
| 10,640,719 | B2 | 5/2020 | Freel et al. |
| 10,655,074 | B2 | 5/2020 | Moore et al. |
| 10,696,906 | B2 | 6/2020 | Cantley et al. |
| 10,808,184 | B1 | 10/2020 | Moore |
| 10,836,966 | B2 | 11/2020 | Moore et al. |
| 10,876,053 | B2 | 12/2020 | Klussman et al. |
| 10,954,456 | B2 | 3/2021 | Moore et al. |
| 10,961,468 | B2 | 3/2021 | Moore et al. |
| 10,962,259 | B2 | 3/2021 | Shah et al. |
| 10,968,403 | B2 | 4/2021 | Moore |
| 11,021,662 | B2 | 6/2021 | Moore et al. |
| 11,098,255 | B2 | 8/2021 | Larsen et al. |
| 11,124,714 | B2 | 9/2021 | Eller et al. |
| 11,136,513 | B2 | 10/2021 | Moore et al. |
| 11,164,406 | B2 | 11/2021 | Meroux et al. |
| 11,168,270 | B1 | 11/2021 | Moore |
| 11,175,039 | B2 | 11/2021 | Lochschmied et al. |
| 11,200,489 | B2 | 12/2021 | Cohen et al. |
| 11,203,719 | B2 | 12/2021 | Cantley et al. |
| 11,203,722 | B2 | 12/2021 | Moore et al. |
| 11,214,741 | B2 | 1/2022 | Davdov et al. |
| 11,306,253 | B2 | 4/2022 | Timken et al. |
| 11,319,262 | B2 | 5/2022 | Wu et al. |
| 11,352,577 | B2 | 6/2022 | Woodchick et al. |
| 11,352,578 | B2 | 6/2022 | Eller et al. |
| 11,384,301 | B2 | 7/2022 | Eller et al. |
| 11,421,162 | B2 | 8/2022 | Pradeep et al. |
| 11,460,478 | B2 | 10/2022 | Sugiyama et al. |
| 11,467,172 | B1 | 10/2022 | Mitzel et al. |
| 11,494,651 | B2 | 11/2022 | Mukund et al. |
| 11,542,441 | B2 | 1/2023 | Larsen et al. |
| 11,574,192 | B2 | 2/2023 | Cohen et al. |
| 11,578,638 | B2 | 2/2023 | Thobe |
| 11,634,647 | B2 | 4/2023 | Cantley et al. |
| 11,667,858 | B2 | 6/2023 | Eller et al. |
| 11,692,141 | B2 | 7/2023 | Larsen et al. |
| 11,702,600 | B2 | 7/2023 | Sexton et al. |
| 11,715,950 | B2 | 8/2023 | Miller et al. |
| 11,720,526 | B2 | 8/2023 | Miller et al. |
| 11,802,257 | B2 | 10/2023 | Short et al. |
| 11,835,450 | B2 | 12/2023 | Bledsoe, Jr. et al. |
| 11,860,069 | B2 | 1/2024 | Bledsoe, Jr. |
| 11,886,154 | B2 | 1/2024 | Mukund et al. |
| 11,891,581 | B2 | 2/2024 | Cantley et al. |
| 11,898,109 | B2 | 2/2024 | Sexton et al. |
| 11,905,468 | B2 | 2/2024 | Sexton et al. |
| 11,905,479 | B2 | 2/2024 | Eller et al. |
| 11,906,423 | B2 | 2/2024 | Bledsoe, Jr. et al. |
| 11,920,096 | B2 | 3/2024 | Woodchick et al. |
| 11,921,035 | B2 | 3/2024 | Bledsoe, Jr. et al. |
| 11,970,664 | B2 | 4/2024 | Larsen |
| 11,975,316 | B2 | 5/2024 | Zalewski |
| 11,993,751 | B2 | 5/2024 | Jagnanan et al. |
| 12,000,720 | B2 | 6/2024 | Langlois, III |
| 12,018,216 | B2 | 6/2024 | Larsen et al. |
| 12,031,094 | B2 | 7/2024 | Sexton et al. |
| 12,031,676 | B2 | 7/2024 | Craig et al. |
| 12,037,548 | B2 | 7/2024 | Larsen et al. |

(56) References Cited

U.S. PATENT DOCUMENTS

| | | |
|---|---|---|
| 12,039,446 B2 | 7/2024 | Cohen et al. |
| 12,049,592 B2 | 7/2024 | Clark et al. |
| 12,066,800 B2 | 8/2024 | Salhov et al. |
| 12,163,878 B2 | 12/2024 | Bledsoe, Jr. |
| 2002/0014068 A1 | 2/2002 | Mittricker et al. |
| 2002/0061633 A1 | 5/2002 | Marsh |
| 2002/0170431 A1 | 11/2002 | Chang et al. |
| 2003/0041518 A1 | 3/2003 | Wallace et al. |
| 2003/0113598 A1 | 6/2003 | Chow et al. |
| 2003/0188536 A1 | 10/2003 | Mittricker |
| 2003/0194322 A1 | 10/2003 | Brandl et al. |
| 2004/0010170 A1 | 1/2004 | Vickers |
| 2004/0033617 A1 | 2/2004 | Sonbul |
| 2004/0040201 A1 | 3/2004 | Roos et al. |
| 2004/0079431 A1 | 4/2004 | Kissell |
| 2004/0121472 A1 | 6/2004 | Nemana et al. |
| 2004/0129605 A1 | 7/2004 | Goldstein et al. |
| 2004/0139858 A1 | 7/2004 | Entezarian |
| 2004/0154610 A1 | 8/2004 | Hopp et al. |
| 2004/0232050 A1 | 11/2004 | Martin et al. |
| 2004/0251170 A1 | 12/2004 | Chiyoda et al. |
| 2005/0042151 A1 | 2/2005 | Alward et al. |
| 2005/0088653 A1 | 4/2005 | Coates et al. |
| 2005/0123466 A1 | 6/2005 | Sullivan |
| 2005/0139516 A1 | 6/2005 | Nieskens et al. |
| 2005/0143609 A1 | 6/2005 | Wolf et al. |
| 2005/0150820 A1 | 7/2005 | Guo |
| 2005/0216214 A1 | 9/2005 | Gorin |
| 2005/0229777 A1 | 10/2005 | Brown |
| 2006/0037237 A1 | 2/2006 | Copeland et al. |
| 2006/0042701 A1 | 3/2006 | Jansen |
| 2006/0049082 A1 | 3/2006 | Niccum et al. |
| 2006/0091059 A1 | 5/2006 | Barbaro |
| 2006/0162243 A1 | 7/2006 | Wolf |
| 2006/0169064 A1 | 8/2006 | Anschutz et al. |
| 2006/0169305 A1 | 8/2006 | Jansen et al. |
| 2006/0210456 A1 | 9/2006 | Bruggendick |
| 2006/0220383 A1 | 10/2006 | Erickson |
| 2007/0003450 A1 | 1/2007 | Burdett et al. |
| 2007/0082407 A1 | 4/2007 | Little, III |
| 2007/0112258 A1 | 5/2007 | Soyemi et al. |
| 2007/0202027 A1 | 8/2007 | Walker et al. |
| 2007/0212271 A1 | 9/2007 | Kennedy et al. |
| 2007/0212790 A1 | 9/2007 | Welch et al. |
| 2007/0215521 A1 | 9/2007 | Havlik et al. |
| 2007/0243556 A1 | 10/2007 | Wachs |
| 2007/0283812 A1 | 12/2007 | Liu et al. |
| 2008/0078693 A1 | 4/2008 | Sexton et al. |
| 2008/0078694 A1 | 4/2008 | Sexton et al. |
| 2008/0078695 A1 | 4/2008 | Sexton et al. |
| 2008/0081844 A1 | 4/2008 | Shires et al. |
| 2008/0087592 A1 | 4/2008 | Buchanan |
| 2008/0092436 A1 | 4/2008 | Seames et al. |
| 2008/0109107 A1 | 5/2008 | Stefani et al. |
| 2008/0149486 A1 | 6/2008 | Greaney et al. |
| 2008/0156696 A1 | 7/2008 | Niccum et al. |
| 2008/0207974 A1 | 8/2008 | McCoy et al. |
| 2008/0211505 A1 | 9/2008 | Trygstad et al. |
| 2008/0247942 A1 | 10/2008 | Kandziora et al. |
| 2008/0253936 A1 | 10/2008 | Abhari |
| 2009/0151250 A1 | 6/2009 | Agrawal |
| 2009/0152454 A1 | 6/2009 | Nelson et al. |
| 2009/0158824 A1 | 6/2009 | Brown et al. |
| 2010/0127217 A1 | 5/2010 | Lightowlers et al. |
| 2010/0131247 A1 | 5/2010 | Carpenter et al. |
| 2010/0166602 A1 | 7/2010 | Bacik |
| 2010/0243235 A1 | 9/2010 | Caldwell et al. |
| 2010/0301044 A1 | 12/2010 | Sprecher |
| 2010/0318118 A1 | 12/2010 | Forsell |
| 2011/0147267 A1 | 6/2011 | Kaul et al. |
| 2011/0155646 A1 | 6/2011 | Karas et al. |
| 2011/0175032 A1 | 7/2011 | Günther |
| 2011/0186307 A1 | 8/2011 | Derby |
| 2011/0220586 A1 | 9/2011 | Levitt |
| 2011/0237856 A1 | 9/2011 | Mak |
| 2011/0247835 A1 | 10/2011 | Crabb |
| 2011/0277377 A1 | 11/2011 | Novak et al. |
| 2011/0299076 A1 | 12/2011 | Feitisch et al. |
| 2011/0319698 A1 | 12/2011 | Sohn et al. |
| 2012/0012342 A1 | 1/2012 | Wilkin et al. |
| 2012/0125813 A1 | 5/2012 | Bridges et al. |
| 2012/0125814 A1 | 5/2012 | Sanchez et al. |
| 2012/0131853 A1 | 5/2012 | Thacker et al. |
| 2012/0222550 A1 | 9/2012 | Ellis |
| 2012/0272715 A1 | 11/2012 | Kriel et al. |
| 2013/0014431 A1 | 1/2013 | Jin et al. |
| 2013/0109895 A1 | 5/2013 | Novak et al. |
| 2013/0112313 A1 | 5/2013 | Donnelly et al. |
| 2013/0125619 A1 | 5/2013 | Wang |
| 2013/0186739 A1 | 7/2013 | Trompiz |
| 2013/0192339 A1 | 8/2013 | Kriel et al. |
| 2013/0225897 A1 | 8/2013 | Candelon et al. |
| 2013/0288355 A1 | 10/2013 | DeWitte et al. |
| 2013/0302738 A1 | 11/2013 | Rennie |
| 2013/0334027 A1 | 12/2013 | Winter et al. |
| 2013/0342203 A1 | 12/2013 | Trygstad et al. |
| 2014/0019052 A1 | 1/2014 | Zaeper et al. |
| 2014/0024873 A1 | 1/2014 | De Haan et al. |
| 2014/0041150 A1 | 2/2014 | Sjoberg |
| 2014/0121428 A1 | 5/2014 | Wang et al. |
| 2014/0229010 A1 | 8/2014 | Farquharson et al. |
| 2014/0251129 A1 | 9/2014 | Upadhyay |
| 2014/0296057 A1 | 10/2014 | Ho et al. |
| 2014/0299515 A1 | 10/2014 | Weiss et al. |
| 2014/0311953 A1 | 10/2014 | Chimenti et al. |
| 2014/0316176 A1 | 10/2014 | Fjare et al. |
| 2014/0332444 A1 | 11/2014 | Weiss et al. |
| 2014/0353138 A1 | 12/2014 | Amale et al. |
| 2014/0374322 A1 | 12/2014 | Venkatesh |
| 2015/0005547 A1 | 1/2015 | Freel et al. |
| 2015/0005548 A1 | 1/2015 | Freel et al. |
| 2015/0007720 A1 | 1/2015 | Vu |
| 2015/0033570 A1 | 2/2015 | Bernabe |
| 2015/0034570 A1 | 2/2015 | Andreussi |
| 2015/0034599 A1 | 2/2015 | Hunger et al. |
| 2015/0057477 A1 | 2/2015 | Ellig et al. |
| 2015/0071028 A1 | 3/2015 | Glanville |
| 2015/0122704 A1 | 5/2015 | Kumar et al. |
| 2015/0166426 A1 | 6/2015 | Wegerer et al. |
| 2015/0240167 A1 | 8/2015 | Kulprathipanja et al. |
| 2015/0240174 A1 | 8/2015 | Bru et al. |
| 2015/0337207 A1 | 11/2015 | Chen et al. |
| 2015/0337225 A1 | 11/2015 | Droubi et al. |
| 2015/0337226 A1 | 11/2015 | Tardif et al. |
| 2015/0353851 A1 | 12/2015 | Buchanan |
| 2016/0045918 A1 | 2/2016 | Lapham |
| 2016/0090539 A1 | 3/2016 | Frey et al. |
| 2016/0122662 A1 | 5/2016 | Weiss et al. |
| 2016/0122666 A1 | 5/2016 | Weiss et al. |
| 2016/0160139 A1 | 6/2016 | Dawe et al. |
| 2016/0168481 A1 | 6/2016 | Ray et al. |
| 2016/0175749 A1 | 6/2016 | Suda |
| 2016/0244677 A1 | 8/2016 | Froehle |
| 2016/0298851 A1 | 10/2016 | Brickwood et al. |
| 2016/0312127 A1 | 10/2016 | Frey et al. |
| 2016/0312130 A1 | 10/2016 | Majcher et al. |
| 2017/0009163 A1 | 1/2017 | Kraus et al. |
| 2017/0115190 A1 | 4/2017 | Hall et al. |
| 2017/0128859 A1 | 5/2017 | Levitt |
| 2017/0131728 A1 | 5/2017 | Lambert et al. |
| 2017/0151526 A1 | 6/2017 | Cole |
| 2017/0183575 A1 | 6/2017 | Rubin-Pitel et al. |
| 2017/0198910 A1 | 7/2017 | Garg |
| 2017/0226434 A1 | 8/2017 | Zimmerman |
| 2017/0233670 A1 | 8/2017 | Feustel et al. |
| 2017/0234335 A1 | 8/2017 | LeBlanc et al. |
| 2017/0269559 A1 | 9/2017 | Trygstad |
| 2018/0017469 A1 | 1/2018 | English et al. |
| 2018/0037308 A1 | 2/2018 | Lee et al. |
| 2018/0080958 A1 | 3/2018 | Marchese et al. |
| 2018/0094809 A1 | 4/2018 | Lochschmied |
| 2018/0119039 A1 | 5/2018 | Tanaka et al. |
| 2018/0134974 A1 | 5/2018 | Weiss et al. |
| 2018/0163144 A1 | 6/2018 | Weiss et al. |

(56) References Cited

U.S. PATENT DOCUMENTS

| | | |
|---|---|---|
| 2018/0179457 A1 | 6/2018 | Mukherjee et al. |
| 2018/0202607 A1 | 7/2018 | McBride |
| 2018/0230389 A1 | 8/2018 | Moore et al. |
| 2018/0246142 A1 | 8/2018 | Glover |
| 2018/0355263 A1 | 12/2018 | Moore et al. |
| 2018/0361312 A1 | 12/2018 | Dutra e Mello et al. |
| 2018/0371325 A1 | 12/2018 | Streiff et al. |
| 2019/0002772 A1 | 1/2019 | Moore et al. |
| 2019/0010405 A1 | 1/2019 | Moore et al. |
| 2019/0010408 A1 | 1/2019 | Moore et al. |
| 2019/0016980 A1 | 1/2019 | Kar et al. |
| 2019/0093026 A1 | 3/2019 | Wohaibi et al. |
| 2019/0099706 A1 | 4/2019 | Sampath |
| 2019/0100702 A1 | 4/2019 | Cantley et al. |
| 2019/0127651 A1 | 5/2019 | Kar et al. |
| 2019/0128160 A1 | 5/2019 | Peng |
| 2019/0136144 A1 | 5/2019 | Wohaibi et al. |
| 2019/0153340 A1 | 5/2019 | Weiss et al. |
| 2019/0153942 A1 | 5/2019 | Wohaibi et al. |
| 2019/0169509 A1 | 6/2019 | Cantley et al. |
| 2019/0185772 A1 | 6/2019 | Berkhous et al. |
| 2019/0201841 A1 | 7/2019 | McClelland |
| 2019/0203130 A1 | 7/2019 | Mukherjee |
| 2019/0218466 A1 | 7/2019 | Slade et al. |
| 2019/0233741 A1 | 8/2019 | Moore et al. |
| 2019/0292465 A1 | 9/2019 | McBride |
| 2019/0338205 A1 | 11/2019 | Ackerson et al. |
| 2019/0382668 A1 | 12/2019 | Klussman et al. |
| 2019/0382672 A1 | 12/2019 | Sorensen |
| 2020/0041481 A1 | 2/2020 | Burgess |
| 2020/0049675 A1 | 2/2020 | Ramirez |
| 2020/0080881 A1 | 3/2020 | Langlois et al. |
| 2020/0095509 A1 | 3/2020 | Moore et al. |
| 2020/0108327 A1* | 4/2020 | Ohaco .............. B01D 3/42 |
| 2020/0123458 A1 | 4/2020 | Moore et al. |
| 2020/0181502 A1 | 6/2020 | Paasikallio et al. |
| 2020/0191385 A1 | 6/2020 | Carroll |
| 2020/0199462 A1 | 6/2020 | Klussman et al. |
| 2020/0208068 A1 | 7/2020 | Hossain et al. |
| 2020/0246743 A1 | 8/2020 | Sorensen |
| 2020/0291316 A1 | 9/2020 | Robbins et al. |
| 2020/0311547 A1 | 10/2020 | Mukund et al. |
| 2020/0312470 A1 | 10/2020 | Craig et al. |
| 2020/0316513 A1 | 10/2020 | Zhao |
| 2020/0332198 A1 | 10/2020 | Yang et al. |
| 2020/0353456 A1 | 11/2020 | Zalewski et al. |
| 2020/0378600 A1 | 12/2020 | Craig et al. |
| 2020/0385644 A1 | 12/2020 | Rogel et al. |
| 2021/0002559 A1 | 1/2021 | Larsen et al. |
| 2021/0003502 A1 | 1/2021 | Kirchmann et al. |
| 2021/0033631 A1 | 2/2021 | Field et al. |
| 2021/0096518 A1 | 4/2021 | Ilani et al. |
| 2021/0103304 A1 | 4/2021 | Fogarty et al. |
| 2021/0115344 A1 | 4/2021 | Perkins et al. |
| 2021/0181164 A1 | 6/2021 | Shirkhan et al. |
| 2021/0213382 A1 | 7/2021 | Cole |
| 2021/0238487 A1 | 8/2021 | Moore et al. |
| 2021/0253956 A1 | 8/2021 | Jagnanan et al. |
| 2021/0253964 A1 | 8/2021 | Eller et al. |
| 2021/0253965 A1 | 8/2021 | Woodchick et al. |
| 2021/0261874 A1 | 8/2021 | Eller et al. |
| 2021/0284919 A1 | 9/2021 | Moore et al. |
| 2021/0292661 A1 | 9/2021 | Klussman et al. |
| 2021/0301210 A1 | 9/2021 | Timken et al. |
| 2021/0318280 A1 | 10/2021 | Ludlum |
| 2021/0348066 A1 | 11/2021 | Clark et al. |
| 2021/0396660 A1 | 12/2021 | Zarrabian |
| 2021/0403819 A1 | 12/2021 | Moore et al. |
| 2022/0040629 A1 | 2/2022 | Edmoundson et al. |
| 2022/0041939 A1 | 2/2022 | Titta et al. |
| 2022/0041940 A1 | 2/2022 | Pradeep et al. |
| 2022/0048019 A1 | 2/2022 | Zalewski et al. |
| 2022/0235647 A1 | 7/2022 | Haque et al. |
| 2022/0266166 A1 | 8/2022 | John et al. |
| 2022/0268694 A1 | 8/2022 | Bledsoe et al. |
| 2022/0298440 A1 | 9/2022 | Woodchick et al. |
| 2022/0299170 A1 | 9/2022 | Raynor et al. |
| 2022/0299952 A1 | 9/2022 | Salhov et al. |
| 2022/0343229 A1 | 10/2022 | Gruber et al. |
| 2022/0357303 A1 | 11/2022 | Zhu et al. |
| 2023/0015077 A1 | 1/2023 | Kim |
| 2023/0037667 A1 | 2/2023 | Mukund et al. |
| 2023/0073816 A1 | 3/2023 | Wang et al. |
| 2023/0078852 A1 | 3/2023 | Campbell et al. |
| 2023/0080192 A1 | 3/2023 | Bledsoe et al. |
| 2023/0082189 A1 | 3/2023 | Bledsoe et al. |
| 2023/0084329 A1 | 3/2023 | Bledsoe et al. |
| 2023/0087063 A1 | 3/2023 | Mitzel et al. |
| 2023/0089935 A1 | 3/2023 | Bledsoe et al. |
| 2023/0093452 A1 | 3/2023 | Sexton et al. |
| 2023/0111609 A1 | 4/2023 | Sexton et al. |
| 2023/0113140 A1 | 4/2023 | Larsen et al. |
| 2023/0118319 A1 | 4/2023 | Sexton et al. |
| 2023/0220286 A1 | 7/2023 | Cantley et al. |
| 2023/0241548 A1 | 8/2023 | Holland et al. |
| 2023/0242837 A1 | 8/2023 | Short et al. |
| 2023/0259080 A1 | 8/2023 | Whikehart et al. |
| 2023/0259088 A1 | 8/2023 | Borup et al. |
| 2023/0272290 A1 | 8/2023 | Larsen et al. |
| 2023/0295528 A1 | 9/2023 | Eller et al. |
| 2023/0332056 A1 | 10/2023 | Larsen et al. |
| 2023/0332058 A1 | 10/2023 | Larsen et al. |
| 2023/0357649 A1 | 11/2023 | Sexton et al. |
| 2023/0400184 A1 | 12/2023 | Craig |
| 2023/0416615 A1 | 12/2023 | Larsen |
| 2023/0416638 A1 | 12/2023 | Short |
| 2024/0011898 A1 | 1/2024 | Bledsoe, Jr. et al. |
| 2024/0112761 A1 | 4/2024 | Mistry et al. |
| 2024/0115996 A1 | 4/2024 | Rudd |
| 2024/0117262 A1 | 4/2024 | Eller |
| 2024/0118194 A1 | 4/2024 | Bledsoe, Jr. |
| 2024/0124790 A1 | 4/2024 | Sexton |
| 2024/0132786 A1 | 4/2024 | Sexton |
| 2024/0182803 A1 | 6/2024 | Woodchick |
| 2024/0189753 A1 | 6/2024 | Esquivel |
| 2024/0294837 A1 | 9/2024 | Larsen |
| 2024/0327723 A1 | 10/2024 | Larsen |
| 2024/0337352 A1 | 10/2024 | Craig |
| 2024/0377287 A1 | 11/2024 | Markins |
| 2024/0399279 A1 | 12/2024 | Duong |

FOREIGN PATENT DOCUMENTS

| | | |
|---|---|---|
| CA | 2949201 | 11/2015 |
| CA | 2822742 | 12/2016 |
| CA | 3009808 | 7/2017 |
| CA | 2904903 | 8/2020 |
| CA | 3077045 | 9/2020 |
| CA | 2947431 | 3/2021 |
| CA | 3004712 | 6/2021 |
| CA | 2980055 | 12/2021 |
| CA | 2879783 | 1/2022 |
| CA | 2991614 | 1/2022 |
| CA | 2980069 | 11/2022 |
| CA | 3109606 | 12/2022 |
| CH | 432129 | 3/1967 |
| CN | 2128346 | 3/1993 |
| CN | 201264907 Y | 7/2009 |
| CN | 201306736 | 9/2009 |
| CN | 201940168 | 8/2011 |
| CN | 102120138 | 12/2012 |
| CN | 203453713 | 2/2014 |
| CN | 103627433 | 3/2014 |
| CN | 203629938 | 6/2014 |
| CN | 203816490 | 9/2014 |
| CN | 104353357 | 2/2015 |
| CN | 204170623 | 2/2015 |
| CN | 103331093 | 4/2015 |
| CN | 104484714 A | 4/2015 |
| CN | 204253221 | 4/2015 |
| CN | 204265565 | 4/2015 |
| CN | 104765346 A | 7/2015 |
| CN | 105148728 | 12/2015 |
| CN | 204824775 | 12/2015 |

(56) References Cited

FOREIGN PATENT DOCUMENTS

| | | |
|---|---|---|
| CN | 103933845 | 1/2016 |
| CN | 105289241 | 2/2016 |
| CN | 205066647 | 3/2016 |
| CN | 105536486 | 5/2016 |
| CN | 105804900 | 7/2016 |
| CN | 103573430 | 8/2016 |
| CN | 205655095 | 10/2016 |
| CN | 104326604 | 11/2016 |
| CN | 104358627 | 11/2016 |
| CN | 106237802 | 12/2016 |
| CN | 205779365 | 12/2016 |
| CN | 106281431 A | 1/2017 |
| CN | 106407648 | 2/2017 |
| CN | 105778987 | 8/2017 |
| CN | 207179722 | 4/2018 |
| CN | 207395575 | 5/2018 |
| CN | 108179022 | 6/2018 |
| CN | 108704478 | 10/2018 |
| CN | 109126458 | 1/2019 |
| CN | 109423345 | 3/2019 |
| CN | 109499365 | 3/2019 |
| CN | 109705939 | 5/2019 |
| CN | 109722303 | 5/2019 |
| CN | 110129103 | 8/2019 |
| CN | 110187635 A | 8/2019 |
| CN | 110229686 | 9/2019 |
| CN | 110389948 A | 10/2019 |
| CN | 209451617 | 10/2019 |
| CN | 110987862 | 4/2020 |
| CN | 111336612 A | 6/2020 |
| CN | 111598306 A | 8/2020 |
| CN | 213762571 U | 7/2021 |
| CN | 213824075 U | 7/2021 |
| CN | 213841995 | 7/2021 |
| CN | 214619622 | 11/2021 |
| CN | 215263512 U | 12/2021 |
| CN | 215288592 | 12/2021 |
| CN | 113963818 | 1/2022 |
| CN | 114001278 | 2/2022 |
| CN | 216205767 | 4/2022 |
| CN | 217431673 | 9/2022 |
| CN | 218565442 | 3/2023 |
| CN | 116417075 A | 7/2023 |
| CN | 117004432 A | 11/2023 |
| DE | 10179 | 6/1912 |
| DE | 3721725 | 1/1989 |
| DE | 19619722 | 11/1997 |
| DE | 102010017563 | 12/2011 |
| DE | 102014009231 A1 | 1/2016 |
| EP | 0142352 | 5/1985 |
| EP | 0527000 | 2/1993 |
| EP | 0783910 A1 | 7/1997 |
| EP | 0949318 | 10/1999 |
| EP | 0783910 B1 | 12/2000 |
| EP | 0801299 | 3/2004 |
| EP | 1413712 | 4/2004 |
| EP | 1600491 | 11/2005 |
| EP | 1870153 | 12/2007 |
| EP | 2047905 | 4/2009 |
| EP | 2955345 | 12/2015 |
| EP | 3130773 | 2/2017 |
| EP | 3139009 | 3/2017 |
| EP | 3239483 | 11/2017 |
| EP | 3085910 | 8/2018 |
| EP | 3355056 | 8/2018 |
| EP | 2998529 | 2/2019 |
| EP | 3441442 | 2/2019 |
| EP | 3569988 | 11/2019 |
| EP | 3878926 | 9/2021 |
| FR | 2357630 | 2/1978 |
| FR | 3004722 | 3/2016 |
| FR | 3027909 | 5/2016 |
| FR | 3067036 | 12/2018 |
| FR | 3067037 | 12/2018 |
| FR | 3072684 | 4/2019 |
| FR | 3075808 | 6/2019 |
| GB | 775273 | 5/1957 |
| GB | 933618 | 8/1963 |
| GB | 1207719 | 10/1970 |
| GB | 2144526 | 3/1985 |
| GB | 2516441 | 1/2015 |
| IN | 202111016535 | 7/2021 |
| JP | 59220609 | 12/1984 |
| JP | 2003129067 | 5/2003 |
| JP | 2005147478 A | 6/2005 |
| JP | 3160405 | 6/2010 |
| JP | 1488173 S | 1/2014 |
| JP | 2015059220 | 3/2015 |
| JP | 2019014275 | 1/2019 |
| KR | 101751923 | 7/2017 |
| KR | 101823897 | 3/2018 |
| KR | 20180095303 | 8/2018 |
| KR | 20190004474 | 1/2019 |
| KR | 20190004475 | 1/2019 |
| RU | 2673558 | 11/2018 |
| RU | 2700705 | 9/2019 |
| RU | 2760879 | 12/2021 |
| TW | 320682 | 11/1997 |
| WO | 94/08225 | 4/1994 |
| WO | 199640436 | 12/1996 |
| WO | 1997033678 | 9/1997 |
| WO | 199803249 | 1/1998 |
| WO | 1999041591 | 8/1999 |
| WO | 2001051588 | 7/2001 |
| WO | 2002038295 | 5/2002 |
| WO | 2006126978 | 11/2006 |
| WO | 2008088294 | 7/2008 |
| WO | 2010/144191 | 12/2010 |
| WO | 2012026302 | 3/2012 |
| WO | 2012062924 | 5/2012 |
| WO | 2012089776 | 7/2012 |
| WO | 2012108584 | 8/2012 |
| WO | 2014053431 | 4/2014 |
| WO | 2014096703 | 6/2014 |
| WO | 2014096704 | 6/2014 |
| WO | 2014191004 | 7/2014 |
| WO | 2014177424 | 11/2014 |
| WO | 2014202815 | 12/2014 |
| WO | 2016167708 | 10/2016 |
| WO | 2017067088 | 4/2017 |
| WO | 2017207976 | 12/2017 |
| WO | 2018017664 | 1/2018 |
| WO | 2018073018 | 4/2018 |
| WO | 2018122274 | 7/2018 |
| WO | 2018148675 | 8/2018 |
| WO | 2018148681 | 8/2018 |
| WO | 2018231105 | 12/2018 |
| WO | 2019053323 | 3/2019 |
| WO | 2019104243 | 5/2019 |
| WO | 2019155183 | 8/2019 |
| WO | 2019178701 | 9/2019 |
| WO | 2020035797 | 2/2020 |
| WO | 2020147461 A1 | 7/2020 |
| WO | 2020160004 | 8/2020 |
| WO | 2021058289 | 4/2021 |
| WO | 2021242488 A1 | 12/2021 |
| WO | 2022106917 A1 | 5/2022 |
| WO | 2022133359 | 6/2022 |
| WO | 2022144495 | 7/2022 |
| WO | 2022149501 | 7/2022 |
| WO | 2022219234 | 10/2022 |
| WO | 2022220991 | 10/2022 |
| WO | 2023020797 | 2/2023 |
| WO | 2023038579 | 3/2023 |
| WO | 2023137304 | 7/2023 |
| WO | 2023164683 | 8/2023 |
| WO | 2023242308 | 12/2023 |
| WO | 2024058933 A1 | 3/2024 |

OTHER PUBLICATIONS

Voutetakis et al., "Computer Application and Software Development for the Automation of a Fluid Catalytic Cracking Pilot

(56)                    References Cited

OTHER PUBLICATIONS

Plant—Experimental Results", Computers & Chemical Engineering, vol. 20 Suppl., S1601-S1606, 1996.
Lloyd's Register, Using technology to trace the carbon intensity of sustainable marine fuels, Feb. 15, 2023.
"Development of Model Equations for Predicting Gasoline Blending Properties", Odula et al., American Journal of Chemical Engineering, vol. 3, No. 2-1, 2015, pp. 9-17.
Pashikanti et al., "Predictive modeling of large-scale integrated refinery reaction and fractionation systems from plant data. Part 3: Continuous Catalyst Regeneration (CCR) Reforming Process," Energy & Fuels 2011, 25, 5320-5344 (Year: 2011).
Swagelok, Grab Sampling Systems Application Guide, 53 pages.
Frank et al., "Fuel Tank and Charcoal Canister Fire Hazards during EVAP System Leak Testing", SAE International, 2007 World Congress, Detroit, Michigan, Apr. 16-19, 2007, 11 pages.
Doolin et al., "Catalyst Regeneration and Continuous Reforming Issues", Catalytic Naptha Reforming, 2004.
Platvoet et al., Process Burners 101, American Institute of Chemical Engineers, Aug. 2013.
Luyben, W. L., Process Modeling, Simulation, and Control for Chemical Engineers, Feedforward Control, pp. 431-433.
Cooper et al., Calibration transfer of near-IR partial least squares property models of fuels using standards, Wiley Online Library, Jul. 19, 2011.
ABB Measurement & Analytics, Using FT-NIR as a Multi-Stream Method for CDU Optimization, Nov. 8, 2018.
Modcon Systems Ltd., On-Line NIR Analysis of Crude Distillation Unit, Jun. 2008.
ABB Measurement & Analytics, Crude distillation unit (CDU) optimization, 2017.
Guided Wave Inc., The Role of NIR Process Analyzers in Refineries to Process Crude Oil into Useable Petrochemical Products, 2021.
ABB Measurement & Analytics, Optimizing Refinery Catalytic Reforming Units with the use of Simple Robust On-Line Analyzer Technology, Nov. 27, 2017, https://www.azom.com/article.aspx?ArticleID=14840.
Bueno, Alexis et al., Characterization of Catalytic Reforming Streams by NIR Spectroscopy, Energy & Fuels 2009, 23, 3172-3177, Apr. 29, 2009.
Caricato, Enrico et al, Catalytic Naphtha Reforming—a Novel Control System for the Bench-Scale Evaluation of Commerical Continuous Catalytic Regeneration Catalysts, Industrial of Engineering Chemistry Research, ACS Publications, May 18, 2017.
Alves, J. C. L., et al., Diesel Oil Quality Parameter Determinations Using Support Vector Regression and Near Infrared Spectroscopy for Hydrotreationg Feedstock Monitoring, Journal of Near Infrared Spectroscopy, 20, 419-425 (2012), Jul. 23, 2012.
Rodriguez, Elena et al., Coke deposition and product distribution in the co-cracking of waste polyolefin derived streams and vacuum gas oil under FCC unit conditions, Fuel Processing Technology 192 (2019), 130-139.
Passamonti, Francisco J. et al., Recycling of waste plastics into fuels, PDPE conversion in FCC, Applied Catalysis B: Environmental 125 (2012), 499-506.
De Rezende Pinho, Andrea et al., Fast pyrolysis oil from pinewood chips co-processing with vacuum gas oil in an FCC unit for second generation fuel production, Fuel 188 (2017), 462-473.
Niaei et al., Computational Study of Pyrolysis Reactions and Coke Deposition in Industrial Naphtha Cracking, P.M.A. Sloot et al., Eds.: ICCS 2002, LNCS 2329, pp. 723-732, 2002.
Hanson et al., An atmospheric crude tower revamp, Digital Refining, Article, Jul. 2005.
Lopiccolo, Philip, Coke trap reduces FCC slurry exchanger fouling for Texas refiner, Oil & Gas Journal, Sep. 8, 2003.
Martino, Germain, Catalytic Reforming, Petroleum Refining Conversion Processes, vol. 3, Chapter 4, pp. 101-168, 2001.
Baukal et al., Natural-Draft Burners, Industrial Burners Handbook, CRC Press 2003.

Spekuljak et al., Fluid Distributors for Structured Packing Colums, AICHE, Nov. 1998.
Hemler et al., UOP Fluid Catalytic Cracking Process, Handbook of Petroleum Refining Processes, 3rd ed., McGraw Hill, 2004.
United States Department of Agriculture, NIR helps Turn Vegetable Oil into High-Quality Biofuel, Agricultural Research Service, Jun. 15, 1999.
NPRA, 2006 Cat Cracker Seminar Transcript, National Petrochemical & Refiners Association, Aug. 1-2, 2006.
Niccum, Phillip K. et al. KBR, CatCracking.com, More Production—Less Risk!, Twenty Questions: Identify Probably Cuase of High FCC Catalyst Loss, May 3-6, 2011.
NPRA, Cat-10-105 Troubleshooting FCC Catalyst Losses, National Petrochemical & Refiners Association, Aug. 24-25, 2010.
Fraser, Stuart, Distillation in Refining, Distillation Operation and Applications (2014), pp. 155-190 (Year: 2014).
Yasin et al., Quality and chemistry of crude oils, Journal of Petroleum Technology and Alternative Fuels, vol. 4(3), pp. 53-63, Mar. 2013.
Penn State, Cut Points, https://www.e-education.psu.edu/fsc432/content/cut-points, 2018.
The American Petroleum Institute, Petroleum HPV Testing Group, Heavy Fuel Oils Category Analysis and Hazard Characterization, Dec. 7, 2012.
Increase Gasoline Octane and Light Olefin Yeilds with ZSM-5, vol. 5, Issue 5, http://www.refiningonline.com/engelhardkb/crep/TCR4_35.htm.
Fluid Catalytic Cracking and Light Olefins Production, Hydrocarbon Publishing Company, 2011, http://www.hydrocarbonpublishing.com/store10/product.php?productid+b21104.
Zhang et al., Multifunctional two-stage riser fluid catalytic cracking process, Springer Applied Petrocchemical Research, Sep. 3, 2014.
Reid, William, Recent trends in fluid catalytic cracking patents, part V: reactor section, Dilworth IP, Sep. 3, 2014.
Akah et al., Maximizing propylene production via FCC technology, SpringerLink, Mar. 22, 2015.
Vogt et al., Fluid Catalytic Cracking: Recent Developments on the Grand Old Lady of Zeolite Catalysis, Royal Society of Chemistry, Sep. 18, 2015.
Zhou et al., Study on the Integration of Flue Gas Waste He Desulfuization and Dust Removal in Civilian Coalfired Heating Furnance, 2020 IOP Conf. Ser.: Earth Environ. Sci. 603 012018.
Vivek et al., Assessment of crude oil blends, refiner's assessment of the compatibility of opportunity crudes in blends aims to avoid the processing problems introduced by lower-quality feedstocks, www.digitalrefining.com/article/10000381, 2011.
International Standard, ISO 8217, Petroleum products—Fuels (class F)—Specifications of marine fuels, Sixth Edition, 2017.
International Standard, ISO 10307-1, Petroleum products—Total sediment in residual fuel oils—, Part 1: Determination by hot filtration, Second Edition, 2009.
International Standard, ISO 10307-2, Petroleum products—Total sediment in residual fuel oils—, Part 2: Determination using standard procedures for aging, Second Edition, 2009.
Ebner et al., Deactivatin and durability of the catalyst for Hotspot™ natural gas processing, OSTI, 2000, https://www.osti/gov/etdeweb/servlets/purl/20064378, (Year: 2000).
Morozov et al., Best Practices When Operating a Unit for Removing Hydrogen Sulfide from Residual Fuel Oil, Chemistry and Technology of Fuels and Oils, vol. 57, No. 4, Sep. 2001.
Calbry-Muzyka et al., Deep removal of sulfur and trace organic compounds from biogas to protect a catalytic methananation reactor, Chemical Engineering Joural 360, pp. 577-590, 2019.
Cheah et al., Review of Mid- to High-Tempearture Sulfur Sorbents for Desulfurization of Biomass- and Coal-derived Syngas, Energy Fuels 2009, 23, pp. 5291-5307, Oct. 16, 2019.
Mandal et al., Simultaneous absorption of carbon dioxide of hydrogen sulfide into aqueous blends of 2-amino-2-methyl-1 propanol and diethanolamine, Chemical Engineering Science 60, pp. 6438-6451, 2005.
Meng et al., In bed and downstream hot gas desulphurization during solid fuel gasification: A review, Fuel Processing Technology 91, pp. 964-981, 2010.

(56)         References Cited

OTHER PUBLICATIONS

Okonkwo et al., Role of Amine Structure on Hydrogen Sulfide Capture from Dilute Gas Streams Using Solid Adsorbents, Energy Fuels, 32, pp. 6926-6933, 2018.

Okonkwo et al., Selective removal of hydrogen sulfide from simulated biogas streams using sterically hindered amine adsorbents, Chemical Engineering Journal 379, pp. 122-349, 2020.

Lerh et al., Feature: IMO 2020 draws more participants into Singapore's bunkering pool., S&P Global Platts, www.spglobal.com, Sep. 3, 2019.

Cremer et al., Model Based Assessment of the Novel Use of Sour Water Stripper Vapor for NOx Control in CO Boilers, Industrial Combustion Symposium, American Flame Research Committee 2021, Nov. 19, 2021.

Frederick et al., Alternative Technology for Sour Water Stripping, University of Pennsylvania, Penn Libraries, Scholarly Commons, Apr. 20, 2018.

Da Vinci Laboratory Solutions B. V., DVLS Liquefied Gas Injector, Sampling and analysis of liquefied gases, https://www.davinci-ls.com/en/products/dvls-products/dvls-liquefied-gas-injector.

Wasson ECE Instrumentation, LPG Pressurization Station, https://wasson-ece.com/products/small-devices/lpg-pressurization-station.

Mechatest B. V., Gas & Liquefied Gas Sampling Systems, https://www.mechatest.com/products/gas-sampling-system/.

La Rivista dei Combustibili, The Fuel Magazine, vol. 66, File 2, 2012.

Zulkefi et al., Overview of H2S Removal Technologies from Biogas Production, International Journal of Applied Engineering Research ISSN 0973-4562, vol. 11, No. 20, pp. 10060-10066, © Research India Publications, 2016.

Seo et al., Methanol absorption characteristics for the removal of H2S (hydrogen sulfide), COS (carbonyl sulfide) and CO2 (carbon dioxide) in a pilot-scale biomass-to-liquid process, Energy 66, pp. 56-62, 2014.

Abdolkarimi Vahid et al: "Robust prediction and optimization of gasoline quality using data-driven adaptive modeling for a light naphtha isomerization reactor", Fuel, IPC Sience and Technology Press, Guildford, GB, vol. 328, Jul. 19, 2022 (Jul. 19, 2022).

Arce-Medina E et al: "Artificial neural network modeling techniques applied to the hydrodesulfurization process", Mathematical and Computer Modelling, Pergamon Press, Oxford, GB, vol. 49, No. 1-2, Jan. 1, 2009 (Jan. 1, 2009), pp. 207-214.

Chen Xiangmeng et al: "Machine learning-based optimization of catalytic hydrodeoxygenation of biomass pyrolysis oil", Journal of Cleaner Production, vol. 437, Jan. 1, 2024 (Jan. 1, 2024), p. 140738.

Dowell Christian: "Machine Learning for Downstream Oil and Gas Refineries: Applications for Solvent Deasphalting", Sep. 1, 2021 (Sep. 1, 2021), XP093319404, Retrieved from the Internet: URL:https://dspace.mit.edu/bitstream/handle/1721.1/140074/dowell-cedowell-sm-sdm-2021-thesis.pdf?sequence=1&isAllowed=y, retrieved on Sep. 26, 2025.

Enikeeva L V et al: "Solving inverse problems of chemical kinetics by metaheuristic methods", Reaction Kinetics, Mechanisms and Catalysis, Springer International Publishing, Cham, vol. 135, No. 1, Jan. 7, 2022 Jan. 7, 2022), pp. 123-133.

Faber Rastislav et al: "Machine Learning-based Classification of Online Industrial Datasets", 2023 24TH International Conference On Process Control (PC), IEEE, Jun. 6, 2023 (Jun. 6, 2023), pp. 132-137.

International Search Report and Written Opinion received in PCT/US2025/031963, mailed Sep. 22, 2025, 10 pages.

International Search Report and Written Opinion received in PCT/US2025/031964, mailed Oct. 10, 2025, 11 pages.

International Search Report and Written Opinion received in PCT/US2025/031965, mailed Oct. 2, 2025, 12 pages.

International Search Report and Written Opinion received in PCT/US2025/031966, mailed Sep. 26, 2025, 10 pages.

International Search Report and Written Opinion received in PCT/US2025/031968, mailed Oct. 10, 2025, 10 pages.

International Search Report and Written Opinion received in PCT/US2025/031970, mailed Sep. 26, 2025, 8 pages.

International Search Report and Written Opinion received in PCT/US2025/031972, mailed Oct. 10, 2025, 11 pages.

International Search Report and Written Opinion received in PCT/US2025/031976, mailed Oct. 7, 2025, 11 pages.

Invitation to Pay Additional Fees, received in PCT/US2025/031974, mailed Oct. 2, 2025, 9 pages.

Saha Biswajit et al: "Microwave-assisted solvent deasphalting of heavy fuel oil and process parameters optimization", Fuel, IPC Sience and Technology Press , Guildford, GB, vol. 351, Jun. 11, 2023 (Jun. 11, 2023).

Saidi Majid et al: "Catalytic upgrading of 4-methylaniosle as a representative of lignin-derived pyrolysis bio-oil: Process evaluation and optimization via coupledapplication of design of experiment and artificial neural networks", International Journal of Hydrogen Energy, Elsevier Ltd, Amsterdam, NL, vol. 46, No. 12, Jan. 3, 2021 (Jan. 3, 2021), pp. 8411-8430.

Samad Abdul et al: "Prediction and optimization of exergetic efficiency of reactive units of a petroleum refinery under uncertainty through artificialneural network-based surrogate modeling", Process Safety and Environmental Protection, Institution of Chemical Engineers, Rugby, GB, vol. 177, Aug. 1, 2023 (Aug. 1, 2023), pp. 1403-1414.

Taoufiq Gueddar et al: "Disaggregation aggregation based model reduction for refinery-wide optimization", Computers & Chemical Engineering, Pergamon Press, Oxford, GB, vol. 35, No. 9, Apr. 28, 2011 (Apr. 28, 2011), pp. 1838-1856.

Tian Yuntao et al: "Optimized Artificial Neural Network for Evaluation: C4 Alkylation Process Catalyzed by Concentrated Sulfuric Acid", Acs Omega, [Online]vol. 7, No. 1, Dec. 23, 2021 (Dec. 23, 2021), pp. 372-380.

Xu Dan et al: "Machine learning-driven prediction and optimization of monoaromatic oil production from catalytic co-pyrolysis of biomass and plastic wastes", Fuel,vol. 350, Oct. 1, 2023 (Oct. 1, 2023), p. 128819.

* cited by examiner

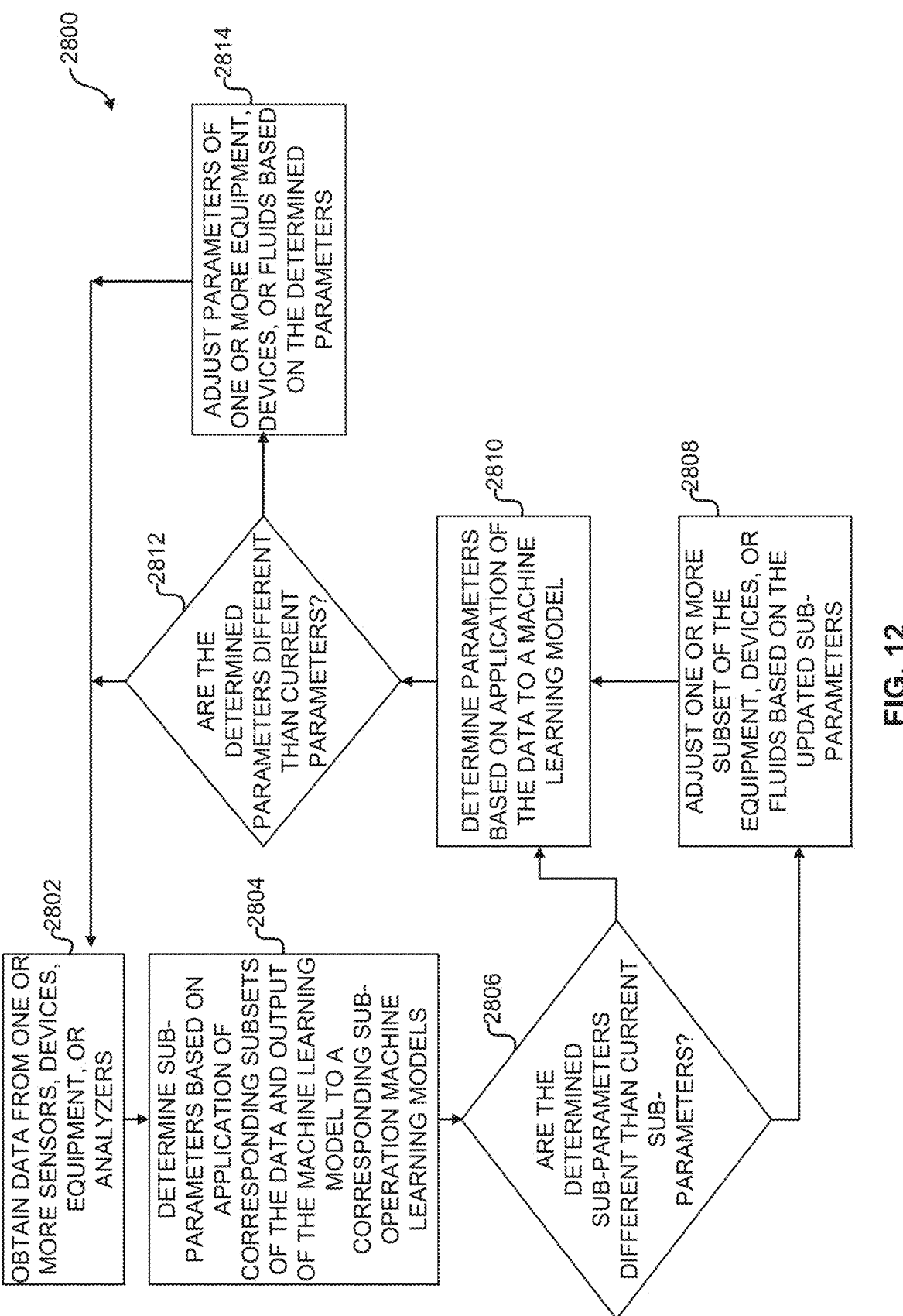

2802
OBTAIN DATA FROM ONE OR MORE SENSORS, DEVICES, EQUIPMENT, OR ANALYZERS

2804
DETERMINE SUB-PARAMETERS BASED ON APPLICATION OF CORRESPONDING SUBSETS OF THE DATA AND OUTPUT OF THE MACHINE LEARNING MODEL TO A CORRESPONDING SUB-OPERATION MACHINE LEARNING MODELS

2806
ARE THE DETERMINED SUB-PARAMETERS DIFFERENT THAN CURRENT SUB-PARAMETERS?

2808
ADJUST ONE OR MORE SUBSET OF THE EQUIPMENT, DEVICES, OR FLUIDS BASED ON THE UPDATED SUB-PARAMETERS

2810
DETERMINE PARAMETERS BASED ON APPLICATION OF THE DATA TO A MACHINE LEARNING MODEL

2812
ARE THE DETERMINED PARAMETERS DIFFERENT THAN CURRENT PARAMETERS?

2814
ADJUST PARAMETERS OF ONE OR MORE EQUIPMENT, DEVICES, OR FLUIDS BASED ON THE DETERMINED PARAMETERS

SYSTEMS, ANALYZERS, CONTROLLERS, AND ASSOCIATED METHODS TO ENHANCE FLUID SEPARATION FOR DISTILLATION OPERATIONS

CROSS-REFERENCE TO RELATED APPLICATIONS

This application claims priority to, and the benefit of U.S. Provisional Application No. 63/660,196, filed Jun. 14, 2024, titled "SYSTEMS, ANALYZERS, CONTROLLERS, AND ASSOCIATED METHODS TO ENHANCE FLUID PRODUCTION OF REFINING OPERATIONS," U.S. Provisional Application No. 63/658,825, filed Jun. 11, 2024, titled "SYSTEMS, ANALYZERS, CONTROLLERS, AND ASSOCIATED METHODS TO ENHANCE FLUID PRODUCTION OF REFINING OPERATIONS," and U.S. Provisional Application No. 63/655,589, filed Jun. 3, 2024, titled "SYSTEMS, ANALYZERS, CONTROLLERS, AND ASSOCIATED METHODS TO ENHANCE FLUID PRODUCTION OF REFINING OPERATIONS," the disclosures of which are incorporated herein by reference in their entireties.

FIELD OF DISCLOSURE

The disclosure herein relates to systems, analyzers, controllers, and associated methods to enhance fluid production for refining operations and to systems, analyzers, controllers, and associated methods to enhance fluid separation for distillation operations using machine learning models during the distillation operations.

BACKGROUND

Many and varied operations are executed continuously and simultaneously at a refinery. Each operation affects each subsequent operation or sub-operation. For example, if an operation is based on reaching selected distillation cut points, reaching those distillation cut points may affect properties of product produced downstream and/or operation parameters for other processes upstream and/or downstream. Additionally, further upstream operations may not be suited for production of that particular product or may, at least, cause other operations to produce that product in an inefficient manner. Additionally, a variety of feedstock is utilized at a refinery. Even further, different batches or portions of one feedstock may vary over time, for example, different portions of a feedstock may include different properties and/or contents over time. Optimization (in other words, efficient and accurate production of targeted products) of such operations and feedstock poses a significant challenge when attempting to meet a target product, particularly over a period time, as equipment and materials used in the operation change over time. Such problems pose further difficulties since updating one operation affects every other operation at the refinery.

Controllers and monitoring devices may be utilized at a refinery in an attempt to optimize (in other words, efficiently and accurately produce targeted products) those operations. However, those controllers and monitoring devices utilize algorithms that require expert personnel and that take extended amounts of time to execute. For example, first-principles models require expert personnel to ensure that each first-principles model is calculating a vector of values to accurately reflect the process, in other words, expert personnel are required to maintain the first-principles model.

Further still, the equipment utilized at one refinery may experience a different service or maintenance cycle than equipment at another refinery. Such factors further complicate any attempt at uniform optimization at a plurality of refineries.

SUMMARY

Thus, in view of the foregoing, Applicant has recognized these problems, among other problems, in the art, and has recognized a need for systems, analyzers, controllers, and associated methods for enhancing fluid production for refinery operations. Particularly, the present disclosure relates to systems, analyzers, controllers, and associated methods to enhance fluid production of refining operations and sub-operations using machine learning models during the refining operations and sub-operations. Further, the present disclosure relates to systems, analyzers, controllers, and associated methods to enhance fluid separation for distilling operations. Such fluids may include hydrocarbons and/or renewable hydrocarbons and fluid production may include, for example, production of transportation fuel, among other products.

The disclosure herein provides embodiments of systems, analyzers, controllers, and associated methods for enhancing fluid production and/or separation of ongoing and/or continuous refining operations, as well as refining sub-operations. Such systems, analyzers, controllers, and associated methods may include obtaining data corresponding to a refinery operation from one or more sources, such as sensors, analyzers, refining equipment, devices and/or other sources. The data, along with, in some embodiments, a target product, may then be applied to a machine learning model to produce an output indicative of or including parameters that indicate settings for the devices and/or refining equipment to be set to, to accurately achieve or produce the targeted product. Such a machine learning model may be utilized to simulate operations of the sensors, analyzers, refining equipment, devices and/or other sources based on that current captured data and based on training with historical data.

Accordingly, an embodiment of the disclosure is directed to a system for enhancing fluid separation for a distillation operation. The system may include one or more distillation columns to receive a feed and separate the feed into a plurality of products. The products may include one or more distillates and/or a bottom or residue. The system may include a plurality of sensors to measure a parameter associated with the one or more distillation columns and each positioned at one of (a) proximate the one or more distillation columns or (b) within the one or more distillation columns. The system may include a plurality of operation control devices each positioned proximate and downstream or upstream of the one or more distillation columns and to control aspects of fluid flowing to or from the one or more distillation columns. The system may include one or more sample collection assemblies to collect samples of one or more of the (a) feed or (b) one or more of the plurality of products. The system may include one or more sample analysis assemblies to analyze each collected sample to provide properties of collected samples. The system may include a distillation controller in signal communication with the one or more distillation columns, the plurality of sensors, the plurality of operation control devices, and the one or more sample analysis assemblies, and including, storing, or connected to or in communication with a trained machine learning model. In addition, this system may include signal communication to other associated refinery process equipment such as fired heaters, heat or heater exchangers, and/or feed controllers, among other components, to be manipulated or monitored to achieve the desired fluid separation. The distillation controller may be configured to determine an output including predicted properties of one or more of (a) the feed (b) one or more of the plurality of products and parameter settings of the plurality of operation control devices and the one or more distillation columns based on application of one or more of (i) data measured by the plurality of sensors, (ii) data corresponding to analysis from the one or more sample analysis assemblies, or (iii) a target product and corresponding target properties to the trained machine learning model. The distillation controller may adjust one or more of an amount of feed or type of feed and parameters associated with the plurality of operation control devices and the one or more distillation columns based on the output to enhance separation of the feed into one or more of (A) one or more of the plurality of products.

In an embodiment, the one or more distillation columns may include an absorber and/or a stripper configured to separate feed into C3 and lighter hydrocarbons and/or heavier hydrocarbons/bottoms. Another one of the one or more distillation columns may comprise a depropanizer or a debutanizer positioned downstream of the absorber or the stripper. The trained machine learning model may generate the predicted properties of the one or more of (a) the feed (b) one or more of the plurality of products and the parameter settings of the plurality of operation control devices and the one or more distillation columns based on one or more of a selected amount of heavies included in the C3 and lighter hydrocarbons and heavier hydrocarbons/bottoms or an amount of energy utilized by the absorber or stripper.

In another embodiment, the one or more distillation columns may comprise a propylene splitter configured to separate Refinery Grade Propylene (RGP) into Polymer Grade Propylene (PGP) and other products. The trained machine learning model may generate the predicted properties of the one or more of (a) the feed or (b) one or more of the plurality of products and the parameter settings of the plurality of operation control devices and the one or more distillation columns based on one or more of a selected amount and properties of PGP and RGP or an amount of energy utilized by the one or more distillation columns.

In another embodiment, the one or more distillation columns may comprise a crude preflash column, an atmospheric crude distillation tower, and a vacuum tower configured to separate crude oil into a plurality of fractions. The trained machine learning model may generate the predicted properties of the one or more of (a) the feed, (b) one or more of the plurality of products, or (c) the bottoms and the parameter settings of the plurality of operation control devices and the one or more distillation columns. The distillation columns may include a light ends recovery section with associated refinery process equipment needed to optimally separate naphtha range and lighter material into products.

In another embodiment, the feed may comprise one or more of a hydrocarbon-based fluid or renewable feedstock. Renewable feedstock may include fluids obtained from biomass sources or derived from plants and/or animals, such as plant crops, plant waste or by-products, and/or animal waste or by-products. For example, a renewable feedstock may include vegetable oil, used cooking oil, and animal fat or tallow, among other fluids. The plurality of products separated from the feed by the distillation operation may comprise one or more of a transportation fuel, a fluid component for the transportation fuel, or transportation fuel by-products. The transportation fuel may comprise one or more of gasoline, diesel, low sulfur diesel, ultra-low sulfur diesel, jet, or renewable diesel, bio-diesel, renewable jet, or renewable gasoline.

In another embodiment, the sample analysis assembly may include one or more of a spectrographic analyzer or a chromatographic analyzer. The sample analysis assembly may include one of an on-line analyzer or a lab-based analyzer.

In another embodiment, the data utilized to train the trained machine learning model may include historical data produced by the one or more distillation columns, historical data measured by the plurality of sensors, and analysis from the one or more sample analysis assemblies of fluid flowing to and from the one or more distillation columns. The plurality of operation control devices may comprise one or more of a steam source, a furnace, heat exchanger, condenser, boiler, reboiler, induction coil, fans, a cooling device, a pump, valve, control valve, a compressor, a pump, or a let-down station.

Another embodiment of the disclosure is directed to a method for enhancing fluid separation for a distillation operation. The method may include obtaining data for a plurality of ongoing and continuous distillation operations from one or more of (a) a plurality of sensors or (b) a plurality of analyzers configured to analyze fluid output via the distillation operations. The method may include determining one or more parameters for each one or more of one or more distillation columns or distillation control devices based on application to a machine learning model of one or more of (a) an output from one or more other machine learning models corresponding to another refinery process, (b) current data, (c) predicted properties of feed, (d) an actual product output and product properties of the distillation operations, (e) a predicted amount and properties of product output from the distillation operations, (f) target product properties, or (g) data indicative of product targets from one or more of one or more refinery controllers or refinery sub-controllers corresponding to other refinery processes. The method may include, in response to determination of the one or more parameters, operating each of the one or more distillation columns or distillation control devices based on the one or more parameters, thereby to enhance operation of the one or more distillation columns. The adjustments may occur during execution of the distillation operations.

In an embodiment, the data may include one or more of (a) a type of and properties related to feed of one of the plurality of ongoing and continuous distillation operations, (b) a product of one of the plurality of ongoing and continuous distillation operations, (c) an output of one of the plurality of ongoing distillation operations, or (d) analysis of inputs and outputs for one or more of the plurality of ongoing distillation operations. =The trained machine learning model may comprise a neural network. Training the machine learning models may include obtaining historical data corresponding to a selected distillation operation and each particular distillation column utilized in the selected distillation operation at a selected plant; normalizing the historical data; removing data corresponding to abnormal operations from the historical data; removing undesired data; training one of the machine learning models with a selected percentage of the historical data (to form a trained machine learning model); testing the one of the trained machine learning models with a remaining percentage of historical data; and transmitting a resulting trained machine learning model to a corresponding one or more controllers. The historical data may include properties, instrument indications or indicators (or other data), and/or analysis input and output from each particular distillation column and associated equipment, parameters for corresponding devices, and an outcome (in other words, a resulting and/or desired product or products from the distillation operation).

In embodiments, the data from the plurality of analyzers may include a spectrum indicating chemical properties of a sampled fluid. The data from the plurality of analyzers may include data obtained at a selected time interval. Data from one or more sensors may include data obtained continuously and in real-time.

In another embodiment, one or more analyzers may provide a spectra indicative of fluid properties. The one or more analyzers may be calibrated to generate standardized spectral responses. The one or more analyzers comprise one or more of a spectroscopic analyzer or a chromatographic analyzer.

In another embodiment, the predicted properties of feed may include one or more of an API gravity, UOP K factor, distillation points, Coker gas oil content, carbon residue content, nitrogen content, sulfur content, paraffins, olefins, thiophene content, single-ring aromatics content, dual-ring aromatics content, and/or naphthenes.

Another embodiment of the disclosure is directed to a distillation unit control assembly to enhance control of a distillation operation associated with a petroleum refining operation. The distillation unit control assembly may include a first analyzer. The first analyzer may be positioned or configured to (i) receive a hydrocarbon feedstock sample of a hydrocarbon feedstock supplied to one or more distillation columns associated with the petroleum refining operation; and (ii) analyze the hydrocarbon feedstock sample to provide hydrocarbon feedstock sample properties. The distillation unit control assembly may include an operations controller in communication with the first analyzer, a plurality of sensors to measure a parameter associated with the one or more distillation columns, and a plurality of operation control devices each positioned proximate and downstream or upstream of the one or more distillation columns. The operations controller may be configured to (i) obtain parameters from the plurality of sensors and settings from the operation control devices, (ii) predict updated settings for the operation control devices based on the hydrocarbon feedstock sample properties and application of one or more of (A) the hydrocarbon feedstock sample properties, (B) the parameters from the plurality of sensors, (C) the settings from the operation control devices, or (D) one or more target properties of one or more downstream materials to a first trained machine learning model; and (iii) control, during the distillation operation, based on the one or more hydrocarbon feedstock sample properties, one or more of: (aa) one or more hydrocarbon feedstock parameters associated with the hydrocarbon feedstock supplied to the one or more distillation columns; (bb) the one or more hydrocarbon feedstock properties associated with the hydrocarbon feedstock supplied to the one or more distillation columns; (cc) one or more unit properties associated with the fluids separated from the hydrocarbon feedstock by the one or more distillation columns; (dd) operation of the one or more distillation columns; or (ee) operation of one or more processing units positioned at one or more of downstream or upstream of the one or more distillation columns. The controlling during the distillation operation may cause the distillation operation to one or more of (aa) separate one or more fluids from the hydrocarbon feedstock and each of the fluids having one or more properties within a selected range of one or more target properties of the one or more intermediate materials or (bb) produce one or more downstream materials each having one or more properties within a selected range of one or more target properties of the one or more downstream materials, thereby to cause the distillation operation to achieve material outputs that more accurately and responsively converge on one or more of the target properties.

In another embodiment, the distillation unit control assembly may use or include a second analyzer. The second analyzer may be positioned or configured to (i) receive a unit material sample of one or more unit materials, and (ii) analyze the unit material sample to provide unit material sample properties. The operations controller may be further configured to: predict one or more unit material sample properties associated with a unit material sample comprising one or more fluids separated from the hydrocarbon feedstock based on the unit material sample properties and application of the unit material sample properties to a second trained machine learning model.

In embodiments, the operations controller may be further configured to control, during the distillation operation, based on the one or more unit sample properties, the one or more of: (aa) the one or more hydrocarbon feedstock parameters associated with the hydrocarbon feedstock supplied to the one or more distillation columns; (bb) the one or more hydrocarbon feedstock properties associated with the hydrocarbon feedstock supplied to the one or more distillation columns; (cc) the one or more unit properties associated with the fluids separated from the hydrocarbon feedstock by the one or more distillation columns; (dd) the operation of the one or more distillation columns; or (ee) the operation of one or more processing units positioned at one or more of downstream or upstream of the one or more distillation columns. The operations controller may further be configured to control content of the hydrocarbon feedstock.

In embodiments, analysis of the hydrocarbon feedstock sample may be performed on-line and in real-time. Analysis of the hydrocarbon feedstock sample may be performed off-line in a laboratory setting. Analysis of the unit material sample may be performed on-line and in real-time. Analysis of the unit material sample may be performed off-line in a laboratory setting.

In another embodiment, the operations controller may be configured to control one or more operation parameters. The one or more operation parameters may include (a) a flow rate of the hydrocarbon feedstock supplied to the one or more distillation columns; (b) a pressure of the hydrocarbon feedstock supplied to the one or more distillation columns; or (c) a preheating temperature of the hydrocarbon feedstock supplied to the one or more distillation columns.

Another embodiment of the disclosure is directed to a controller to enhance fluid separation for a distillation operation. The controller may include a first plurality of inputs each in signal communication with one of a plurality of sensors to measure a set of first parameters associated with aspects of the distillation operation. The controller may include a second plurality of inputs each in signal communication with one or more analyzers to analyze and provide properties of samples of fluids input to and output from each of one or more distillation columns. The controller may include a first plurality of inputs/outputs each in signal communication with the one or more distillation columns and a plurality of distillation control devices. The controller may be configured to: receive a set of second parameters associated with each of the one or more distillation columns and each of the plurality of distillation control devices;

transmit instructions and selected parameters to cause each of the one or more distillation columns and each of the plurality of distillation control devices to operate at the selected parameters; apply one or more of the set of first parameters, the set of second parameters, or the properties to a trained machine learning model; and determine an adjusted one or more inputs or operating parameters based on application of data received from the plurality of sensors, the one or more analyzers, the one or more distillation columns, and the plurality of distillation control devices; and adjust a type and amount of fluid input into the one or more distillation columns and distillation control device parameters based on the adjusted one or more inputs or operating parameters.

The controller may further include a second plurality of inputs/outputs each in signal communication with one of a plurality of other controllers each configured to control one of (a) one of a plurality of refining sub-operations or (b) a refining operation. In further embodiments, determination of the adjusted one or more inputs or operating parameters may be further based on data received from each of the plurality of other controllers via the second plurality of inputs/outputs. The trained machine learning model may include one or more of a machine learning model trained based on application of historical data to one or more non-linear functions or linear functions or an ensemble machine learning model.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

FIG. 12 is a flow chart illustrating enhanced fluid production at a refinery, according to an embodiment of the disclosure.

DETAILED DESCRIPTION

Figure 1A:
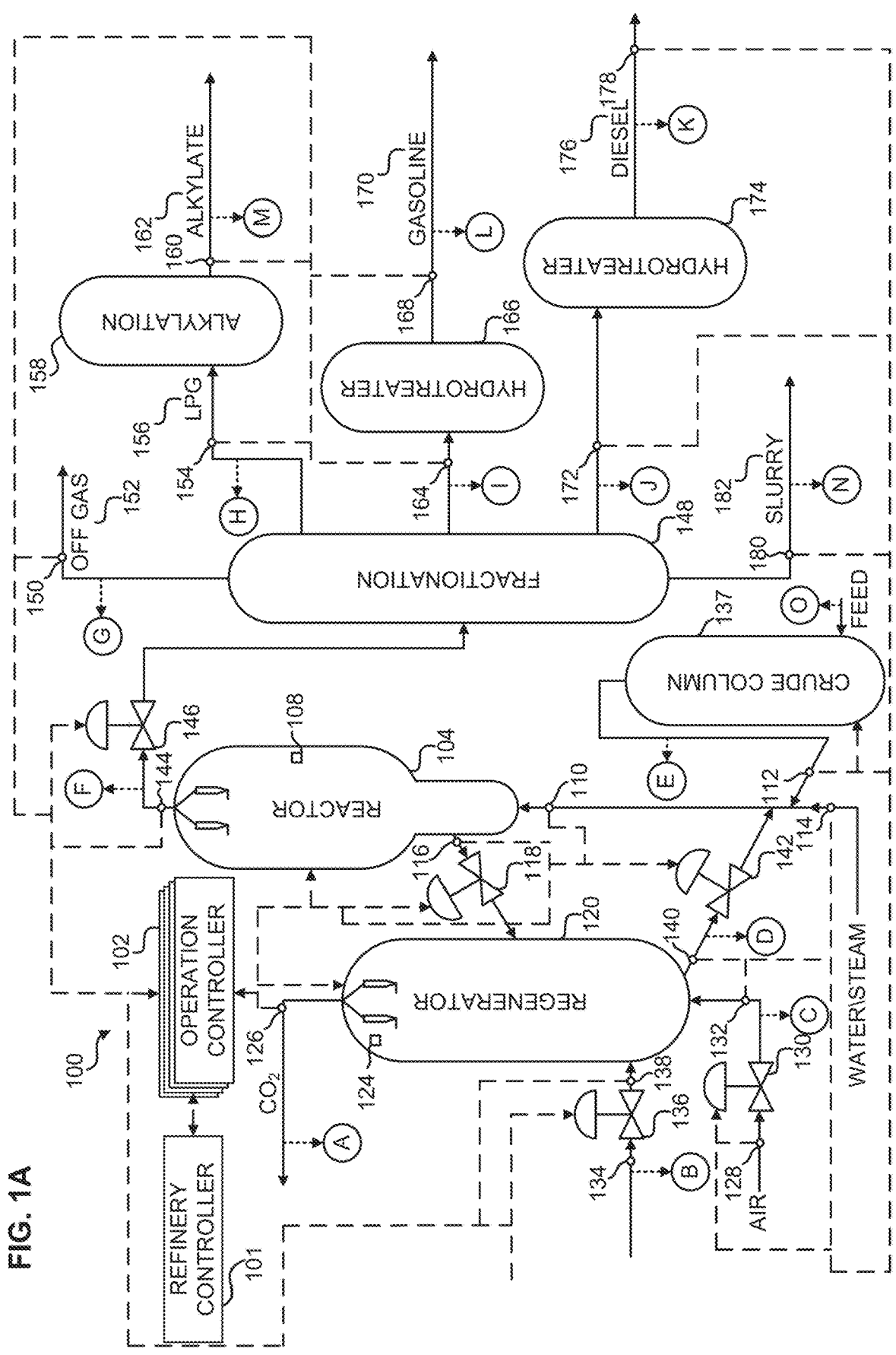
FIG. 1A and FIG. 1B are simplified diagrams of a refining control system to enhance fluid production at a refinery, according to an embodiment of the disclosure.

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The disclosure herein provides embodiments of systems, analyzers, controllers, and associated methods for enhancing fluid production of ongoing and/or continuous refining operations, as well as refining sub-operations. Such systems, analyzers, controllers, and associated methods may include obtaining data corresponding to a refinery operation from one or more sources, such as sensors, analyzers, refining equipment, refining operation control devices, other devices, and/or other sources. The data, along with, in some embodiments, a target product, may then be applied to a machine learning model to produce an output indicative of or including parameters that indicate settings for the refining operation control devices and/or refining equipment to be set to, to accurately achieve or produce the targeted product. Such an application of data to a trained machine learning model may occur at one or more different layers in the control system of the refinery. Further, a plurality of controllers positioned throughout the refinery may each include a plurality of trained machine learning models that are trained to enhance fluid production of one or more refinery operations or sub-operations. In other embodiments, such trained machine learning models may output a simulation of a refinery or portion of a refinery. That output may be utilized to drive control of various processes within the refinery.

In embodiments, the refining operations and/or sub-operations may include the processing, converting, refining, enhancing and/or otherwise altering a fluid via the refining operation or sub-operation. The fluid may include a hydrocarbon and/or renewable fluid or feedstock and final product may include a transportation fuel. "Hydrocarbons" or "hydrocarbon fluids" as used herein, may refer to petroleum fluids, renewable fluids, and other hydrocarbon based fluids. "Petroleum fluids" as used herein, may refer to fluid products containing crude oil, petroleum products, natural gas, renewable liquids and/or gasses, and/or distillates or refinery intermediates. For example, crude oil contains a combination of hydrocarbons having different boiling points that exists as a viscous liquid in underground geological formations and at the surface. Petroleum products, for example, may be produced by processing crude oil and other liquids at petroleum refineries, by extracting liquid hydrocarbons at natural gas processing plants, and by producing finished petroleum products at industrial facilities. For example, a petroleum product may include a transportation fuel, among other products. Refinery intermediates, for example, may refer to any refinery hydrocarbon that is not crude oil or a finished petroleum product (such as gasoline), including all refinery output from distillation (for example, distillates or distillation fractions) or from other conversion units. In some non-limiting embodiments of systems and methods, petroleum fluids may include heavy blend crude oil used at a pipeline origination station, natural gas, and/or other types of crude oil, as will be understood by one skilled in the art. Heavy blend crude oil is typically characterized as having an American Petroleum Institute (API) gravity of about 30 degrees or below. In other embodiments, the petroleum fluids may include lighter blend crude oils, for example, having an API gravity of greater than 30 degrees. "Renewable fluids" or "renewable feedstock" as used herein, may refer to fluid products containing plant and/or animal derived feedstock. Further, the renewable fluids may be hydrocarbon based. For example, a renewable fluid may be a pyrolysis oil, oleaginous feedstock, biomass derived feedstock, natural gas or other liquids or gasses, as will be understood by those skilled in the art. The API gravity of renewable liquids may vary depending on the type of renewable liquid.

In an embodiment, the systems and methods may include a computing device, apparatus and/or controller to obtain various data points and/or parameters to train a machine learning model. Such data may include a historical data set and/or a currently generated data set including an outcome. In another embodiment, the data set may include a simulated and/or filled-in data set. For example, a refinery may be modeled based on a first-principles model and synthetic or pseudo-data may be generated for a selected time interval (for example, 1 month, 2 months, 6 months, 1 year, or even longer) for a range of variable values that span one or more operations. For such a pseudo or synthetic data set, random perturbations may be utilized to simulate an actual data set. In another embodiment, the data may include a partial data set. In such an embodiment, the partial data set, may be filled in via a first-principles model and/or a machine learning model. Each data set may include a series of parameters, properties, spectra, and/or other data points associated with a refining operation or process or sub-operation or sub-process (for example, a distillation operation). Each data set may also include target parameters, target properties, and/or an outcome and/or target product. Further, in an embodiment where a supervised machine learning model is utilized, each outcome may be classified as a positive or negative outcome or marked in a manner to indicate desirability of the outcome. In other embodiments, the function generated by a set of data may indicate a desired outcome, based on a maximum or minimum point in that function, thus enabling a machine learning model to determine desired parameters based on that maximum or minimum, or based on some other factor in other embodiments. In yet another embodiment, a trained machine learning model may learn or be trained based on trends included in the data (in other words, the trained machine learning model may comprise a deep learning model). In another embodiment, any of the trained machine learning models described herein may predict and/or optimize target parameters and/or fluids used within a refinery, refinery operation, or refinery sub-operation.

Once these data sets have been received by, for example, a computing device, the computing device may pre-process the data (in other words, the computing device may automatically pre-process the data and/or a user, via the computing device, may pre-process the data). For example, the computing device (and/or a user via the computing device) may normalize the data (in other words, remove data points that appear to be outliers), remove data corresponding to abnormal events (for example, data generated during start-up, shut-down, turn-arounds, and/or upsets), remove undesired data, remove invalid measurements, and/or segregate the data set into sequences of contiguous data based on selected time intervals (for example, time intervals of 30 minutes, 1 hour, 2 hours, and/or 3 hours, or more or less than the time intervals listed).

Once the data has been pre-processed, the computing device may begin training a model based on a portion of the data set. Such an operation may be automatically performed via the computing device and/or by a user via the computing device. For example, the controller may utilize an 80/20 training and testing process. Other percentages may be utilized in training, testing, and/or validation. As the model is fed data, the model may compare data received to the outcome (in other words, whether the outcome was desired based on some factor, such as an indicated positive/negative flag or classification, based on some maximum or minimum of a function generated based on the data, or based on a trend within the data). Once the training portion of data has been utilized, the computing device (and/or a user via the computing device) may test and/or validate the model using the remining portion of the data set. If such testing or validation does not achieve a selected error rate or reach some other error and/or accuracy based threshold, then the computing device (and/or a user via the computing device) may re-train or refine the model using a different and/or randomized portion of the data set and a remaining portion of the data set for testing. Once a model or classifier has reached that threshold, then the computing device may output the trained machine learning model or classifier for further use.

The resulting machine learning model of the process may be utilized in and/or used to develop a controller. The controller may include or may be a machine learning model that considers economics and process and/or operation data or the controller may use the model in an online optimization that considers economics and/or operation data.

Further, a trained machine learning model may be further refined using new data, as such data is generated. Such a refinement may occur while the trained machine learning model is in use. In another embodiment, the trained machine learning model may be refined in an offline environment. In another embodiment, two instances of a trained machine learning model may exist, one stored as an offline copy, while the other is utilized during refining operations. In such an embodiment, the offline copy may be refined and, if testing and/or error rating meets a selected threshold, in addition to other factors, then a controller may replace the version currently utilized to the refined version.

It will be understood that such systems and methods described herein may utilize one or more trained machine learning models or classifiers (also referred to as trained models or classifiers). For example, a model or classifier may be trained for each specific operation or process, as well as each particular piece of equipment, at a refinery, such as fluid catalytic cracking (FCC) operations or processes, hydrocracking operations or processes, reforming operations or processes, alkylation operations or processes, isomerization operations or processes, hydrotreating operations or processes, distillation operations or processes, blending operations or processes, hydrodeoxygenation operations or processes, steam management, hydrogen coordination or management, absorption, propylene splitting operations or processes, aromatic recovery, sulfur recovery, coker unit operations, feed optimization, IMO blending, hydrodeoxygenation, hydrocracker operations, other blending operations, Residuum Oil Supercritical Extraction (ROSE) operation, solvent deasphalting (SDA) operation, operations or processes for formation of specific fuels, and/or the refining operation or process overall (which may, in an embodiment, utilize outputs from models associated with each sub-operation or sub-process). The use of terms operation and process refers to the steps taken to produce a particular product from a selected feedstock (and, in some embodiments, other inputs). As such, when referring to a particular refining operation or process, the terms "operation" and "process" may be used interchangeably. Further, such models may be trained specifically for equipment at a particular plant or refinery. For example, a FCC unit at a first plant may exhibit different characteristics than that of a FCC unit at a second plant. Thus, a model trained for one may not work for the other and training a model for either FCC unit may include utilization of historical data corresponding to that FCC unit. Various aspects of one model may be utilized to train other models for other similar equipment though.

Once a model is available, the controller, one or more sub-operation controllers or sub-controllers, and/or one or more operation controllers including a local enhancement or optimization module or circuitry, predictive controls, and/or equipment and device controls may begin optimizing, enhancing, and/or adjusting an operation and/or parameters associated with that operation, in real-time and/or continuously or substantially continuously, at a refinery. In such embodiments, the controller may obtain data from a plurality of sensors, a plurality of refining operation control devices (such as flow control devices, temperature control devices, pressure control devices, and/or other device configured to control an aspect of a refining operation), equipment at the refinery (in other words, refining equipment), and/or one or more sample analyzers and/or, in some embodiments, one or more sub-operation controllers or sub-controllers. In another embodiment, one or more operation controllers may obtain such data, as well as target products and/or other factors or parameters from a refinery controller or platform.

As noted, one input to any of the models described herein may include spectra or properties of feedstock, intermediaries, products or outputs, and/or other fluids or materials utilized in a refinery, determined via one or more of a spectrographic analyzer or a chromatographic analyzer. Further, the analyzer may include an on-line analyzer (for example, to analyze samples in real time) or a lab-based analyzer. The controller or controllers may work in conjunction with such an analyzer to further enhance fluid production (for example, transportation fuel, hydrocarbon based fluid products, and/or other fluids produced during a refining operation) of the refining operation or sub-operation. As such, spectrographic analyzers may be calibrated or standardized and results may be obtained in a faster than typical timeframe, thus enabling prompt acquisition of fluid properties. For example, for any operation described herein, the controller may obtain spectrographic or chromatographic analysis of any feedstock utilized, any intermediaries produced, and/or any products produced by first initiating sample collection. Once a sample has been obtained, the controller and/or an analyzer may initiate analysis of the sample.

Once the controller or controllers has/have obtained data related to each operation and/or analysis of one or more fluids associated with the operation, then the controller may apply such data and analysis to a corresponding machine learning model or classifier. The output of the model or classifier may indicate adjustment of one or more devices or refining operation control devices and/or refining equipment and/or adjustment of a feedstock or intermediary used in the operation or sub-operation. In some embodiments, the output may include targets and/or properties for a feedstock and/or blend of feedstock. In another embodiment, the output may be in the form of a vector, each component of the vector corresponding to a value associated with a parameter of equipment or a device or refining operation control device. In an embodiment, a refining operation control device may comprise or include a temperature control device (such as a furnace, heat exchanger, condenser, boiler, reboiler, induction coil, fans, a cooling device, and/or other device capable of adjusting the temperature of a fluid and/or the temperature within refining equipment), a flow control device (such as a pump, valve, control valve, and/or other device capable of adjusting the flow rate of a fluid), a pressure control device (such as a compressor, a pump, a let-down station or valve, and/or another device configured to adjust the pressure of a fluid), and/or other devices configured to adjust some aspect of a fluid and/or aspect of refining equipment. In another embodiment, the output of the model may include a simulation of one or more operations or sub-operations via a selected refinery or portion of a selected refinery. In such embodiments, the simulation may include various settings and parameters and the output or product of equipment at those particular settings. Controllers positioned at and/or throughout a refinery may be utilized to drive settings of the devices or equipment therein based on that simulation.

Once the controller has the output of the model, the controller may adjust the relevant aspects of the refining operation. For example, the controller may adjust components of a blend utilized in a feedstock, settings for various refining operation control devices (such as temperature, pressure, flow rate, and/or another aspect associated with a fluid and/or device), use of hydrogen, recovery of selected fluids or materials, and/or use of other fluids or materials (for example, a catalyst), among other adjustments.

In another embodiment, the controller may optimize an operation based on the current demand for selected products. For example, for a particular targeted product, selected amounts of feed and/or intermediaries may be utilized, increasing the demand for that feed and/or intermediaries. In other embodiments, demand may be a factor utilized in training a model or classifier. For example, a selected product may experience increased demand at varying times or a particular feedstock, used to produce a particular product, may be in high demand. Data indicating such demand may be utilized in the described trained learning models.

In yet another embodiment, the controller may compare the output of the model to the current properties for a selected operation. Based on that difference of such a comparison, the controller may adjust various aspects of that operation.

By utilizing the trained machine learning models, the systems and methods described herein may determine specific adjustments to a plurality of operations and parameters specific to equipment at a refinery to accurately and more frequently (as compared to typical adjustment times) reach a target product. Further, such adjustments may increase efficiency of the refinery equipment and/or reduce energy utilized by the refinery equipment, thus reducing cost of the refinery operation. The target product may be based on a number of factors, such as demand and/or price or cost for the product, cost of the product and/or feedstock, and/or based on a target product provided by a refinery controller or platform. Such adjustments may be determined in real-time using data from continuous and/or ongoing refinery operations.

Thus, rather than attempting to adjust operations at a significant delay, a refinery's operations may be adjusted in-real time or at time intervals shorter than in typical optimization operations (such typical optimization operations including operations by operating personnel to efficiently and accurately produce a target product). Further, such adjustments may be determined faster than typical adjustments to operations, leading to relevant and timely adjustments. Further, such analysis and adjustment utilizes complex non-linear equations which typically take longer to analyze, however with the use of machine learning, such analysis occurs significantly faster and with comparable accuracy.

Figure 1B:
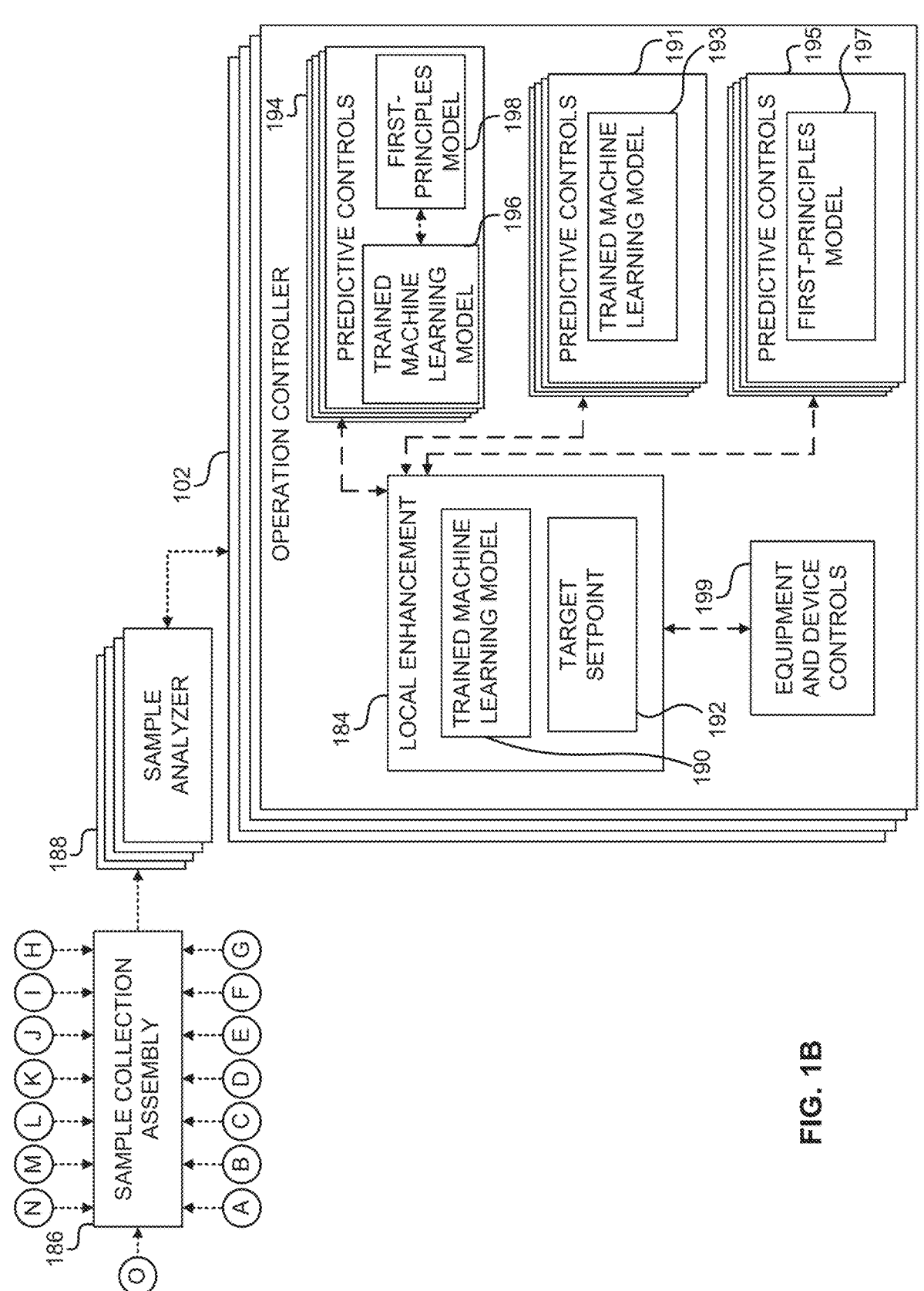

FIG. 1A and FIG. 1B simplified diagrams of a refining control system to enhance fluid production at a refinery, according to an embodiment of the disclosure. As illustrated in FIG. 1A, a refinery 100 may include various refining control operation devices and refining equipment. While selected equipment are illustrated in FIG. 1A, it will be understood by those skilled in the art that additional and/or different equipment may be included in or at a refinery 100, particularly based on the type of feedstock processed at the refinery. For example, the refinery 100 may include a desalter, blending tanks, storage tanks, and/or wastewater treatment units, among other equipment. Further, each unit or equipment at the refinery 100 may be optimized using the machine learning models or classifiers disclosed herein, using data specific to the equipment from the refinery 100. In other words, the equipment may be operated such that the corresponding refinery operations produce an accurate and/or on-specification target product.

As illustrated in FIG. 1A, a refinery 100 may include a refinery controller 101 and/or a plurality of operation controllers 102. As will be illustrated in subsequent drawings, additional components may be included, such as a refining enhancer, other circuitry, various other controllers, and/or other computing devices. In an embodiment, the refinery controller 101 and/or the plurality of operation controllers 102 may include, for example, a trained machine learning model or classifier, as well as other instructions to adjust various devices and/or operations or processes within the refinery 100. The refinery controller 101 and/or the plurality of operation controllers 102 may connect to or be in signal communication with (a) one or more sensors, meters, transducers, and/or other measurement devices positioned throughout the refinery 100 and/or (b) to the equipment (for example, connected to some control aspect or device associated with the equipment) positioned at the refinery 100. The refinery controller 101 may be configured to receive data via such a connection. Further, the refinery controller 101 may receive such data in real-time. In an embodiment, the refinery controller 101 may determine a target product and/or other parameters for a selected period of time. The refinery controller 101 may provide such data to each of the operation controllers 102. In other embodiments, the refinery controller 101 may utilize outputs from each of the operation controllers 102 to determine parameters for a target product. In other embodiments, the refinery controller 101 may apply those outputs, as well as other data, to a machine learning model.

In another embodiment, each of the operation controllers 102 may include a local enhancement circuitry 184, predictive controls circuitry 194, 191, and/or 195, and/or equipment and device controls 199. In embodiments, the circuitry may be a module or instructions. In embodiments, the operation controller 102 may include one or more varying or different predictive controls. For example, as illustrated, one or more of the predictive controls circuitry 191 may include a trained machine learning model 193. The trained machine learning model 193 may be trained for a specific operation and/or piece of equipment and, in some embodiments, may be trained to recognize an adjustment, maximization, and/or optimization for specified factors of the specific operation and/or piece of equipment. As such, the operation controller 102 may include a plurality of predictive control circuitry 191. The operation controls may also include predictive control circuitry 194, which includes a trained machine learning model 196 and/or a first-principles model (and/or, in some embodiments, another type of model). The trained machine learning model 196 may be trained to fill missing data for the first-principles model 198. The operation controller may also include predictive control circuitry 195, which may include a first-principles model 197. The first-principles model 197 may be a model using a known, physics based equation or formulation.

In an embodiment, the operation controller 102 may include a local enhancement circuitry 184. The local enhancement circuitry 184 may include a trained machine learning model 190 and target set point instructions 192. The trained machine learning model 190 may utilize data associated with a specific refining operation and/or the output from each predictive controls circuitry to produce an output. The target set point instructions may utilize the output of the trained machine learning model 190 to determine a set of parameters that equipment and/or devices associated with a specific refining operation should be set to, to reach a target product. The operation controller may also include the equipment and device controls 199. The equipment and device controls 199 may cause equipment and/or devices to adjust to the target set points.

As illustrated in FIG. 1B, the operation controllers 102 may further be connected to or in signal communication with a sample collection assembly 186 and/or a sample analysis assembly or sample analyzer 188. The sample analyzers 188 may include spectrographic analyzers, standardized spectrographic analyzers, and/or chromatographic analyzers. The type of spectrographic analyzers utilized may include one or more of near-infrared spectroscopic analyzer, a mid-infrared spectroscopic analyzer, a combination of a near-infrared spectroscopic analyzer and a mid-infrared spectroscopic analyzer, a Raman spectroscopic analyzer, or a nuclear magnetic resonance spectroscopic analyzer. The sample analyzer 188 may analyze received samples and provide corresponding spectra indicating properties or other analysis indicating components and/or properties of the sample. The operation controllers 102 may also be connected to one or more sub-controllers or sub-operation controllers that are positioned or configured to manage selected aspects or operations of the refinery 100. The sample analyzer 188 may include an on-line analyzer or a lab-based analyzer.

The refinery controller 101 and/or operation controllers 102 may include a processor and a memory or non-transitory machine-readable storage medium storing instructions executable by the processor (as illustrated in subsequent drawings). In some examples, the refinery controller 101 and/or the operation controller 102 may be a computing device. The term "computing device" is used herein to refer to any one or all of programmable logic controllers (PLCs), distributed control systems (DCSs), a proportional integral derivative (PID) controller, a DCS-PID controller, programmable automation controllers (PACs), industrial computers, servers, virtual computing device or environment, desktop computers, personal data assistants (PDAs), laptop computers, tablet computers, smart books, palm-top computers, personal computers, smartphones, virtual computing devices, cloud based computing devices, and similar electronic devices equipped with at least a processor and any other physical components necessarily to perform the various operations described herein. Devices such as smartphones, laptop computers, and tablet computers are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

As used herein, a "non-transitory machine-readable storage medium" or "memory" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory may store or include instructions executable by the processor.

As used herein, a "processor" or "processing circuitry" may include, for example, one processor or multiple processors included in a single device or distributed across multiple computing devices. The processor (such as, processing circuitry 202 shown in FIG. 2, processor 2702 shown in FIG. 11A, processor 2724 shown in FIG. 11B, and/or a processor included in, for example, a refinery controller 101 and/or the operation controllers 102 (not illustrated)) may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

Turning to the equipment positioned at the refinery 100, the refinery 100 may include a reactor 104 and, in some embodiments, a regenerator 120. The reactor 104 may be a catalytic reactor and/or a fluid catalytic cracking unit or reactor. The reactor 104 may include one or more sensors or meters positioned within the reactor 104 (such as sensor or meter 108) and/or proximate the reactor (such as sensors or meters 112, 114, 110, and 144). These sensor or meters may measure some aspect of fluid or material where the sensor or meter is positioned. Further, the reactor 104 may receive a feed or feedstock or distillate from a crude column 137 and/or an amount of water/steam at one or more locations of the reactor 104. The crude column 137 may separate a feed or feedstock into products (for example, one or more distillates and bottoms or residue). The reactor 104 may be positioned or configured to convert heavy gas oil, residua, and/or other gas oil blends to an effluent or cracked fluid including smaller molecules, the effluent, in some embodiments, being further separated downstream into different products via distillation or fractionation. The reactor 104 may be operated at or it may be beneficial to operate the reactor 104 at a selected temperature range and/or pressure range to reduce over-cracking, which may cause a loss in valuable products, as well as to reduce over-all energy usage. Further, the amount of catalyst within and/or being fed to (for example, from the regenerator 120 and/or as fresh catalyst) the reactor 104 may impact the value of product produced by the reactor 104. Further, as a catalyst is regenerated within the regenerator 120, degradation may occur and/or coke deposited on the catalyst may not be completely burned off, particularly after multiple uses, thus further impacting product from the reactor 104. The feedstock fed to the reactor 104 may also affect parameters, such as temperature and residence time, among other parameters. Thus, several factors and/or parameters may impact the product produced by a reactor 104, those factors and/or parameters including temperature, pressure, type of catalyst, quality of catalyst, amount of catalyst, flow rate of feed or feed stock and/or catalyst, amount and temperature of steam injected, and/or properties of feed or feedstock, in addition to the product desired or targeted. The refinery controller 101 and/or operation controllers 102 may gather data related to such factors over time and apply that data, along with, in some embodiments, spectra provided from the sample analyzer 188, to trained machine learning models to produce parameters that enable production of a target product via a minimal amount of energy and/or lowest cost. Such application of data to a model or classifier may occur within various modules or circuits of one or more of the operation controllers 102 and/or, in addition to other data generated within the refinery 100, within the refinery controller 101. For example, one trained machine learning model within the predictive controls circuitry 191 may be trained to maximize or be utilized for maximizing operating temperature in relation feedstock and a threshold temperature that may cause over-cracking. In another example, another trained machine learning model may be trained to adjust or be utilized for adjusting heater temperature and/or temperature within the reactor in relation to feedstock and process parameters, composition, and/or other aspects to maximize yield or economically optimize yield from the reactor 104. In another embodiment, the trained machine learning model may be trained to adjust or be utilized for adjusting one or more refinery operation control devices to produce a selected yield of a product that also maximizes profit. Such an application of data to such a model may generate a vector that includes parameters or parameter settings corresponding to devices and/or equipment associated with the reactor 104 and, in some embodiments, the regenerator 120. That vector may be utilized by the local enhancement model to further determine, based on the outputs from other models as well as gathered data, parameters or parameter settings that enhance production of effluent from the reactor 104, such parameters or parameter settings being applied to actual equipment and/or devices via the equipment and device controller. Other models may be trained to determine parameters based on other relationships associated with the reactor 104 and/or other equipment.

In an embodiment, a trained machine learning model may be utilized by predictive controls (which may also be referred to as a prediction model) to optimize targets and/or properties and/or the predictive controls may be utilized by an online optimization algorithm (which may also be referred to as the local enhancement module) which may consider economics (for example, based on amounts of product produced), process constraints, tuning parameters, and/or process data to generate or determine targets.

The refinery 100 may include a regenerator 120. While a reactor 104 with a side-by-side configuration is illustrated in FIG. 1A, it will be understood that other configurations may be utilized, such as a stacked configuration. In an embodiment, in addition to reactor data and corresponding fluid properties, refinery controller 101 and/or operation controllers 102 may obtain data and fluid properties corresponding to the regenerator 120. For example, the refinery controller 101 and/or operation controllers 102 may obtain data from sensors or meters 116, 124, 126, 128, 132, 134, and 138, flow control devices associated with the regenerator 120 (such as valves 118, 130, 136, and 142), and/or the regenerator 120, as well as properties or spectra associated with spent catalyst, regenerated catalyst, a feed or feedstock (for example, to aid in catalyst regeneration), and/or air (which may include pure oxygen or some combination of oxygen and other elements). Data may be obtained from other devices, such as flow control devices (such as, valves and/or pumps, among other devices configured to control flow of a fluid) and/or temperature control devices (such as boilers, heat exchangers, heating coils, condensers, and/or other heating or cooling devices). In an embodiment, the regenerator 120 may be positioned or configured to burn coke off the spent catalyst, the coke being deposited onto the catalyst in the reactor 104. The regenerator 120 may then provide the regenerated catalyst back to the reactor 104. In embodiments, the refinery controller 101 and/or operation controllers 102 may apply the data from the regenerator 120 to produce parameters or parameter settings to adjust corresponding equipment or devices to. The trained machine learning models may be trained or be utilized to determine parameters to minimize the amount of coke burned from catalyst, to increase temperature within the reactor 104 (for example, via heat from regenerated catalyst), and/or to minimize the amount of resources utilized by the regenerator 120.

Other equipment may be positioned throughout the refinery 100 and the refinery controller 101 and/or operation controllers 102 may connect to such equipment. The refinery controller 101 and/or operation controllers 102 may obtain or gather data related to that equipment during the refining operation. For example, the refinery controller 101 and/or operation controllers 102 may obtain data from and/or related to a fractionation column 148 or distillation column. Further, the refinery 100 may include the refinery controller 101 and/or operation controllers 102. The refinery controller 101 and/or operation controllers 102 may obtain data from a hydrotreater (such as hydrotreater 166 and hydrotreater 174) and/or an alkylation unit 158. The refinery controller 101 and/or operation controllers 102 may obtain data from the valve 146, sensors or meters 150, 154, 160, 164, 168, 172, 178, and 180, as well as the properties associated with the products from the fractionation column 148 (for example, LPG, gasoline, diesel, slurry, and/or other products), the hydrotreater 166 (for example, gasoline or high-octane gasoline), the hydrotreater 174 (for example, diesel, low-sulfur diesel, and/or higher purity diesel), and/or the alkylation unit 158 (for example, alkylate).

In an embodiment, the refinery controller 101 and/or operation controllers 102 may obtain data in real time and/or continuously. In another embodiment, the refinery controller 101 and/or operation controllers 102 may obtain data periodically. In another embodiment, the refinery controller 101 and/or operation controllers 102 may apply data to a trained machine learning model or classifier at a selected time interval and/or continuously. In yet another embodiment, each of the operation controllers 102 may obtain data related to a selected section of the refinery 100. Each of the operation controllers 102 may also obtain properties and/or spectra from the sample analyzer 188 at a second selected time interval. For example, the operation controllers 102 may obtain data from a sample analyzer 188 at a time interval of less than hour, about an hour, about a day, or, in some embodiments, even longer than a day. In further embodiments, the sample analyzer may include an on-line analyzer (in other words, an analyzer that provides data in real-time) and/or a lab analyzer (in other words, an analyzer that provides data at some point after sample collection). In an embodiment, the operation controllers 102 may include another machine learning model trained to predict analyzer output (in other words, fluid properties). Such a model may utilize the parameters obtained for a selected operation and one or more of feed or feedstock properties and/or properties of another one or more fluids produced by the operation. Such a prediction may be utilized by being applied to a machine learning model, as described below.

After the operation controllers 102 obtain the properties and/or spectra and data, then the operation controllers 102 may apply the properties and/or spectra and data to a corresponding predictive controls module to produce parameters to produce a target product. The local enhancement module of the operation controller may then apply, to a trained machine learning model of the local enhancement module, the output of each of the predictive controls module, the data obtained throughout the refinery 100, and/or the properties and/or each spectra associated with a collected sample. Such an application may produce an enhanced or optimized set of parameters, which may then be applied to equipment or devices via the equipment and devices controls.

In yet another embodiment, the refinery controller 101 may first obtain data and the properties and/or spectra and then apply the data and the properties and/or spectra to a trained machine learning model. The refinery controller 101 may transmit the output of the trained machine learning model to each operation controller 102. In another embodiment, the refinery controller 101 may provide target products and corresponding parameters to each of the operation controllers 102, based on user input, previously utilized parameters, current cost of a target product and/or feedstock, and/or other factors. In another embodiment, the refinery controller 101 may facilitate communication between each of the operation controllers 102, facilitate data acquisition for the operation controllers 102, and/or facilitate parameter prediction and/or adjustment among the plurality of operation controllers 102. For example, if one operation controller adjusts a process to meet a selected target, that adjustment may affect upstream and/or downstream processes. The refinery controller 101 may facilitate communication and/or perform additional predictions to ensure that such parameter adjustments enable the upstream and/or downstream processes to continue to produce target products.

Figure 2:
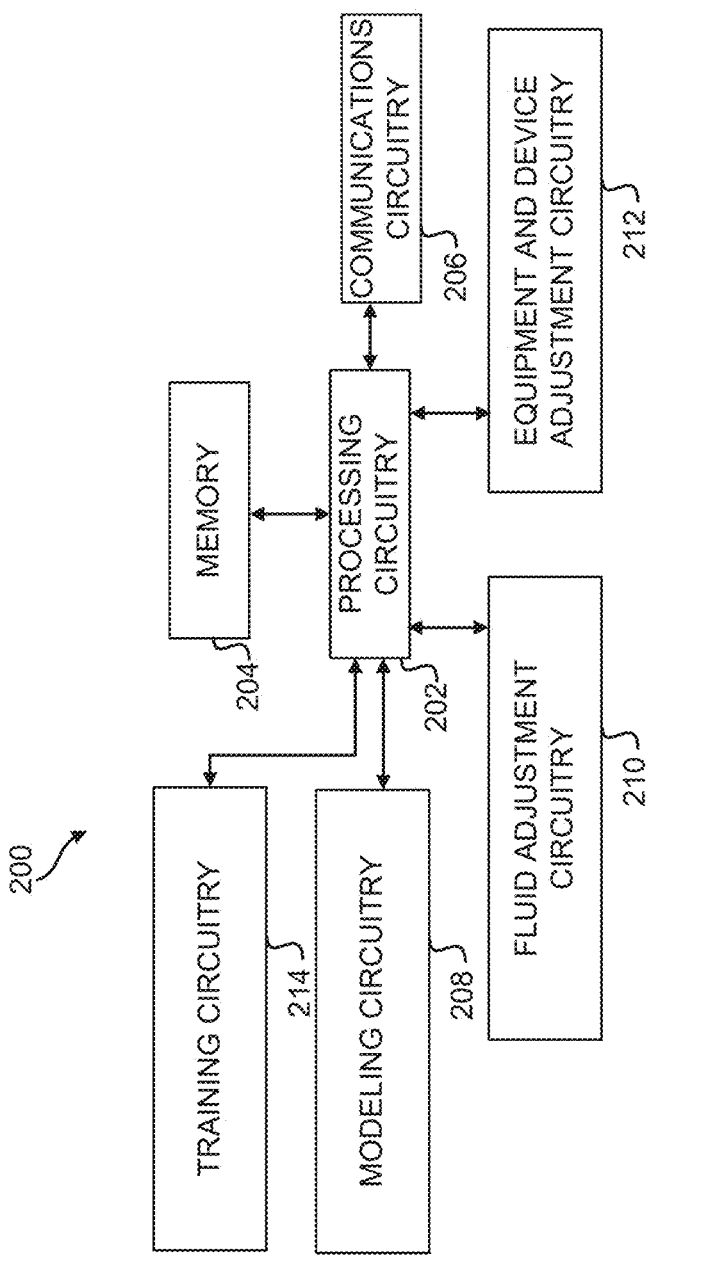
FIG. 2 is a simplified diagram that illustrates an apparatus for enhance fluid production at a refinery, according to an embodiment of the disclosure.

FIG. 2 is a simplified diagram that illustrates an apparatus for enhance fluid production at a refinery, according to an embodiment of the disclosure. Such an apparatus 200 may be comprised of a processing circuitry 202, a memory 204, a communications circuitry 206, a modeling circuitry 208, a fluid adjustment circuitry 210, an equipment and device adjustment circuitry 212, and training circuitry 214, each of which will be described in greater detail below. While the various components are illustrated in FIG. 2 as being connected with processing circuitry 202, it will be understood that the apparatus 200 may further comprise a bus (not expressly shown in FIG. 2) for passing information amongst any combination of the various components of the apparatus 200. The apparatus 200 may be configured to execute various operations described herein, such as those described above in connection with FIGS. 1A-1B and below in connection with FIGS. 3-13.

The processing circuitry 202 (and/or co-processor or any other processor assisting or otherwise associated with the processor) may be in communication with the memory 204 via a bus for passing information amongst components of the apparatus. The processing circuitry 202 may be embodied in a number of unusual ways and may, for example, include one or more processing devices configured to perform independently. Furthermore, the processor may include one or more processors configured in tandem via a bus to enable independent execution of software instructions, pipelining, and/or multithreading.

The processing circuitry 202 may be configured to execute software instructions stored in the memory 204 or otherwise accessible to the processing circuitry 202 (e.g., software instructions stored on a separate storage device). In some cases, the processing circuitry 202 may be configured to execute hard-coded functionality. As such, whether configured by hardware or software methods, or by a combination of hardware with software, the processing circuitry 202 represents an entity (for example, physically embodied in circuitry) capable of performing operations according to various embodiments of the present disclosure while configured accordingly. Alternatively, as another example, when the processing circuitry 202 is embodied as an executor of software instructions, the software instructions may specifically configure the processing circuitry 202 to perform the algorithms and/or operations described herein when the software instructions are executed.

Memory 204 is non-transitory and may include, for example, one or more volatile and/or non-volatile memories. In other words, for example, the memory 204 may be an electronic storage device (for example, a computer readable storage medium). The memory 204 may be configured to store information, data, content, applications, software instructions, or the like, for enabling the apparatus 200 to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network. The communications circuitry 206, in an embodiment, may enable reception of parameters from various components, devices, and/or sensors (for example, flow control devices, analyzers, sensors, equipment, and/or other components), as well as communication of instructions and/or signals indicative of adjustment to those components and/or devices.

The apparatus 200 may include a modeling circuitry 208 configured to obtain parameters from one or more components, equipment, devices, sensors, and/or analyzers and/or apply those parameters to a trained machine learning model to obtain parameters that enable equipment to produce a target product. In other embodiments, the modeling circuitry 208 may apply, in addition to the parameters described herein, the output of other similar circuitry (in other words, an additional plurality of modeling circuitry that each correspond to one of a plurality of sub-operations). Obtaining the parameters from the one or more components, equipment, devices, sensors, and/or analyzers may occur periodically, at selected times, continuously, or substantially continuously. In an example, the modeling circuitry 208 may obtain parameters for sub-operations first, generating an output for each sub-operation. Upon generation of an output for each sub-operation, the modeling circuitry 208 may obtain each output and a current data set. The modeling circuitry 208 may poll the components, devices, sensors, and/or analyzers to obtain such parameters or, in an embodiment, receive the parameters without polling. The modeling circuitry 208 may obtain the parameters via the communications circuitry 206. Application of the parameters to the trained machine learning model may determine, generate, or cause generation of an output. The output may be indicative of an adjustment to equipment, fluids, devices, and/or operations to meet or accurately meet a target product and/or to operate the equipment at higher than typical efficiency, for example, utilizing less power, energy, or resources such as in a heater or boiler or utilizing a heat exchanger to reduce power or energy usage.

In another embodiment, the apparatus 200 may include training circuitry 214. The training circuitry 214 may train the trained machine learning model prior to use. In an embodiment, the training circuitry 214 may automatically and/or based on some user input train the trained machine learning model. In such embodiments, the training circuitry 214 may obtain historical data, preprocess the historical data, and then train and test the machine learning model. In yet another embodiment, after a refining operation (in other words, after a selected product has been generated via the refining operation), the training circuitry 214 may re-train or refine the trained machine learning model, based on the results of the refining operation (in other words, the accuracy of the parameters in reaching the target product's properties).

In another, the modeling circuitry 208 may train and/or include a plurality of machine learning models or classifiers. Each of the plurality of machine learning models or classifiers may correspond to a selected refinery operation and/or sub-operation.

The modeling circuitry 208 may utilize processing circuitry 202, memory 204, or any other hardware component included in the apparatus 200 to perform these operations, as described above in connection with FIGS. 1A-1B and below in connection with FIGS. 3-13. The output of the modeling circuitry 208 may be transmitted to other circuitry of the apparatus 200 (such as the fluid adjustment circuitry 210 and/or equipment and device adjustment circuitry 212).

In addition, the apparatus 200 further comprises the fluid adjustment circuitry 210 that may cause adjustment of feedstock and/or other fluids utilized in a refining operation. In an embodiment the output from the modeling circuitry 208 may be a matrix, a series of parameters, and/or some indicator. In an embodiment, the fluid adjustment circuitry 210 may utilize that output to adjust a blend of feedstock and/or the fluid used in other inputs (for example, an amount of hydrogen, butane, other alkanes, and/or other fluids). The fluid adjustment circuitry 210 may utilize processing circuitry 202, memory 204, or any other hardware component included in the apparatus 200 to perform these operations, as described above in connection with FIGS. 1A-1B and below in connection with FIGS. 3-13. The fluid adjustment circuitry 210 may further utilize communications circuitry 206 to transmit signals to adjust the type and/or amount of feedstock to utilize.

In addition, the apparatus 200 further comprises the equipment and device adjustment circuitry 212 that may cause adjustment of equipment and/or devices utilized in a refining operation. In an embodiment, the equipment and device adjustment circuitry 212 may utilize that output to adjust temperature, pressure, flow rate, and/or other parameters corresponding to the equipment and/or devices positioned within the refinery. The equipment and device adjustment circuitry 212 may utilize processing circuitry 202, memory 204, or any other hardware component included in the apparatus 200 to perform these operations, as described above in connection with FIGS. 1A and 1B and below in connection with FIGS. 3-13. The equipment and device adjustment circuitry 212 may further utilize communications circuitry 206 to transmit signals to adjust equipment and/or devices utilized.

Although components 202-214 are described in part using functional language, it will be understood that the particular implementations necessarily include the use of particular hardware. It should also be understood that certain of these components 202-214 may include similar or common hardware. For example, the modeling circuitry 208, the fluid adjustment circuitry 210, the equipment and device adjustment circuitry 212, and the training circuitry 214 may, in some embodiments, each at times utilize the processing circuitry 202, memory 204, or communications circuitry 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," with respect to elements of the apparatus therefore shall be interpreted as necessarily including the particular hardware configured to perform the functions associated with the particular element being described. Of course, while the terms "circuitry" should be understood broadly to include hardware, in some embodiments, the terms "circuitry" may in addition refer to software instructions that configure the hardware components of the apparatus 200 to perform the various functions described herein.

Although the modeling circuitry 208, the fluid adjustment circuitry 210, the equipment and device adjustment circuitry 212, and the training circuitry 214 may utilize processing circuitry 202, memory 204, or communications circuitry 206 as described above, it will be understood that any of these elements of apparatus 200 may include one or more dedicated processors, specially configured field programmable gate arrays (FPGA), or application specific interface circuits (ASIC) to perform its corresponding functions, and may accordingly utilize processing circuitry 202 executing software stored in a memory or memory 204, communications circuitry 206 for enabling any functions not performed by special-purpose hardware elements. In all embodiments, however, it will be understood that the modeling circuitry 208, the fluid adjustment circuitry 210, the equipment and device adjustment circuitry 212, and the training circuitry 214 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200 (or by a refinery controller). Furthermore, some example embodiments (such as the embodiments described for FIGS. 1A-1B and 3-13) may be a computer program product comprising software instructions stored on at least one non-transitory computer-readable storage medium (such as memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Figure 3:
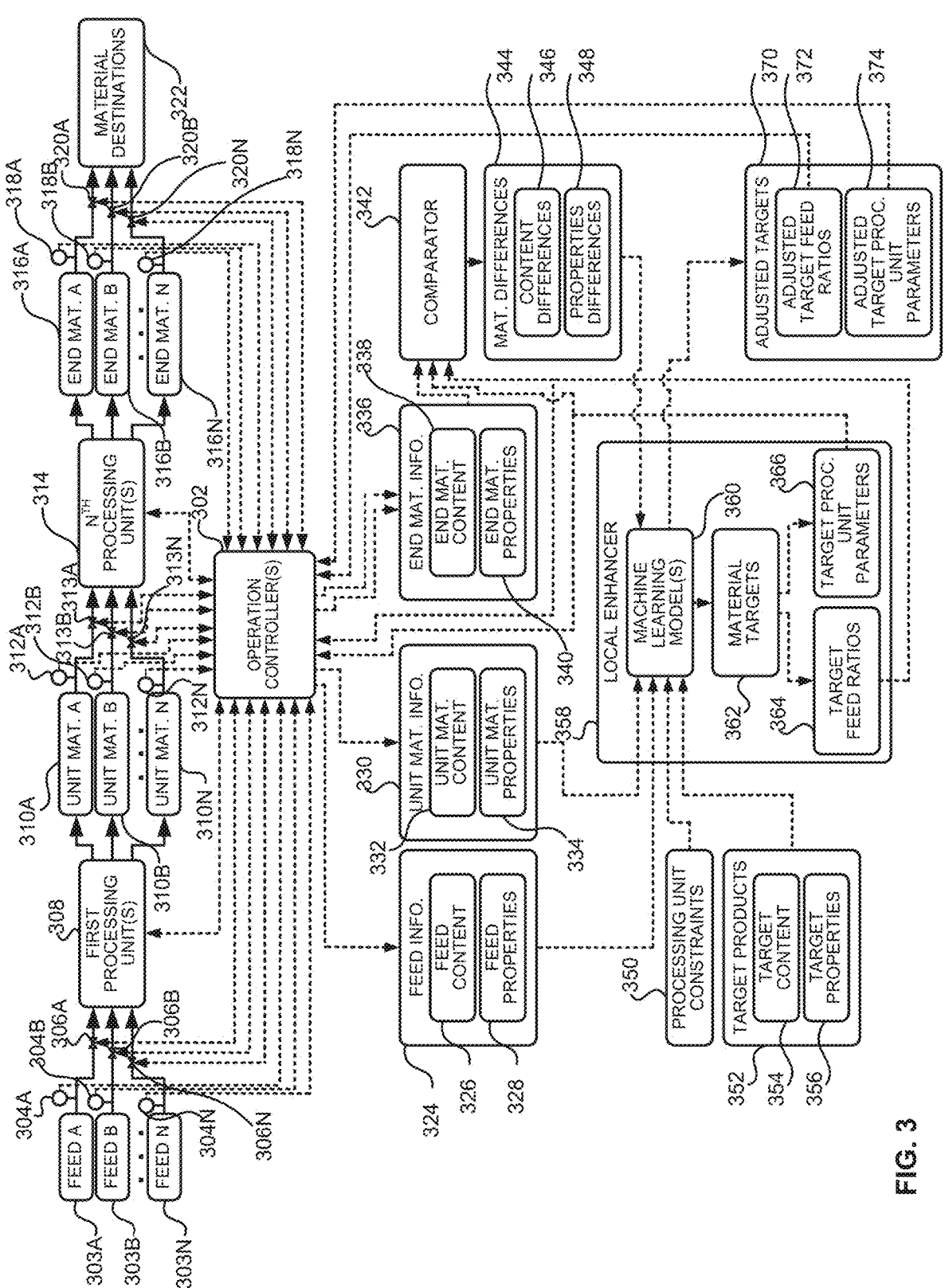
FIG. 3 is another simplified diagram of a refining control system to enhance fluid production at a refinery, according to an embodiment of the disclosure.

FIG. 3 a simplified diagram that illustrates example refining controllers and an example refining enhancer to enhance control of a refining process at a refinery, according to an embodiment of the disclosure. As illustrated in FIG. 3, a refinery may include one or more operation controllers 302. The operation controllers 302 may connect to, for example, a number of feeds and/or processing units (refinery equipment configured to process a feedstock or other input). As illustrated, the operation controllers 302 may connect to and receive data from feed A 303A, feed B 303B, and up to feed 303N, sensors or other devices associated with each feed (such as sensor 304A, 304B, and up to 304N), and various flow control devices (such as valve 306A, valve 306B, and up to valve 306N). In such embodiments, each of feed A 303A, feed B 303B, and up to feed 303N may flow to a first processing unit 308. A processing unit, for example, in this case, the first processing unit 308, may include one or more refining devices or equipment positioned at a refinery (for example, a FCC unit, a distillation column, and other equipment as described herein). The first processing unit 308 may convert, process, and/or transform a feed into a unit material (such as unit material A 310A, unit material B 310B, and up to unit material N 310N). Additional processing units may be positioned throughout the refinery. As illustrated though, the unit materials may flow to a "Nth" processing unit 314. Sensors (such as sensor 312A, 312B, and up to 312N) and valves (such as valve 313A, valve 313B, and up to valve 313N) may be positioned between the feed and "Nth" processing unit 314. The final processing device (in other words, the "Nth" processing unit 314) may produce one or more end materials (such as end materials A 316A, end materials 316B, and up to end materials 316N). Sensors (such as sensor 318A, 318B, and up to 318N) and valves (such as valve 320A, valve 320B, and up to valve 320N) may be positioned between the end materials and the material destination 322.

In an embodiment, as each feed is fed to the next processing unit, the operation controller 302 may determine various characteristics and/or properties of the feed. For example, the operation controller 302 may determine temperature, pressure, and/or flow rate, in addition to the content of the feed and the spectra or properties determined via spectrographic analysis of the feed. For example, as illustrated, the operation controller 302 may determine or obtain feed information 324 (including, at least feed content 326 and/or feed properties 328, among other data), unit material information 330 (including, at least unit material content 332 and/or unit material properties 334, among other data), and/or end material information 336 (including, at least end material content 338 and/or end material properties 340, among other data). Thus, the operation controller 302 may obtain data related to each feed/material in real-time, during a refinery operation, and/or directly or indirectly (for example, spectra may be obtained via a sample or spectrographic analyzer).

Once all the data has been obtained, the operation controller 302 may apply, to the machine learning model 360 of a local enhancer 358, the data including processing unit constraints 350, a target product 352 (including a target content 354 and target properties 356), and/or material differences 344 (including content differences 346 and properties difference) as determined via a comparator 342 (the comparator positioned or configured to compare content and properties of different materials). The machine learning model 360 may produce material targets 362 which may be utilized to produce target feed ratios 364 and target operation unit parameters 366. In another embodiment, these values may be fed to the comparator and then, after obtaining differences related to another material, reapplied to the machine learning model 360. The machine learning model 360 may then produce adjusted targets 370 (including adjusted target feed ratios 372 and adjusted target operation unit parameters).

In another embodiment, the output of the machine learning model (for example, a vector comprising a plurality of components, each component being a parameter setting for a selected or specific device or equipment) may be compared to current parameter settings for the selected or specific devices or equipment in the comparator 342. In such embodiments, if the comparator 342 determines that there is a difference between an output of the machine learning model, then the parameter settings of the equipment or devices at the refinery may be adjusted.

In embodiments, the operation controller 302 may drive the materials to the target by adjusting the valves and/or feed (for example, the blend of different feeds or materials used in the subsequent operation) at one or more points in the overall refining operation.

The machine learning model 360 may include neural networks, supervised learning models, semi-supervised learning models, unsupervised learning models, or some combination thereof, as will be readily understood by one having ordinary skill in the art. In another embodiment, different types of machine learning algorithms may be utilized for different refinery operations. In further embodiments, some refining operations may use, rather than or in addition to a neural network, decision trees, support vector machines, hidden Markov models, Bayesian networks, linear regression, k-means, and/or reinforcement learning models. Specific neural networks that may be utilized include a recurrent neural network, such as a long short-term memory network. Such neural networks may utilize a fixed horizon of historical data to predict future behavior. Additionally, such neural networks may utilize standard active functions, for example, a rectified linear unit or a hyperbolic tangent. As noted, in embodiments, different models may be utilized for different operations. The determination for which model to use for each operation may be determined based on training and test error rates associated with a selected model, the $R^2$ value, shapely additive explanations (SHAP) plots and/or values, gain directions and/or magnitude, and/or gain distributions, among other factors.

In an embodiment, the operation controller 302, local enhancer 358, and/or comparator 342 may be included in a single controller, a plurality of controllers, one or more computing devices, and/or as one or more modules or as instructions. In other embodiments, a plurality of controllers or computing devices may each include a specific model corresponding to one of the processing units. In another embodiment, the operation controller 302 may include or may be a supervisory controller that considers the predictions of other processing unit specific controllers when generating adjusted targets via the supervisory controller's machine learning model.

As noted, data may be obtained in real time. In some embodiments, the application of data to a machine learning model may be delayed by the time taken to obtain spectra or properties for a feed or material. Thus, in an embodiment where the operation controller 302 is a supervisory controller, the supervisory controller may generate adjusted targets after each sub-controller generates a target for a specific processing unit. Thus, the overall adjustment targets may be determined at a second time interval, greater than the first time interval, while each sub-adjustment target may be determined at a first time interval.

In another embodiment, a refinery may include a plurality of operation controllers. Each operation controller 302 may include a plurality of trained machine learning models or classifiers. Each trained machine learning model or classifier may be trained to recognize a specific or selected trend in a set of data. Thus, each operation may be adjusted based on the outputs of a plurality of models, ensuring the operation as a whole produces an accurate target product. Further, each operation controller may interact with each other operation controllers. For example, adjusted parameters from all operation controllers may be provided to each operation controller. Thus, as one operation is adjusted, a downstream and/or upstream operation may be further adjusted based on the adjustment of the one operation.

Figure 4:
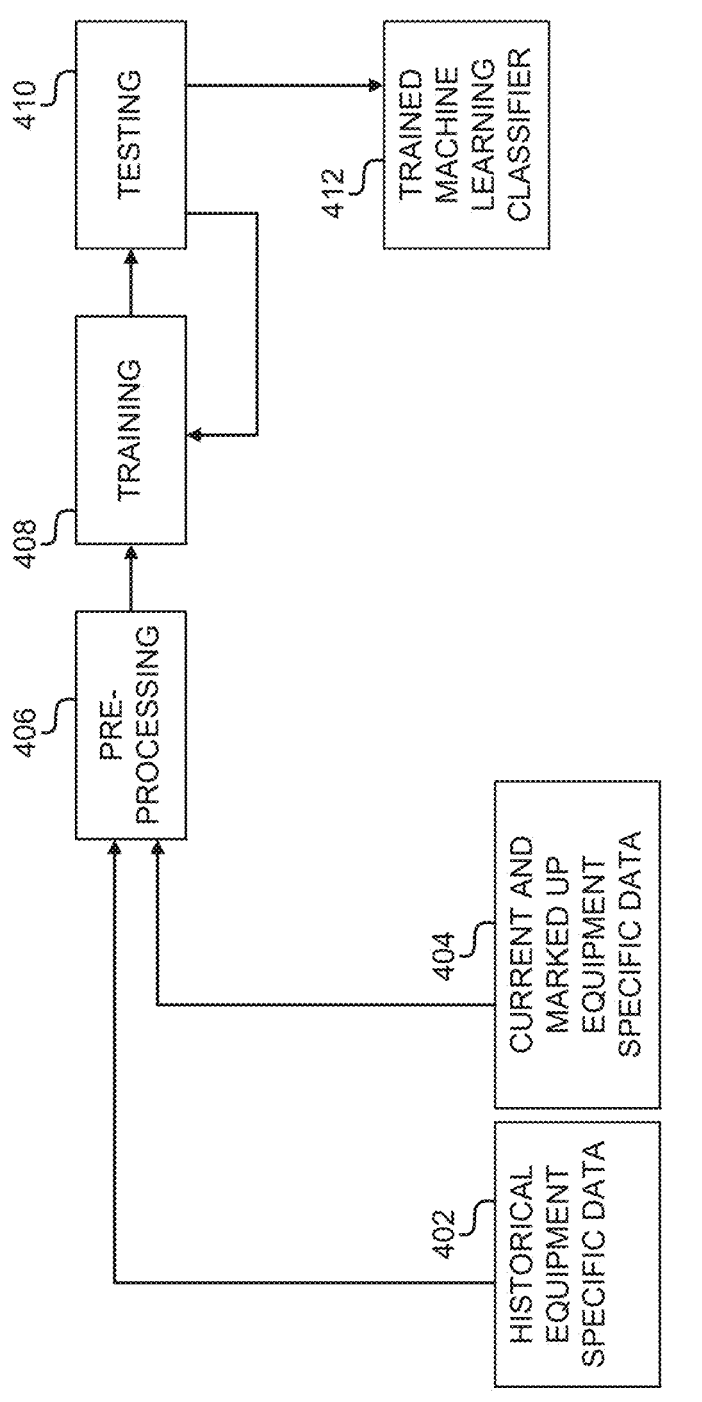
FIG. 4 is a simplified diagram that illustrates training of a machine learning model for enhanced fluid production at refinery, according to an embodiment of the disclosure.

FIG. 4 is a simplified diagram that illustrates training of a machine learning model for enhanced fluid production at refinery, according to an embodiment of the disclosure. Each model described herein may be trained prior to use. Such training may be performed prior to use with a set of historical data specific to a refinery. In a further embodiment, a plurality of machine learning models may be trained, each based on data specific to an operation and selected equipment at the refinery.

As noted, the machine learning models described herein may be trained using data. As illustrated in FIG. 4, the data may include historical equipment specific data 402. In other embodiments, the training data may include data related to the entire operation of a refinery, as well as outputs from equipment specific models. In another embodiment, a machine learning model may be re-trained and/or refined via current and marked up equipment specific data 404. The historical equipment specific data 402 and current and marked up equipment specific data 404 may include feed content, feed properties, material content, material properties, a target product or products, target content, target properties, temperatures in equipment, pressure in equipment, flow rates associated with feed and/or materials, and/or equipment parameters. In embodiments, the historical equipment specific data 402 may include or may be utilized to generate a non-linear concave function. In such embodiments, the desired outcome may be determined based on the maximum of such a function. In another embodiment, the desired outcome may be included or added to the data set. In yet another embodiment, training may include the machine learning model learning particular patterns that indicate what the desired outcome may be based on trends within the data. In another embodiment, physics-based data may be provided along with the historical data set to ensure that outputs from a trained machine learning model remain consistent and/or emulate real process/actual possibilities. In yet another embodiment, a plurality of machine learning models may be trained for the same operation. Each of the plurality of machine learning models may utilize different portions of historical data and/or other inputs to cause the model to maximize a specific attribute or parameter. Another model may be trained to utilize the outputs of each of those plurality of models, in addition to data.

Once the historical data, and any other current data, is available, that data may be pre-processed. In such embodiments, the data may be normalized. In other words, outlying data points that are anomalies may be removed from the data set. Further, data corresponding to abnormal events may be removed, such as data generating during start-up, shutdown, turn-arounds, maintenance, and/or upsets. Further, undesired data and invalid measurements may be removed. Finally, data may be segregated or separated into sequences based on time. The sequences may comprise data obtained over a consecutive time period, such as time intervals of 30 minutes, 1 hour, 2 hours, and/or 3 hours, or more or less than the time intervals listed. In another embodiment, other factors may be utilized to segregate or separate the data, such as feed used and/or target product being produced.

Once the data set has been pre-processed, a model may be trained 408. In embodiments, a portion of the data set (for example, 70%, 80%, or 90%) may be fed to the machine learning model. The machine learning model may utilize the inputs versus the known desired outcome (such as target product content and properties) and/or known undesired outcome to "learn" what parameters can be utilized to reach the known desired outcome and what parameters lead to the known undesired outcome. Once the data has been used to train the machine learning model, then the remaining portion of the data set may be utilized to test 410 the trained machine learning model. If the trained machine learning model does not meet or achieve a selected error rate, then trained machine learning model the trained machine learning model may be re-trained or refined with a different randomized portion of the data set. In another embodiment, other training schema may be utilized. In another embodiment, readiness of the trained machine learning model may be determined based on how close the trained machine learning model comes to an expected outcome, based on the test data set.

Once the trained machine learning model 412 meets a selected error rate, then the trained machine learning model may be released for further use. In another embodiment, a separate step may include selection of a type of machine learning model, which may occur prior to training of that machine learning model. In other embodiments, various types of models may be trained, then tested. The most accurate models, determined by an error rate for each model, may be utilized.

In another embodiment, each trained machine learning model may utilize current data for re-training or for further refinement of that model. Such re-training or refinement may occur off-line or on-line. In other words, data captured during a current operation, including outputs from a model and the resulting product of a related process, may be used for reinforcement learning. In an off-line example, a separate instance of the model may be re-trained or refined and, after subsequent testing, that separate instance of the model may be brought on-line to replace a previous version. In an on-line example, the model may be actively and/or continuously or periodically re-trained or refined. It will be understood that the systems, controllers, and/or methods may utilize one or more of the reinforcement learning embodiments for each different model. For example, one model may use reinforcement learning in an on-line scenario, while another model may use an off-line reinforcement learning scenario.

Figure 5:
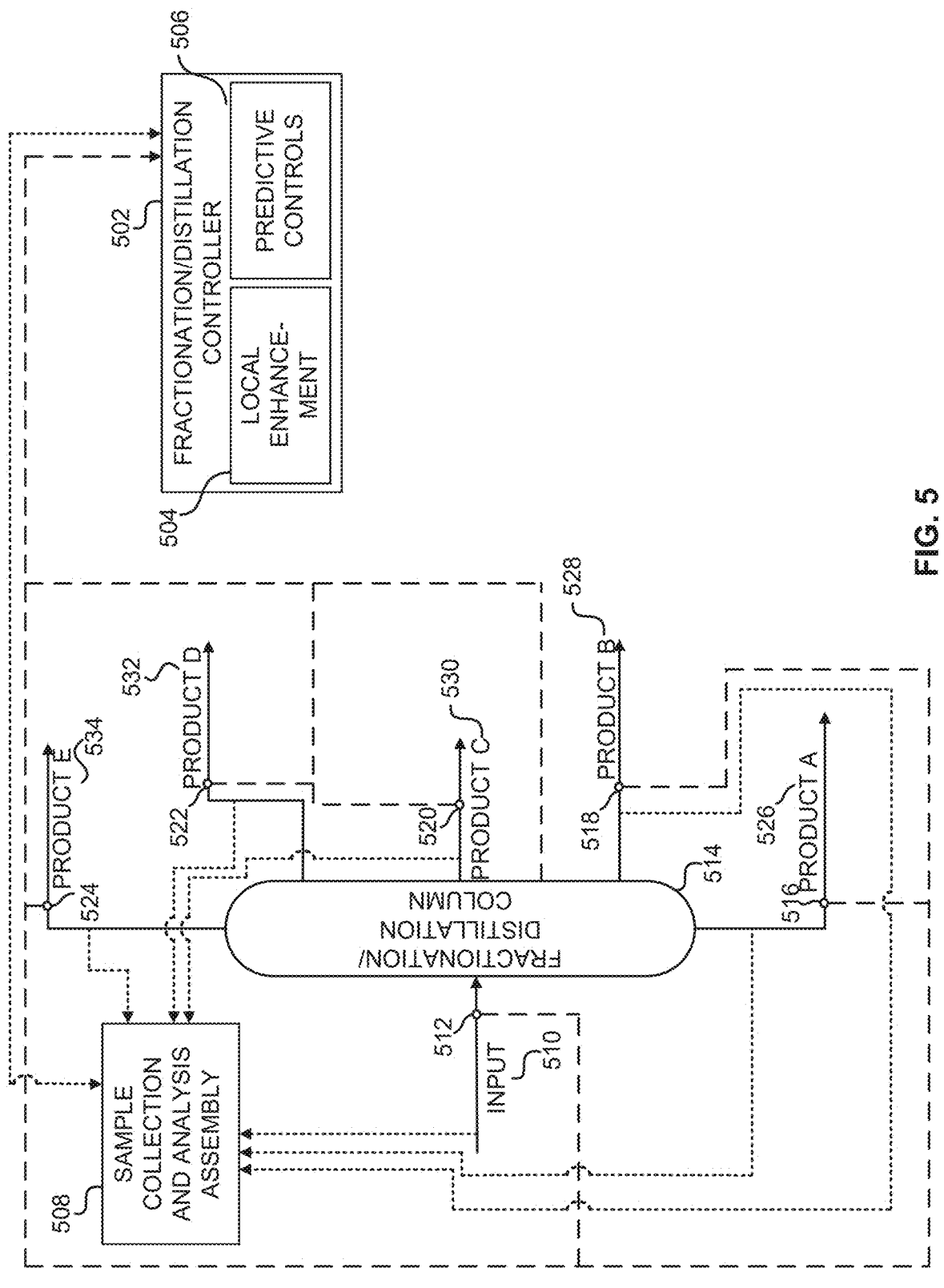
FIG. 5 is a schematic diagram of a distillation control system to enhance fluid separation at a portion of a refinery.

FIG. 5 is a schematic diagram of a distillation control system to enhance fluid separation at a portion of a refinery. As illustrated in FIG. 5, a distillation/fractionation portion of the refinery may include a fractionation/distillation controller 502. Other controllers may be positioned throughout such a refinery and may control functions upstream and/or downstream of the fractionation/distillation column 514. In such embodiments, the fractionation/distillation controller 502 may utilize data from the other controllers when determining updated parameters for the fractionation/distillation column 514. The fractionation/distillation controller 502 may obtain data related to a fractionation/distillation column 514. For example, the fractionation/distillation controller 502 may obtain temperature and/or pressure within the fractionation/distillation column 514 and/or the temperature and/or pressure of fluid flowing into and/or out of the fractionation/distillation column 514. Further, the fractionation/distillation controller 502 may initiate collection of samples of various fluids associated with the fractionation/distillation column 514 via the sample collection and analysis assembly 508. For example, the sample collection and analysis assembly 508 may obtain samples of the an overhead, side-draws, bottoms, residue and/or outputs (for example, product A 526, product B 528, product D 532, and product E 534) and/or inputs (for example, input 510) of the fractionation/distillation column 514, among other fluids associated with the fractionation/distillation column 514 (for example, additives and/or other fluids routed or re-routed to the fractionation/distillation column 514).

Once the sample collection and analysis assembly 508 obtains the samples, the sample collection and analysis assembly 508 may analyze the samples to produce properties or spectra indicative of the properties of each collected sample. The sample collection and analysis assembly 508 may provide the properties and/or spectra to the fractionation/distillation controller 502. In another embodiment, sample collection and analysis may occur periodically, while application of collected data may occur continuously. In such an embodiment, the fractionation/distillation controller 502 may further include other machine learning models to predict properties and/or spectra associated with one or more fluids. The other machine learning models may determine and/or predict the properties of one or more fluids based on data associated with the parameters corresponding to a particular process and, in some embodiments, previous fluid properties. Such a model may include a neural network and/or another type of model, such as a supervised learning model, semi-supervised learning model, unsupervised learning model, an ensemble, or some combination thereof. Such machine learning models may also be referred to as a soft sensor or inferential model and may be configured to predict fluid properties when an analyzer is not present or when an analyzer has not provided analysis. In embodiments, such machine learning models may be linear or non-linear.

In an embodiment, the fractionation/distillation controller 502 may receive data from one or more upstream and/or downstream controllers. In a non-limiting example, the fractionation/distillation controller 502 may receive data from a FCC unit controller. The fractionation/distillation controller 502 may receive data relating to current parameters or settings of the upstream and/or downstream equipment controlled by the one or more upstream and/or downstream controllers. Further, the fractionation/distillation controller 502 may obtain data related to or indicative of temperature, pressure, flow rate, and/or another parameter associated with a fluid flowing into or out of the fractionation/distillation column 514. The fractionation/distillation controller 502 may obtain such data from one or more sensors 512, 516, 518, 520, 522, and 524 associated with the fractionation/distillation column 514 (for example, sensors positioned within the fractionation/distillation column 514 and/or external and proximate to the fractionation/distillation column 514). The fractionation/distillation controller 502 may then apply the data, properties, and/or spectra to the to one or more training machine learning models associated with one or more of a local enhancement module 504 and/or predictive controls module 506. Based on the output of the trained machine learning models, which may indicate parameter and/or feed adjustment of the fractionation/distillation column 514, the fractionation/distillation controller 502 may adjust the parameters and/or the feed via the local enhancement module 504 and, in some embodiments, an equipment and device control module. The equipment and device control module may comprise a PLC or DCS. In some embodiments, the equipment and device control module may comprise a DCS-PID module, controller, or circuitry.

In an embodiment, the distillation machine learning model may be trained to maximize and/or minimize select parameters based on the type of and/or use of the fractionation/distillation column 514. For example, such a model may utilize temperature and/or feed flow rate to maximize lift, while another model may maximize output of lighter fractions or distillates. Further, in an example, a model may predict parameters based on, in part, the concave objective function for profit to determine a feed and/or temperature input and other column settings that drive the distillation column to provide the optimal distribution of products in a column where the pressure is uncontrolled. The parameters for such an application of data to a trained machine learning model may include changing the energy and/or material to the column to change column pressure if all pressure control handles are exhausted. For example, the output from one of the trained machine learning models may indicate an increase in temperature and/or feed, among other column variables, to maximize the output of a selected one or more products from the fractionation/distillation column 514. Such a maximization of the output may optimize profit for the fractionation/distillation column 514. In addition, this same approach be used for a controller to determine the optimal distribution of products in a column where the pressure is controlled.

Such issues described above may also occur for a vacuum column when the vacuum tower overhead condenser cooling capacity is constrained (for example, due to cooling water limitations) or when a vacuum ejector system is limited and may no longer decrease pressure. The concave objective function of profit in this case can be used to determine what feed and temperature in the column and other vacuum column settings with uncontrolled pressure give the most profitable light vacuum gas oil (LVGO), middle vacuum gas oil (MVGO), heavy gas oil (HVGO) lift from resid. In addition, this same approach can be used to determine the vacuum column settings to generate most profitable LVGO, MVGO, HVGO, and Resid product distribution for a column in which column pressure is controlled and/or in which there is no overhead cooling capacity limitation.

In another example, the fractionation/distillation column 616 may comprise a vacuum column and/or crude unit. In such examples, one trained machine learning model may be trained or configured to utilize a resid viscosity, asphalt m-value, and/or other asphalt property as an input and/or, in other embodiments, sample analysis of the outputs and inputs of the vacuum column. Further, the trained machine learning model may utilize as an input, current valve settings, heater outlet temperature (for example, a vacuum heater outlet temperature), and/or vacuum operating parameters. The output of such a model may include updated settings or set points for the valve settings, heater outlet temperature (for example, a vacuum heater outlet temperature), and/or vacuum operating parameters. Such a trained machine learning model may minimize the amount of gas oil in resid, when the resid is being utilized to make asphalt. The fractionation/distillation controller 502 may utilize such an output to set equipment to parameters or settings output from the trained machine learning model.

Such problems may also occur in an atmospheric crude column, where the feed and temperature in the column with uncontrolled pressure may be determined with a neural network model and controller to give the economically optimum product distribution of naphtha, jet, diesel, and gas oil from a crude column feed. For an atmospheric column, several constraints may be considered, such as product quality, hydraulic constraints, operating limits, and column differential pressure limits. Alternatively, problems associated with operation of the atmospheric column may be formulated to manipulate other variables such as pump-around returns flow, pump-around return temperatures, and stripping steam that optimize the lift in the column when the column pressure is not being controlled. In addition, this same approach can be used to determine which atmospheric crude column settings give the economically optimum product distribution of naphtha, jet, diesel, and gas oil from a crude column when the crude column pressure is controlled.

In another embodiment, one machine learning model may be trained to optimize stripping steam input into the atmospheric crude column (or, in other embodiments, another type of column or crude column) in relation to product output. Increasing stripping steam may increase column pressure and lift, but may also decrease or reduce hydrocarbon partial pressure. Thus, in a cooling limited column, it is, typically, not clear whether stripping steam should be decreased or increased. As such, one of the machine learning models may output, based on data corresponding to a column (for example, current pressure, current temperature, input fluid analysis, and/or output product analysis, among other data points), an amount of stripping steam to utilize to maximize lift and/or column pressure while limiting increase in column pressure.

In other embodiments, such problems may occur in an atmospheric column, vacuum column, and/or other distillation column. A model and controller may be utilized to determine the economic optimum based on increasing column pump-arounds for improved fractionation and/or based on increasing feed rate to a column with a reduced feed inlet temperature (controlled via a furnace) or with a reduced feed rate at an increased feed inlet temperature. Such determinations may occur in conjunction with other temperature and/or pressure control, among other parameter settings.

In an embodiment, properties of feedstock utilized in a distillation operation may and/or other operations described herein may include boiling point, viscosity, content, API gravity, universal oil products (UOP) K factor, distillation points, Coker gas oil content, carbon residue content, nitrogen content, sulfur content, paraffins, olefins, thiophene content, single-ring aromatics content, or dual-ring aromatics content. In another embodiment, fluids, target products, material, and/or unit materials produced by a fractionation/distillation column 514 may include one or more of an amount of butane-free gasoline, an amount of total butane, an amount of dry gas, an amount of coke, an amount of gasoline, octane rating, an amount of light fuel oil, an amount of heavy fuel oil, an amount of hydrogen sulfide, an amount of sulfur in light fuel oil, or an aniline point of light fuel oil. In another embodiment, properties of the fluids, target products, material, and/or unit materials produced by the fractionation/distillation column 616 may include one or more of pentane content, raw crude water content, desalted crude water content, heavy atmospheric gas oil (HAGO) content, light atmospheric gas oil (LAGO) flash, or kerosene flash point. In yet another embodiment, the distillation controller 602 may control the pentane content, the raw crude water content, the desalted crude water content, the heavy atmospheric gas oil (HAGO) content, the light atmospheric gas oil (LAGO) flash, or the kerosene flash point, one or more of: crude blend, make-up water, desalter severity, HAGO wash rate, stripping, LAGO draw rate, stripping steam, or kerosene draw of the one or more of the first processing units.

In yet another embodiment, the properties of the fluids, target products, material, and/or unit materials produced by the fractionation/distillation and absorber column may include one or more of ethane content, propane content, propene content, isobutane content, or n-butane content. In such embodiments, the fractionation/distillation controller 502 may control one or more of the ethane content, the propane content, the propene content, the isobutane content, or the n-butane content, one or more of: absorber pressure, lean oil flow rate, lean oil temperature, high-pressure separator temperature, reactor conversion, or stripper reboiler duty.

In yet another embodiment, the properties of the fluids, target products, material, and/or unit materials produced by the fractionation/distillation column 514 may include one or more of high-pressure separator water content or stripper bottoms water content. In such embodiments, the fractionation/distillation controller 502 may control a temperature of a high-pressure separator.

In another embodiment, the fractionation/distillation column 514 may comprise a vacuum tower (in other words, a distillation tower operating under reduced pressure). In such embodiments, one of the trained machine learning models may infer or predict a micro-carbon residue (MCR) or HVGO MCR based on various parameters and/or feeds (such as, for example, wash rate, c-factor, bed distribution, lift drive-up entrainment, and/or feed properties, among others), enabling a controller (for example, the fractionation/distillation controller 502) to determine adjustments to a vacuum distillation operation based on the inferred or predicted MCR. In another embodiment, rather than or in addition to utilizing HVGO MCR, the trained machine learning models may infer or predict nickel and/or vanadium (and/or other metals) content in HVGO. In yet another embodiment, rather than or in addition to utilizing HVGO MCR, the trained machine learning models may infer or predict a distillation cut point, a gas oil lift from resid, and/or HVGO wash bed lifecycle for HVGO production and/or to prevent premature shutdown.

In another embodiment, the trained machine learning model may also optimize DeIsoPentanizer (DIP) fractionation, such an optimization increasing octane on, in some embodiments, an isomerization unit. Such a trained machine learning model may be utilized to optimize DIP feed limit based on various factors, such factors being applied to the trained machine learning model. Further, such factors may include amount of steam utilized, temperature from a reboiler, a reflux rate, feed properties, and/or output properties. The DIP optimization may also include the effect of processing the DIP products downstream, for example, in a gasoline desulfurization unit or penex unit, and the products value.

In another embodiment, the fractionation/distillation controller 502 (and/or, in embodiments, the local enhancement module 504 and/or predictive controls module 506) may include a trained machine learning model trained and/or configured to determine a salt point or dew point temperature for the fractionation/distillation column 514 (or, in some embodiments, a crude atmospheric distillation column). In such embodiments, the fractionation/distillation controller 502 may input fractionation/distillation column 514 set points, valve set points, overhead temperature, and/or overhead reflux, among other factors, to the model. The trained machine learning model may output updates to the set points for the fractionation/distillation column 514 and/or valves, as well as temperature and/or overhead reflux set points. Such a trained machine learning model may prevent salt deposition in overhead piping and/or other downstream mechanical equipment. These salt depositions may lead to a loss of containment, premature damage of equipment, and/or premature equipment or plant shutdown. Using a controller to run closer to a salt point limit or dew point limit, may upgrade naphtha to distillate and make atmospheric crude operation more profitable (via increased production or separation of lighter hydrocarbons).

In an embodiment, the fractionation/distillation column 514 may include a hydrocracker. In such embodiments, the fractionation/distillation controller 502 (also referred to as, in such an embodiment, a hydrocracker controller) may include a machine learning model trained or developed to optimize the distillate/gas oil separation that provides the most profitable unconverted gas oil feed to a fluid catalytic cracking (FCC) unit positioned downstream of the hydrocracker. In such an embodiment, the fractionation/distillation controller 502 may utilize data indicating and/or predicting the properties of unconverted hydrocracker gas oil from the hydrocracker using hydrocracker parameters (such as pressure, temperature, and/or other factors), and/or parameters associated with the downstream FCC unit. The fractionation/distillation controller 502 may apply the data to the machine learning model. This controller which uses the machine learning model may output one or more parameters for the hydrocracker to optimize the unconverted oil flow and composition that is transferred or sent to the FCC unit to give the most profitable yield from combined FCC and hydrocracker operation.

Figure 6:
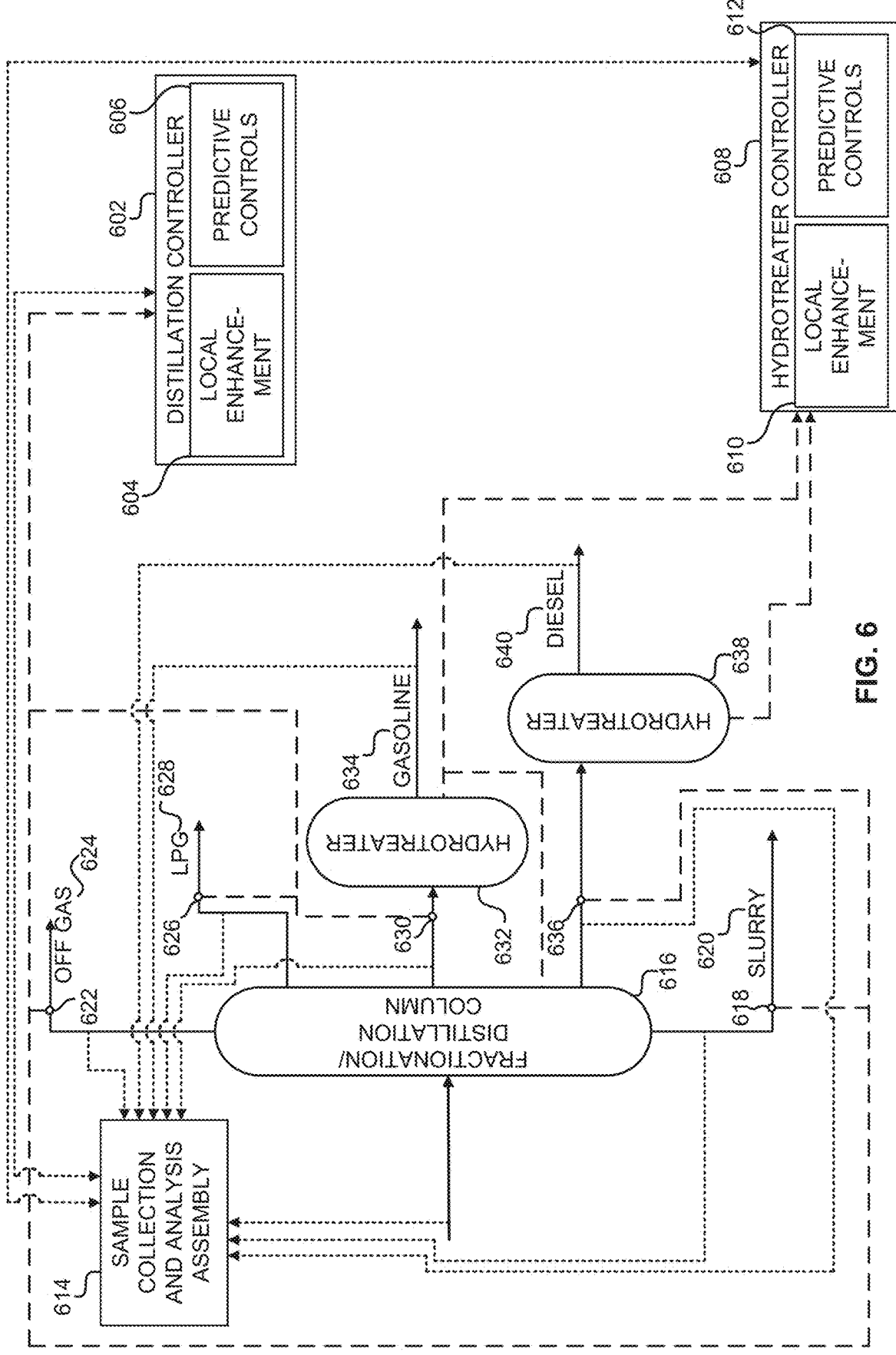
FIG. 6 is a schematic diagram of a distillation control system to enhance fluid separation and a hydrotreater control system to enhance fluid production at a portion of a refinery.

FIG. 6 is a schematic diagram of a distillation control system to enhance fluid separation and a hydrotreater control system to enhance fluid production at a portion of a refinery, according to an embodiment of the disclosure. As illustrated in FIG. 6, a distillation/fractionation portion of the refinery may include a distillation controller 602 and/or a hydrotreater controller 608. The distillation controller 602 may obtain data related to a fractionation/distillation column 616. For example, the distillation controller 602 may obtain temperature and/or pressure within the fractionation/distillation column 616. Further, the distillation controller 602 may initiate collection of samples of various fluids associated with the fractionation/distillation column 616 via the sample collection and analysis assembly 614. For example, the sample collection and analysis assembly 614 may obtain samples of off-gas 624, LPG 628, gasoline 634, diesel 640, naphtha, and/or slurry 620, among other fluids associated with the fractionation/distillation column 616.

Once the sample collection and analysis assembly 614 obtains the samples, the sample collection and analysis assembly 614 may analyze the samples to produce properties or spectra indicative of the properties of each collected sample. The sample collection and analysis assembly 614 may provide the properties and/or spectra to the distillation controller 602. The distillation controller 602 may then apply the data, properties, and/or spectra to the to one or more training machine learning models associated with one or more of a local enhancement module 604 and/or predictive controls module 606. Based on the output of the trained machine learning models, which may indicate parameter and/or feed adjustment of the fractionation/distillation column 616, the distillation controller 602 may adjust the parameters and/or the feed via the local enhancement module 604 and, in some embodiments, an equipment and device control module. The equipment and device control module may comprise a PLC or DCS. In some embodiments, the equipment and device control module may comprise a DCS-PID module, controller, or circuitry.

In an embodiment, the distillation machine learning model may be trained to optimize profit by operating the distillation column to provide the most profitable distribution of products. Such a model may utilize temperature and/or feed flow rate and other column settings to determine optimal distribution of products by maximizing a profit function. Further, such a model may predict parameters based on, in part, the concave objective function for profit to determine a feed and/or temperature input that drive the distillation column to include a maximum lift in a cooling limited column. The parameters for such an application of data to a trained machine learning model may include providing more energy and/or material to the column or increasing material or energy to increase pressure if all pressure control handles are exhausted. For example, the output from one of the trained machine learning models may indicate an increase in temperature and/or feed to maximize the output of a selected one or more products from the fractionation/distillation column 616. Such a maximization of the output may optimize profit for the fractionation/distillation column 616. In addition, such embodiments may be used to determine distillation column settings that provide the economically optimum product distribution of products in a column in which the pressure is controlled or in which no cooling limitation exists within the column.

In yet another embodiment, the properties of the fluids, target products, material, and/or unit materials produced by the fractionation/distillation column 616 may include one or more of high-pressure separator water content or stripper bottoms water content. In such embodiments, the distillation controller 602 may control a temperature of a high-pressure separator.

Figure 7:
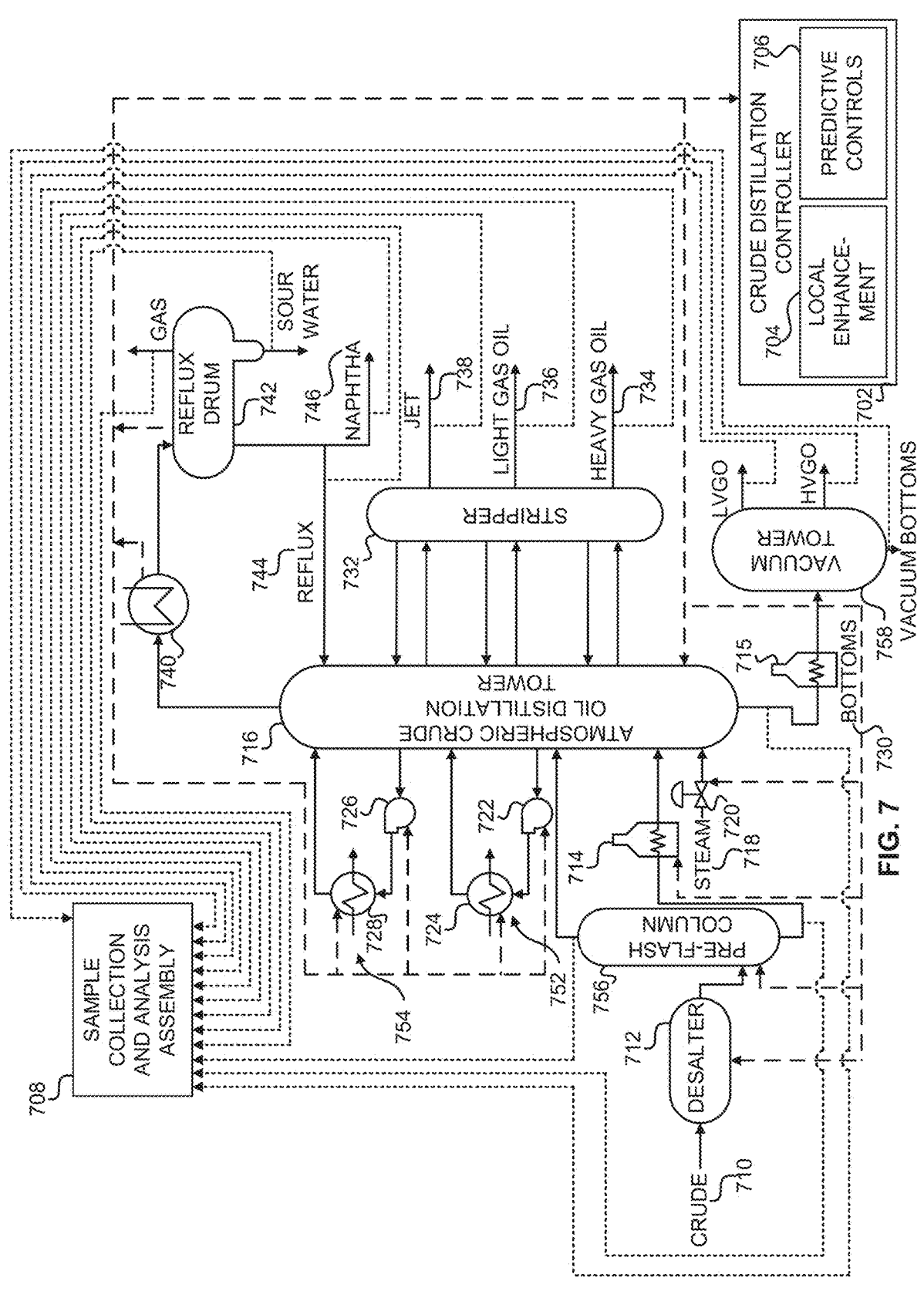
FIG. 7 is a schematic diagram of a crude distillation control system to enhance fluid separation at a portion of a refinery.

FIG. 7 is a schematic diagram of a crude distillation control system to enhance fluid separation at a portion of a refinery. In such embodiments, a crude distillation controller 702 may obtain data from one or more sources associated with a crude oil distillation tower 716. Such sources of data may include data associated with a desalter 712, data associated with a heater or pre-heater 714 of the crude 710, data associated with steam 718 injected into the crude oil distillation tower 716 (such as, for example, the temperature of the steam and/or an amount of steam as controlled via valve 720), data associated with the crude oil distillation tower 716 (for example, temperature and/or pressure within the crude oil distillation tower 716 and/or amount of fluid flowing into and/or out of the crude oil distillation tower 716), data associated with an amount and/or temperature of fluid flowing from the crude oil distillation tower 716 to one or more pump arounds 752, 754 (each pump around 752, 754 including, for example, a pump 722, 726 and heat exchanger 724, 728), data associated with a stripper 732 positioned downstream of the crude oil distillation tower 716, data associated with a reflux drum 742, and/or data from the sample collection and analysis assembly 708 related to the crude 710, reflux 744, naphtha 746, jet 738, light gas oil 736, heavy gas oil 734, and/or residue or bottoms 730. Such data may obtained during operation of the crude oil distillation tower 716. Such data may be obtained in real-time and/or based on one or more selected time intervals. For example, the sample collection and analysis assembly may collect and analyze one or more of the fluids associated with the crude oil distillation tower 716 at a selected time interval. In other embodiments, the data associated with equipment corresponding to the crude oil distillation tower 716 may be obtained continuously.

Once the crude distillation controller 702 obtains the data associated with the crude oil distillation tower 716 and/or the stripper 732, then the crude distillation controller 702 may apply such data to a machine learning model. In an embodiment, the crude distillation controller 702 may include a plurality of machine learning models, each trained to determine or predict selected parameters for the equipment associated with crude distillation. The machine learning model may be stored in the crude distillation controller 702, the local enhancement module 704, and/or the predictive controls module 706. Application of the data to the machine learning model may produce a updated operating parameters for the crude oil distillation tower 716 and/or associated components. For example, the machine learning model may be trained and/or configured to determine and/or predict a temperature and/or residence time for crude oil in the desalter 712 to remove salt in the crude with a minimal amount of energy utilized. In another embodiment, the machine learning model may be trained or configured to determine or predict parameters to increase lift within the crude oil distillation tower 716. In other embodiments, different machine learning models may be trained or configured to determine or predict other parameters in relation to some other aspect of crude oil distillation.

Figure 8:
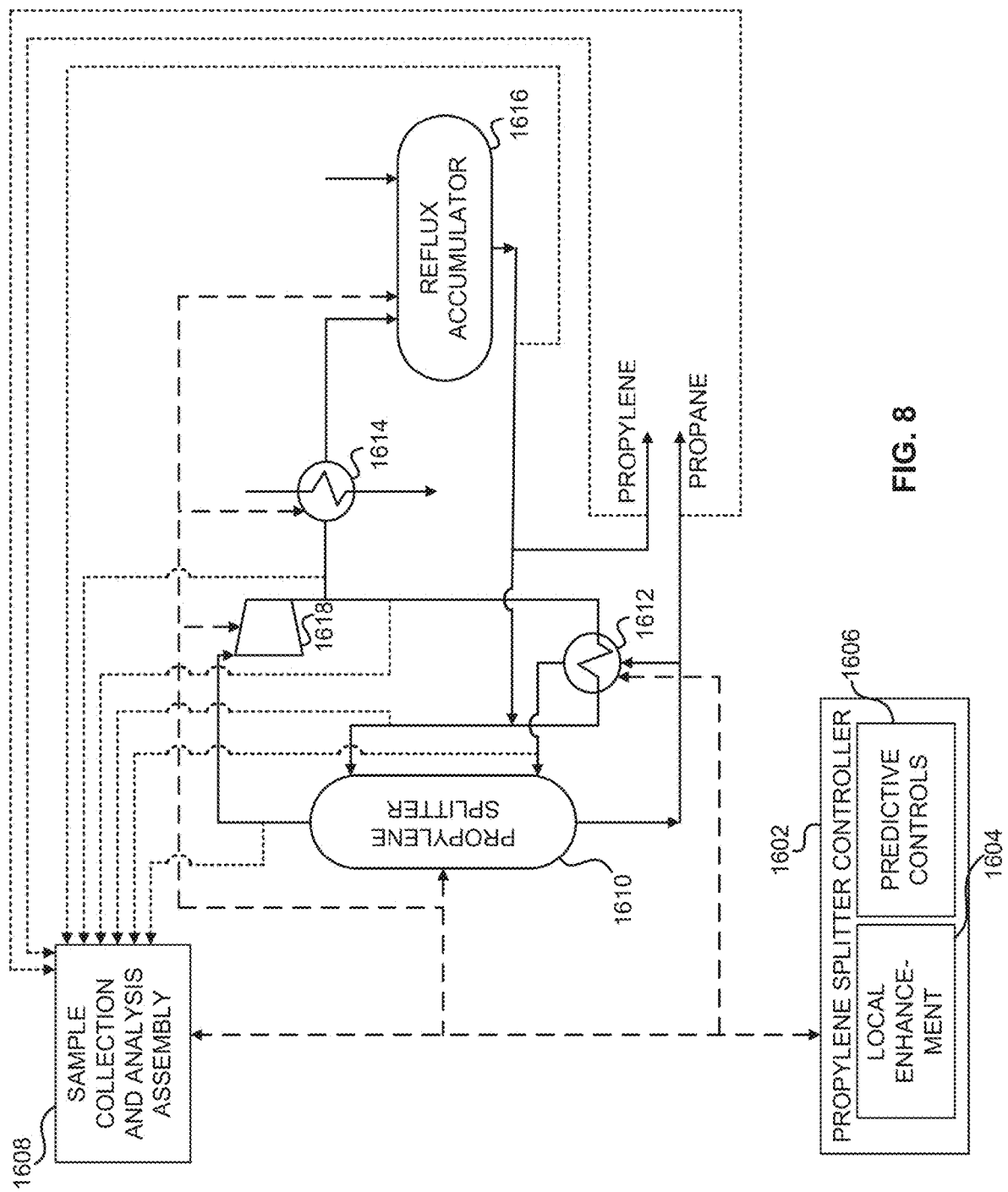
FIG. 8 is a schematic diagram of a propylene splitter control system to enhance fluid production at a portion of a refinery, according to an embodiment of the disclosure.

FIG. 8 is a schematic diagram of an enhanced propylene splitter control system to enhance fluid production at a portion of a refinery, according to an embodiment of the disclosure. A section of the refinery corresponding to propylene splitting may include a propylene splitter controller 1602. Similar to previously described controllers, the propylene splitter controller 1602 may obtain data associated with the equipment of the propylene splitter unit, such as from a splitter 1610, one or more heat exchangers 1612, 1614, a compressor 1618, and/or a reflux accumulator 1616. The propylene splitter controller 1602 may also initiate capture of samples of fluids associated with the propylene splitter unit. The sample collection and analysis assembly 1608 may then analyze the samples and produce properties and/or a spectra for each sample. The splitter controller 1602 may apply the data, properties, and/or spectra to one or more machine learning models of the local enhancement module 1604 and/or predictive controls module 1606 to produce an output indicative of adjustment to parameters and/or feed. The propylene splitter controller 1602 may then utilize the output to adjust various parameters and/or feed associated with the propylene splitter unit via the local enhancement module 1604.

For a propylene splitter operations, the propylene splitter controller 1602 may optimize the propylene splitter to achieve the highest purity product, thus maximizing the final product's value. Such a value may be based on the market value of the final purity of the propylene product. When splitter column differential pressure is limiting, more feed to a splitter tower may result in more propylene dropping out in a bottoms propane product. The propylene splitter controller 1602 may determine optimal feed to be processed in the splitter when it is DP limited so that total profit is maximized, Total profit function vs feed passes through a maximum optimal point. At least one machine learning model of a propylene splitter operation may maximize a feed rate versus product purity to achieve that value. Thus, in an embodiment, the model may be trained to maximize or be utilized for maximizing that point on a curve.

In an embodiment, the splitter may comprise a naphtha splitter. One trained machine learning model may be trained or configured to optimize operation of the naphtha splitter (such an optimization including adjustments to change the amount and/or purity of C7 and/or C6 produced and the impact of the C7 and/or C6 on downstream refinery equipment).

In another embodiment, the splitter may comprise a combined C4 splitter and butamer in an alkylation unit. In such embodiments, one trained machine learning model may be trained or configured to determine adjusted set points of components, devices, or refinery equipment in the splitter to minimize nC4 in an overhead IC4 stream, that IC4 in bottoms C4 is minimized, and that the overhead IC4 stream-flow meets demand associated with an alkylation unit.

Figure 9:
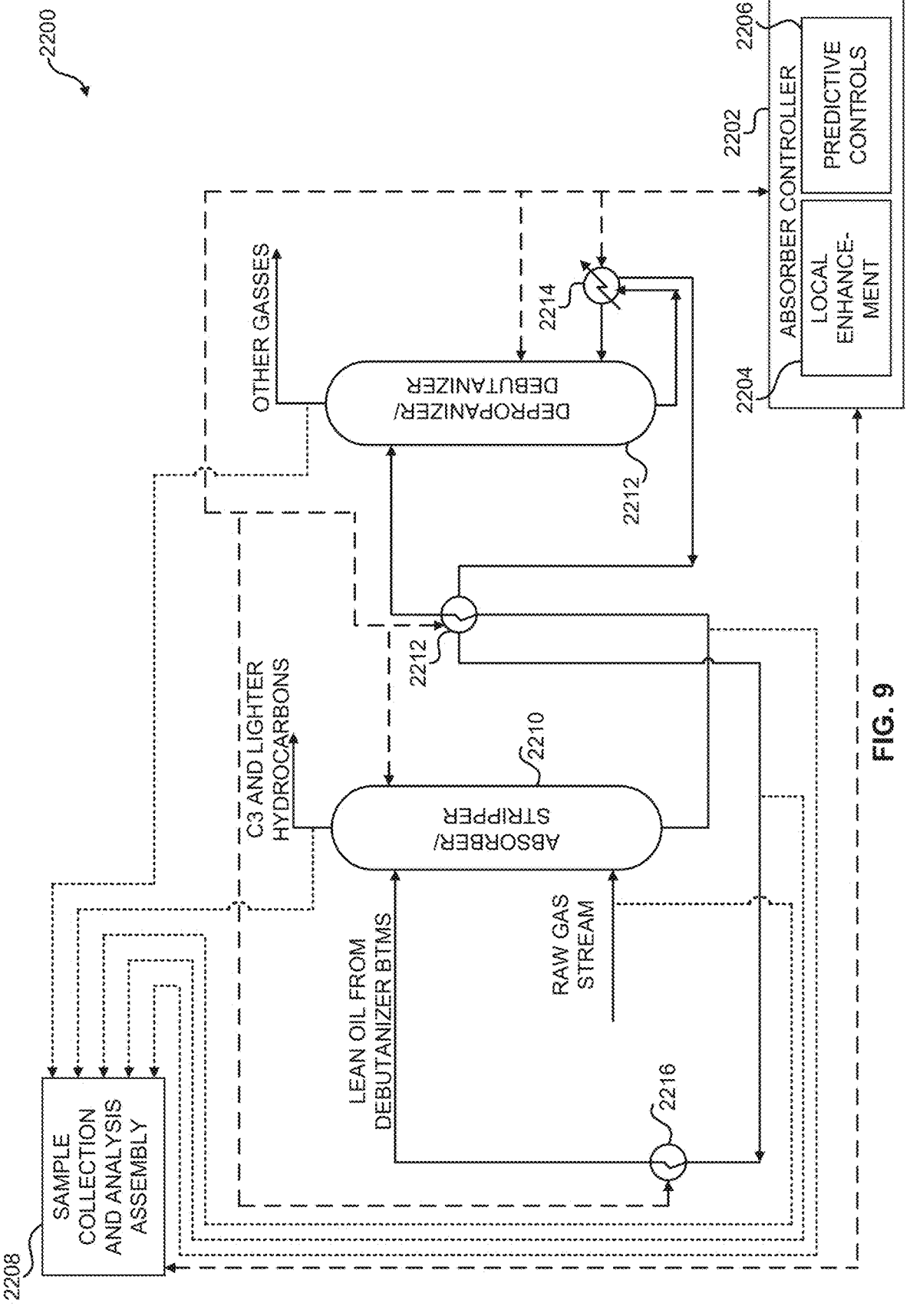
FIG. 9 is a schematic diagram of an absorber control system to enhance fluid production at a portion of a refinery, according to an embodiment of the disclosure.

FIG. 9 is a schematic diagram of an absorber control system to enhance fluid production at a portion of a refinery, according to an embodiment of the disclosure. A section of the refinery corresponding to an absorber operation may include an absorber controller 2202. Similar to previously described controllers, the absorber controller 2202 may obtain data associated with the refinery equipment of the absorber operation, such as from an absorber 2210, a regenerator 2212, and/or one or more heat exchangers 2214, 2216. The absorber controller 2202 may also initiate capture of samples of fluids associated with the absorber operation. The sample collection and analysis assembly 2208 may then analyze the samples and produce properties and/or a spectra for each sample. The absorber controller 2202 may apply the data, properties, and/or spectra to one or more machine learning models of the local enhancement module 2204 and/or predictive controls module 2206 to produce an output indicative of adjustment to parameters and/or feed. The absorber controller 2202 may then utilize the output to adjust various parameters and/or feed associated with the absorber operation via the local enhancement module 2204.

For an absorber operation, the absorber controller 2202 may optimize the absorber operation, by manipulating lean oil, as well as operating conditions or parameters, to achieve a minimal amount of heavy components in the overhead. Thus, in an embodiment, one of one or more trained machine learning models of the absorber controller 2202 may be trained to minimize heavy components via lean oil and/or other operating conditions or parameters associated with the absorber operation.

Figure 10:
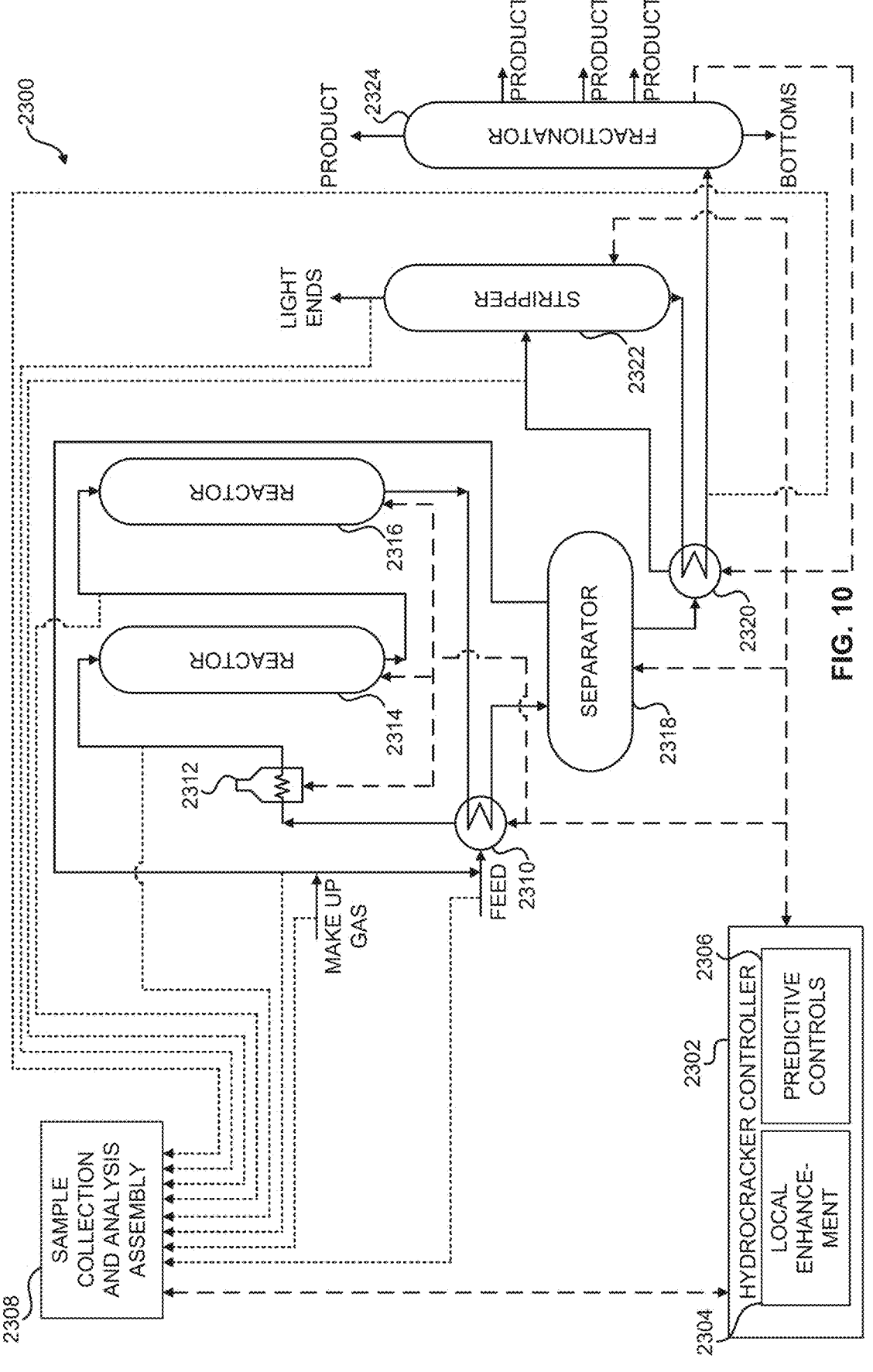
FIG. 10 is a schematic diagram of a hydrocracker control system to enhance fluid production at a portion of a refinery, according to an embodiment of the disclosure.

FIG. 10 is a schematic diagram of a hydrocracker control system to enhance fluid production at a portion of a refinery, according to an embodiment of the disclosure. As noted, specific sections or portions of a refinery may include a sub-controller to enhance that particular operation. As such, a hydrocracking operation may be enhanced via a hydrocracker controller 2302 and corresponding machine learning models (for example, hydrocracker specific machine learning models utilized in the local enhancement module 2304 and/or the predictive controls module 2306). The hydrocracker controller 2302 may connect to sources of and control various parts of the equipment, such as reactors 2314, 2316, heat exchangers 2310, 2320, a separator 2318, fractionator 2324, and/or a stripper 2322. Further, the hydrocracker controller 2302 may obtain data related to each input material or feed, as well as the temperature and/or pressure and other operating parameters within the equipment.

Prior to generating adjusted parameters for operation of the hydrocracker operation, the hydrocracker controller 2302 may initiate collection of samples of one or more of the materials or feeds utilized in the hydrocracking operations, via the sample collection and analysis assembly 2308. Once the sample collection and analysis assembly 2308 obtains one or more samples, the sample collection and analysis assembly 2308 may analyze those samples to produce properties and/or a spectra indicative of various properties. Once the properties and/or spectra are generated, the sample collection and analysis assembly 2308 may transmit the properties and/or spectra to the hydrocracker controller 2302. Upon reception of the properties and/or spectra, the hydrocracker controller 2302 may apply the properties and/or spectra and other data, along with target product content and/or properties, to a plurality of machine learning models within the predictive controls module 2306 (or, in other embodiments, a plurality of predictive controls modules may be included in the hydrocracker controller 2302 and each may include a machine learning model). The output of each of the machine learning models in the predictive controls module 2306 may then be utilized by the local enhancement module 2304 to determine (for example, as a vector) new parameters and/or feed blend or content to supply to the equipment utilized in the hydrocracking operation. In other embodiments, the output may indicate that a new or fresh catalyst should be utilized. The hydrocracker controller 2302 may then adjust the parameters of and/or feeds and/or materials for the equipment associated with the hydrocracking operation.

In an embodiment, a machine learning model may, when trained, determine adjustments to a hydrocracker fractionator operation conversion to give FCC feed composition that provides optimal FCC yield against FCC constraints.

In another embodiment, the hydrocracker controller 2302 may first cause sampling of various fluids used and/or produced in the hydrocracker operation. For example, as hydrocracking occurs (for example, as a continuous and/or ongoing operation) various fluids and/or materials may be utilized and/or produced therein. Prior to application of data to the any of the machine learning models described herein, the hydrocracker controller 2302 may initiate capture of one or more of those fluids via the sample collection and analysis assembly 2308. Once analyzed, the hydrocracker controller 2302 may predict properties of the corresponding fluids that may achieve an accurate output of a target product, as well as various parameters as described herein. In other words, the hydrocracker controller 2302 may determine contents of a fluid to be utilized. The fluids used may then be adjusted, blended, and/or supplemented to meet those contents determined by one or more of the machine learning models of the hydrocracker controller 2302. Stated another way, the hydrocracker controller 2302 may control the properties, content, and/or feed ratios associated with a feedstock or hydrocarbon feedstock and/or an Intermediate fluid or intermediate product.

In an embodiment, each controller illustrated in FIGS. 5-11B may utilize various data points and properties to predict parameters and fluids to reach a target product. Those controllers may each connect to a supervisory controller or refinery controller. In embodiments, the supervisory controller or refinery controller may utilize the output of each machine learning model of each of the controllers. In yet another embodiment, each of the controllers may utilize some output from the machine learning model of the supervisory controller or refinery controller. Further, each of the controllers and/or the supervisory controller may adjust a refining operation control device, and thus adjust a process, in real-time and/or continuously.

Figure 11A:
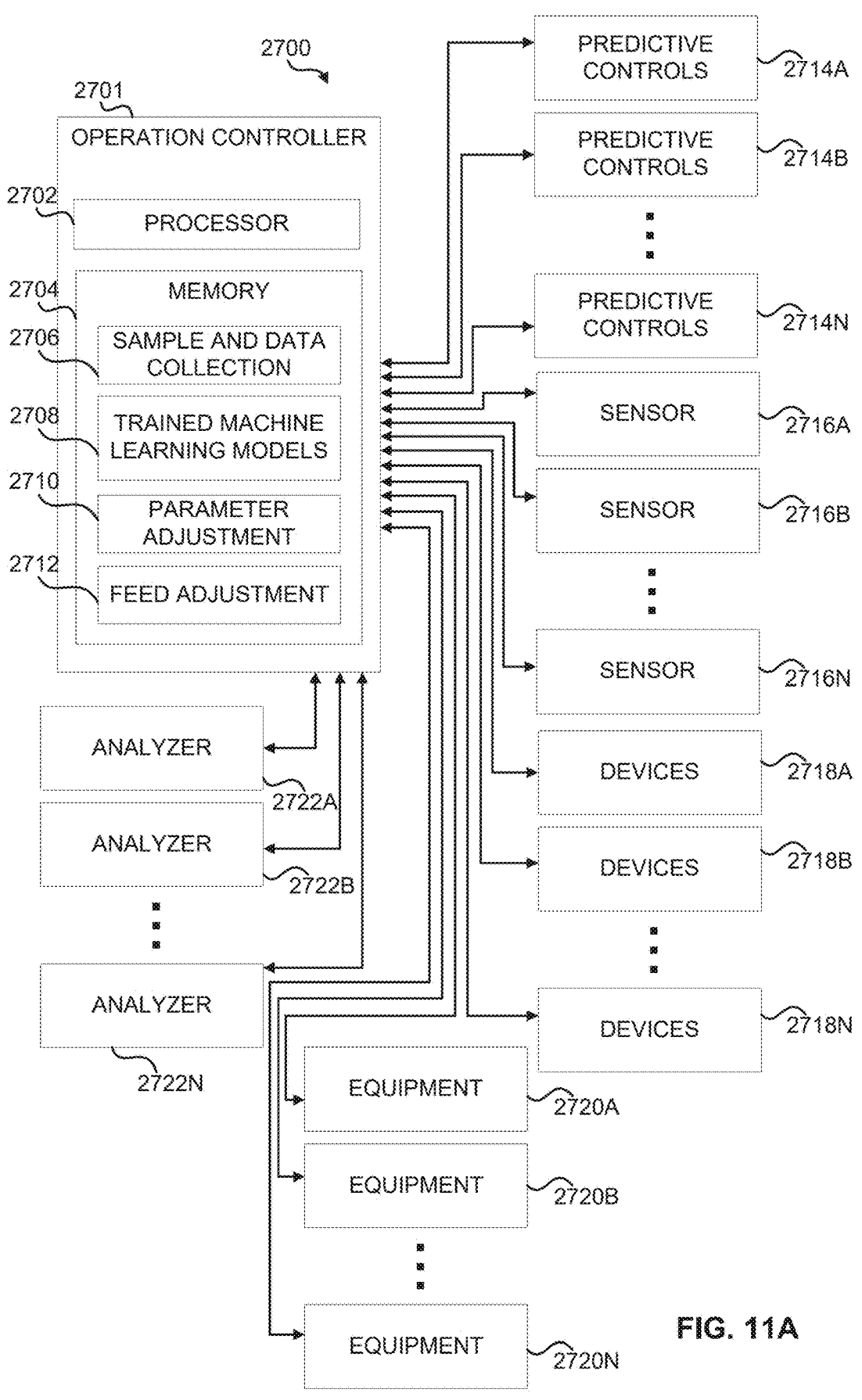
FIG. 11A and FIG. 11B are simplified diagrams of control systems to enhance fluid production at refinery, according to an embodiment of the disclosure.
Figure 11B:
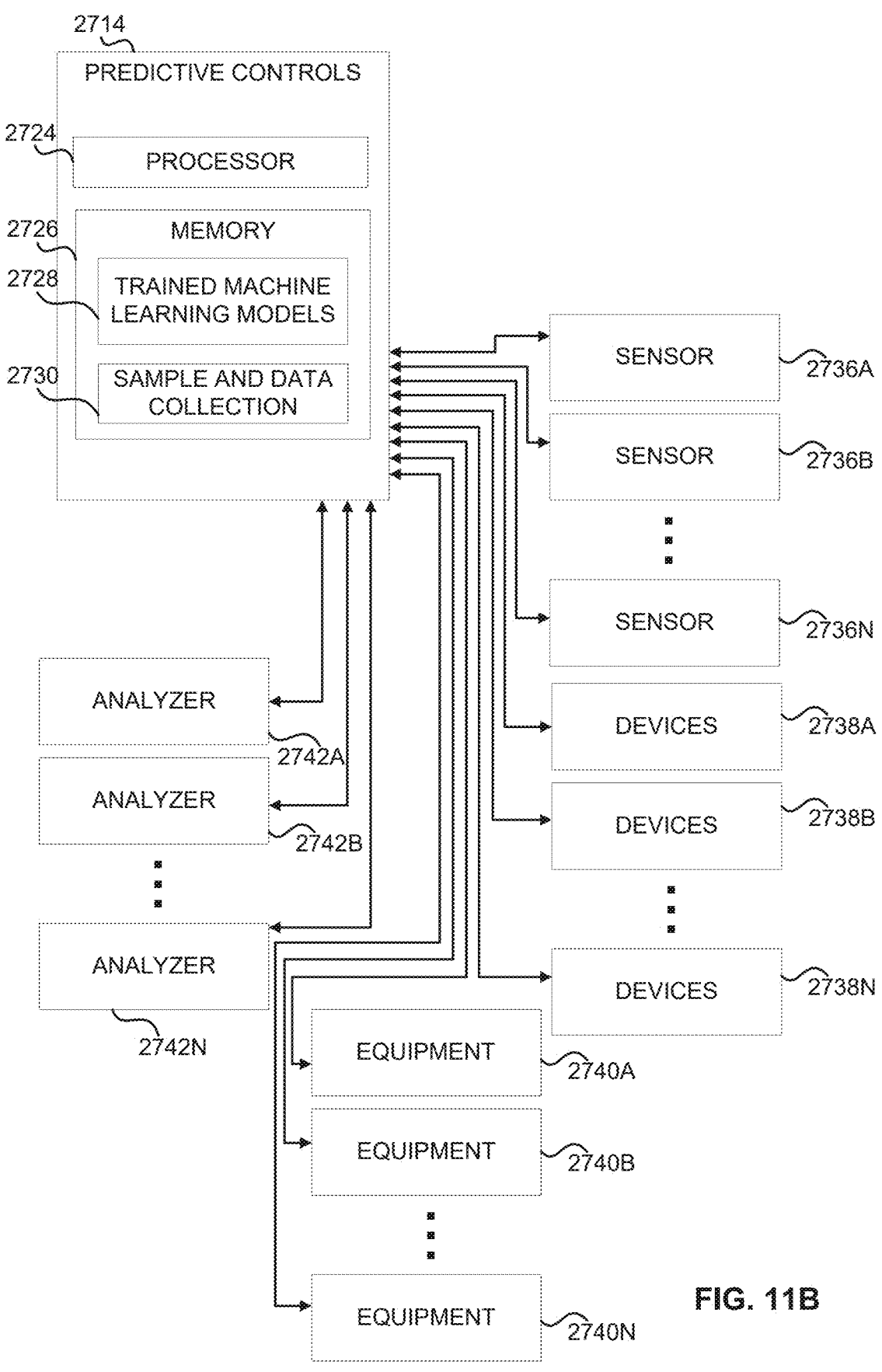

FIG. 11A and FIG. 11B are simplified diagrams of control systems to enhance to enhance fluid production at refinery, according to an embodiment of the disclosure. As noted, control system 2700 may include an operation controller 2701. Further, the operation controller 2701 may connect to one or more sensors 2716A, 2716B, and up to 2716N, one or more devices 2718A, 2718B, and up to 2718N (such as flow control devices and/or temperature control devices), one or more equipment 2720A, 2720B, and up to 2720N, one or more analyzers 2722A, 2722B, and up to 2722N, and one or more predictive controls 2714A, 2714B, and up to 2714N. The operation controller 2701 may include memory 2704 and one or more processors 2702. The memory 2704 may store instructions executable by one or more processors

2702. In an example, the memory 2704 may be a non-transitory machine-readable storage medium. As noted, the memory 2704 may store or include instructions executable by the processor 2702.

As used herein, "signal communication" refers to electric communication such as hardwiring two components together or wireless communication, as understood by those skilled in the art. For example, wireless communication may be Wi-Fi®, Bluetooth®, ZigBee, or other near-field communications. In addition, signal communication may include one or more intermediate controllers or relays disposed between elements in signal communication.

The memory 2704 may include or store sample and data collection and instructions 2706. Upon execution of such instructions, the operation controller 2701 may obtain samples associated with each equipment 2720A, 2720B, and up to 2720N. Further, the operation controller 2701 may obtain data from the one or more sensors 2716A, 2716B, and up to 2716N and/or one or more devices 2718A, 2718B, and up to 2718N. Upon collection of the samples, the operation controller 2701 may send the sample one of the one or more analyzers 2722A, 2722B, and up to 2722N. The one of the one or more analyzers 2722A, 2722B, and up to 2722N may then analyze the sample and generate properties and/or a spectra.

The operation controller 2701 may connect to and receive data from the one or more predictive controls 2714A, 2714B, and up to 2714N. In an embodiment, the operation controller 2701 may receive the output from each trained machine learning model of each the predictive controls 2714A, 2714B, and up to 2714N. In an embodiment, the output may comprise a vector or, in other embodiments, a value indicative of a parameter adjustment.

The memory 2704 may include or store trained machine learning models 2708. The trained machine learning models 2708 may include at least one trained machine learning model to generate an output indicative of parameter and/or feed adjustment. The operation controller 2701 may apply the data, properties, spectra, and/or the output of each trained machine learning model from one or more predictive controls 2714A, 2714B, and up to 2714N to the trained machine learning models 2708 to generate an output indicative of parameter adjustments and/or feed adjustment.

The memory 2704 may include or store parameter adjustment instructions 2710. Upon generation of the output, the operation controller 2701 may adjust parameters associated with equipment at the refinery. Further the memory 2704 may include or store feed adjustment instructions 2712 to adjust feed based on the output.

In FIG. 11B, predictive controls 2714 may connect to subsets of each of the components described in FIG. 11A. For example, the predictive controls 2714 may connect to a subset of the sensors 2736A, 2736B, and up to 2736N, a subset of the devices 2738A, 2738B, and up to 2738N, a subset of the equipment 2740A, 2740B, and up to 2740N, and/or a subset of the analyzers 2742A, 2742B, and up to 2742N. The predictive controls 2714 may include a trained machine learning model 2728 and instructions stored in a memory 2727 and executable by a processor 2724.

The instructions may include sample and data collection instructions 2730, which when executed cause the predictive controls 2714 to collect various data points and/or properties. Based on application of the data received to the trained machine learning model 2728 and, in some embodiments, an output from the operation controller 2701, the predictive controls 2714 may supply or provide the output to the operation controller 2701.

FIG. 12 is a flow chart illustrating enhanced fluid production at a refinery, according to an embodiment of the disclosure. Unless otherwise specified, the actions of method 2800 may be completed within operation controller 2701 and/or predictive controls 2714A-2714N of FIG. 11A. Specifically, method 2800 may be included in one or more programs, protocols, or instructions loaded into the memory 2704 of operation controller 2701 and executed on the processor or one or more processors of the operation controller 2701 of FIG. 11A. In other embodiments, method 2800 may be implemented in or included in components of FIGS. 1A-11B. The order in which the operations are described is not intended to be construed as a limitation, and any number of the described blocks may be combined in any order and/or in parallel to implement the methods.

At block 2802, the one or more predictive controls may each obtain data from corresponding sources. In such an example, each of the predictive controls may poll corresponding sensors, flow control devices, equipment, temperature control devices, and/or other data generating sources related to a corresponding refinery unit to obtain data therefrom. Further, the predictive controls may initiate sample collection for inputs or feedstock, as well as intermediaries and/or products produced by the corresponding source. Such a sample may be analyzed by one or more spectroscopic analyzers, which may subsequently produce properties and/or spectra of the samples.

At block 2804, once each sub-controller has obtained data, each sub-controller may apply that data, which may also include one or more different properties and/or spectra, to a corresponding machine leaning model stored therein. In another embodiment, the targeted product and/or targeted properties may be applied, in addition to the data described above, to the machine learning model of the predictive controls. The machine learning model may produce vectors, indicators, and/or other values indicative of one or more parameters that may cause the corresponding source to produce a targeted product. Each of the parameters output from the trained machine learning model may correspond to some aspect of the source. For example, the parameters may include temperature, amounts of other fluids used in the operation (for example, hydrogen or alkanes, among others), pressure, flow rate, residence time, feedstock used, and/or intermediaries used.

At block 2806, each of the predictive controls may determine whether the sub-parameters are different than currently set parameters. If the parameters are different, then, in some embodiments and at block 2808, each of the predictive controls may adjust one or more of the equipment, devices, or fluids. In such embodiments, the predictive controls may provide the adjustments to an equipment and device controller. In another embodiment, the predictive controls may provide the adjustments to the operation controller 2701 (FIG. 11A) to perform such adjustments. In another embodiment, rather than or in addition to adjusting the equipment or devices, the predictive controls may provide the trained machine learning model output to the operation controller 2701.

At block 2810, the operation controller 2701 (FIG. 11A) may determine updated parameters and/or fluid contents and/or ratios based on application of the obtained data, as well as the outputs from each of the predictive controls, to a trained machine learning model. The operation controller 2701, in some embodiments, may first obtain data from the all, substantially all, a portion of the refinery, or from a corresponding operation. Data, as noted above, may include data from sensors, meters, equipment, and/or other devices, as well as properties and/or spectra obtained from samples taken from each unit within the refinery. Further, the operation controller 2701 may obtain the output of each model of each predictive controls. Once the operation controller 2701 obtains all relevant data, the operation controller 2701 may determine the updated parameters based on application of that data to a machine learning model.

At block 2812, the operation controller 2701 (FIG. 11A) may determine whether the output of the model indicates updates to the parameters or whether the determined parameters are different than the current parameters. For example, the operation controller 2701 may compare the values of the updated parameters to the currently set parameters. If the parameters are different, then at block 2814, the operation controller 2701 may adjust the devices, equipment, or fluid within the refinery to the updated parameters.

In an embodiment, refinery operations may occur continuously or substantially continuously. As such, method 2800 may be an iterative and continuous process that occurs in real-time. As target products change and/or other aspects of the refinery change, parameters may continue to be adjusted via method 2800.

Figure 13:
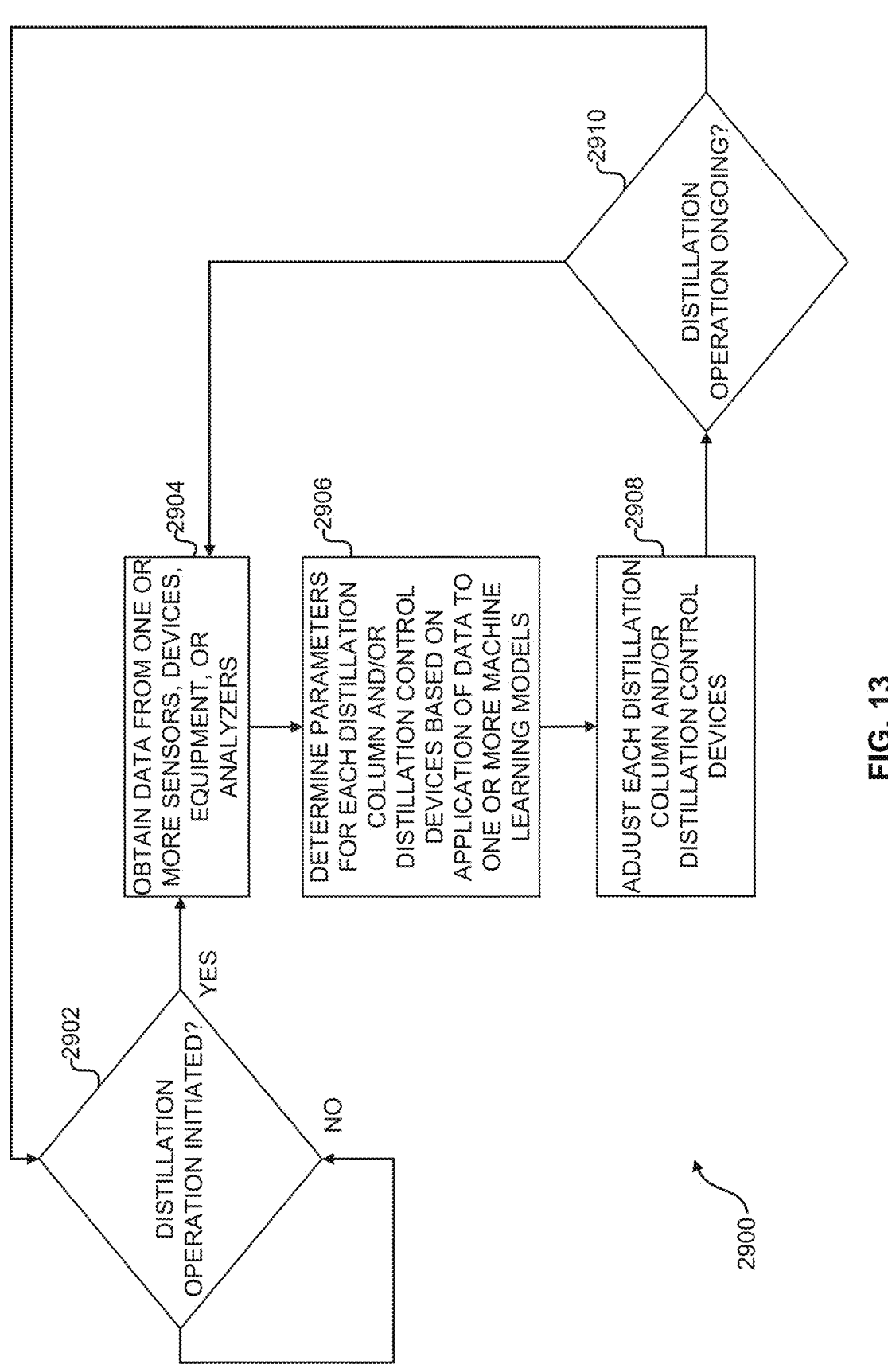
FIG. 13 is a flow chart illustrating enhanced fluid separation at a refinery, according to an embodiment of the disclosure.

FIG. 13 is a flow chart illustrating enhanced fluid production at a refinery, according to an embodiment of the disclosure. Unless otherwise specified, the actions of method 2900 may be completed within operation controller 2701 and/or predictive controls 2714. Specifically, method 2900 may be included in one or more programs, protocols, or instructions loaded into the memory 2704 of operation controller 2701 and executed on the processor or one or more processors of the operation controller 2701. In other embodiments, method 2900 may be implemented in or included in components of FIGS. 1A-11B. The order in which the operations are described is not intended to be construed as a limitation, and any number of the described blocks may be combined in any order and/or in parallel to implement the methods.

At block 2902, the operation controller 2701 may determine whether a distillation operation is initiated. In some embodiments, distillation may occur continuously. In such embodiments, the operation controller 2701 may determine whether an optimization or update operation is initiated (for example, an operation to gather data, apply that data to a machine learning model, and determine updated parameters for the distillation operation). In such embodiments, such an operation may execute periodically. In other embodiments, such operations may execute continuously.

At block 2904, the operation controller 2701 may obtain data from one or more sensors, equipment, and/or analyzers associated with a distillation operation. The analyzers may obtain samples of one or more fluids associated with the distillation operation. In other embodiments, the properties of any fluid that is not analyzed may be predicted via one of a plurality of machine learning models and/or a first principles model.

At block 2906, the operation controller 2701 may determine updated parameters for the equipment associated with the distillation operation based on application of the data to a machine learning model. Such equipment may include distillation control devices. The distillation control devices may include pumps, valves, temperature control devices, other flow control devices, and/or various other equipment (for example, such as, a distillation column and/or other refining equipment, as will be understood by one skilled in the art). The application of the data to the machine learning model or models may produce one or more updated parameters for each distillation control device. Each machine learning model may be configured to determine the updated parameters based on one or more factors, including, but not limited to, increased lift, salt content, power or energy usage, fluid or other material availability.

At block 2908, once the updated parameters are available, the operation controller 2701 may update the settings for each equipment or distillation control device. In an example, the operation controller 2701 may utilize a distributed control system and/or one or more PLCs to drive each equipment or component to operate at the updated corresponding parameters.

At block 2910, the operation controller 2701 may determine whether the distillation operation is ongoing. In another embodiment, the operation controller 2701 may determine whether a optimization or update operation. If either operation is ongoing, the operation controller 2701 may iteratively execute method 2900, continuously or periodically.

This application claims priority to, and the benefit of U.S. Provisional Application No. 63/660,196, filed Jun. 14, 2024, titled "SYSTEMS, ANALYZERS, CONTROLLERS, AND ASSOCIATED METHODS TO ENHANCE FLUID PRODUCTION OF REFINING OPERATIONS," U.S. Provisional Application No. 63/658,825, filed Jun. 11, 2024, titled "SYSTEMS, ANALYZERS, CONTROLLERS, AND ASSOCIATED METHODS TO ENHANCE FLUID PRODUCTION OF REFINING OPERATIONS," and U.S. Provisional Application No. 63/655,589, filed Jun. 3, 2024, titled "SYSTEMS, ANALYZERS, CONTROLLERS, AND ASSOCIATED METHODS TO ENHANCE FLUID PRODUCTION OF REFINING OPERATIONS," the disclosures of which are incorporated herein by reference in their entireties.

In the drawings and specification, several embodiments of systems and methods to provide in-line mixing of hydrocarbon liquids have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

What is claimed is:

1. A method for a distillation operation, the method comprising:
a) obtaining data for a distillation operation from one or more of (a) a sensor disposed to measure a parameter of a device of the distillation operation or (b) an analyzer configured to analyze fluid output via the distillation operation;
b) transmitting the data to an operation controller, wherein the operation controller includes:
  a local enhancement circuitry comprising a trained machine learning model and a target property of a target product of the distillation operation, and
  device controls configured to adjust the parameter of the device of the distillation operation;
c) generating an adjustment to the parameter of the distillation operation by applying the trained machine learning model of the local enhancement circuitry to the data and the target property of the target product of the distillation operation, wherein the machine learning model of the local enhancement circuitry is trained on historical data of the distillation operation, wherein the historical data further includes data indicative of properties of products of the distillation operation;
d) comparing the adjustment to the parameter of the distillation operation to a current parameter of the distillation operation to generate a new parameter;
e) using the device controls to drive the current parameter of the device of the distillation operation toward the new parameter; and
repeating the steps (a)-(e) to dynamically control distillation operation to improve process control in achieving the target property of the target product of the distillation operation.

2. The method of claim 1, wherein the data includes one or more of (a) feedstock data indicative of a feedstock or properties of the feedstock of the distillation operation, (b) product data indicative of a product or properties of the product of the distillation operation, or analysis of inputs and outputs of the distillation operation.

3. The method of claim 1, wherein the trained machine learning model of the operation controller comprises a neural network, wherein training of the machine learning model of the operation controller further comprises:
  obtaining the historical data corresponding to the distillation operation,
  normalizing the historical data,
  removing data corresponding to abnormal operations from the historical data,
  training the machine learning model with a selected percentage of the historical data,
  testing the trained machine learning model with a remaining percentage of historical data, and
  wherein the historical data comprises feedstock data indicative of a feedstock or properties of the feedstock, product data indicative of a product or properties of the product, and parameters of the distillation operation associated with the feedstock data and the product data.

4. The method of claim 1, wherein the one or more analyzers provide a spectra indicative of properties of the fluid output, the one or more analyzers being calibrated to generate standardized spectral data.

5. The method of claim 4, wherein the one or more analyzers comprises one or more of a spectrographic analyzer or a chromatographic analyzer.

6. The method of claim 1, further comprising:
  obtaining feedstock data from one or more feedstock sensors, feedstock analyzers, or samples of the feedstock, wherein the feedstock data is indicative of a feedstock being fed into the distillation operation;
  predicting properties of the feedstock by applying a machine learning model of a predictive control module of the operation controller to the feedstock data, wherein the predicted properties of feed comprises one or more of an API gravity, UOP K factor, distillation points, Coker gas oil content, carbon residue content, nitrogen content, sulfur content, saturates content, thiophene content, single-ring aromatics content, or dual-ring aromatics content, wherein the adjustment to the parameter of the distillation operation to achieve the target property of the target product is further based on the predicted properties of the feed and the feed data.

7. The method of claim 1, further comprising:
f) generating an updated adjustment to the new parameter of the distillation operation by applying the machine learning model of the operation controller to current data and the new parameter of the distillation operation to achieve the target property of the target product;

g) comparing the updated adjustment to the new param-
eter of the distillation operation to a current parameter
of the distillation operation to generate a new updated
parameter; and h) using the device controls to drive the current parameter
of the distillation operation toward the new updated
parameter, wherein repeating the steps (a)-(e) includes
repeating the steps (f)-(h).

8. The method of claim 1, wherein the new parameter is
generated if the comparison is different.

9. The method of claim 1, wherein the distillation opera-
tion includes a first sub-controller configured to control a
first suboperation of the distillation operation, the first
sub-controller includes:

a local enhancement circuitry comprising a trained
machine learning model and a target set point, and
device controls configured to adjust the parameter of
the distillation operation;

the method further comprising:

generating an adjustment to a subset parameter of a first
sub-operation of the distillation operation by applying
the trained machine learning model of the local
enhancement circuitry of the first sub-controller to the
data to achieve the target set point, wherein the
machine learning model of the local enhancement
circuitry of the first sub-controller is trained on histori-
cal data of the first sub-operation of the distillation
operation;

comparing the adjustment to the subset parameter of the
first sub-operation to a current subset parameter of the
first sub-operation to generate a new subset parameter;
and driving the first sub-operation of the distillation operation
toward the new subset parameter of the first sub-
operation of the distillation operation.

10. The method of claim 9, further comprising:

obtaining updated data for the distillation operation from
the one or more of (a) the sensor or (b) the analyzer;

generating a change to the target set point of the first
sub-controller by applying the machine learning model
of the operation controller to the updated data.

11. The method of claim 1, further comprising:

receiving the target property of the target product from a
downstream refinery process, wherein the downstream
refinery process receives the target product from the
distillation operation as a feedstock to the downstream
refinery process, wherein the downstream refinery pro-
cess is an alkylation process, a hydrotreating operation,
a fluid catalytic cracking operation, a hydrocracker
operation, a gasoline desulfurization unit, an isomer-
ization operation, a reforming operation, a blending
operation, or another distillation operation.

12. A system for a distillation operation including an
operation controller configured to perform the method of
claim 1, the system comprising:

one or more distillation columns to receive a feed and
separate the feed into a plurality of products;

a plurality of sensors to measure a parameter associated
with the one or more distillation columns and each
positioned at one of (a) proximate the one or more
distillation columns or (b) within the one or more
distillation columns, wherein the sensor is one of the
plurality of sensors;

a plurality of operation control devices each configured to
control a parameter of the one or more distillation
columns, wherein the device of the distillation opera-
tion is one of the plurality of operation control devices;

one or more sample collection assemblies to collect
samples of one or more of (a) the feed, or (b) one or
more of the plurality of products;

one or more sample analysis assemblies to analyze each
collected sample to provide properties of collected
samples; and the operation controller in signal communication with the
one or more distillation columns, the plurality of sen-
sors, the plurality of operation control devices, and the
one or more sample analysis assemblies.

13. The system of claim 12, wherein one of the one or
more distillation columns comprises one or more of an
absorber or a stripper each configured to separate feed into
$C3$ and lighter hydrocarbons, heavier hydrocarbons, and
bottoms.

14. The system of claim 13, wherein another one of the
one or more distillation columns comprises a depropanizer
or a debutanizer positioned downstream of the absorber or
the stripper.

15. The system of claim 14, wherein the trained machine
learning model generates predicted properties of the one or
more of (a) the feed, (b) one or more of the plurality of
products, (c) a parameter setting of one of the plurality of
operation control devices, or (d) a parameter setting of one
of the one or more distillation columns based on one or more
of an amount of heavier hydrocarbons included in the $C3$
and lighter hydrocarbons or an amount of energy utilized by
the absorber or the stripper.

16. The system of claim 12, wherein the one or more
distillation columns comprises a propylene splitter config-
ured to separate Refinery Grade Propylene (RGP) into
Polymer Grade Propylene (PGP) and other products.

17. The system of claim 16, wherein the trained machine
learning model generates predicted properties of the one or
more of (a) the feed, (b) one or more of the plurality of
products, (c) a parameter setting of one of the plurality of
operation control devices, or (d) a parameter setting of one
of the one or more distillation columns based on one or more
of a selected amount and properties of PGP and RGP or an
amount of energy utilized by the one or more distillation
columns.

18. The system of claim 12, wherein the one or more
distillation columns comprises a crude distillation tower
configured to separate crude oil into a plurality of fractions;
and wherein the trained machine learning model generates
predicted properties of the one or more of (a) the feed, (b)
one or more of the plurality of products, (c) a parameter
setting of one of the plurality of operation control devices,
or (d) a parameter setting of one of the one or more
distillation columns based on one or more of an amount of
PGP and RGP or an amount of energy utilized by the one or
more distillation columns.

19. The system of claim 12, wherein the feed comprises
one or more of a hydrocarbon-based fluid or renewable
feedstock; wherein the plurality of products separated from
the feed by the distillation operation comprises one or more
of a transportation fuel, a fluid component for the transpor-
tation fuel, or transportation fuel by-products; and wherein
the transportation fuel comprises one or more of gasoline,
diesel, low sulfur diesel, ultra-low sulfur diesel, jet, renew-
able diesel, bio-diesel, renewable jet, or renewable gasoline.

20. The system of claim 12, wherein one or more of the
sample analysis assemblies comprises one or more of a
spectrographic analyzer or a chromatographic analyzer;
and wherein the sample analysis assembly comprises one
of an on-line analyzer or a lab-based analyzer.

21. The system of claim 12, wherein the plurality of operation control devices comprises one or more of a steam source, a furnace, a heat exchanger, a condenser, a boiler, a reboiler, an induction coil, fans, a cooling device, a pump, a valve, a compressor, or a let-down station.

22. A distillation unit control assembly to enhance control of a distillation operation associated with a petroleum refining operation, the distillation unit control assembly including an operation controller configured to perform the method of claim 1, the distillation unit control assembly comprising:
  (a) a first analyzer positioned to:
    (i) receive a hydrocarbon feedstock sample of a hydrocarbon feedstock supplied to one or more distillation columns associated with the petroleum refining operation; and
    (ii) analyze the hydrocarbon feedstock sample to provide hydrocarbon feedstock sample properties;
  (b) the operations controller in communication with the first analyzer, a plurality of sensors to measure a parameter associated with the one or more distillation columns, wherein the sensor is one of the plurality of sensors, and a plurality of operation control devices each configured to control a parameter of the one or more distillation columns.

23. The distillation unit control assembly of claim 22, further comprising:
  a second analyzer positioned to:
  (i) receive a unit material sample of one or more unit materials, and
  (ii) analyze the unit material sample to provide unit material sample properties; and
  wherein the operations controller is further configured to:
  predict one or more unit material sample properties associated with a unit material sample comprising one or more fluids separated from the hydrocarbon feedstock based on the unit material sample properties and application of the unit material sample properties to a second trained machine learning model.

24. The distillation unit control assembly of claim 23, wherein the operations controller is further configured to control, during the distillation operation, based on the one or more unit material sample properties, the one or more of:
  (aa) the one or more hydrocarbon feedstock parameters associated with the hydrocarbon feedstock supplied to the one or more distillation columns;
  (bb) the one or more hydrocarbon feedstock properties associated with the hydrocarbon feedstock supplied to the one or more distillation columns;
  (cc) the one or more unit properties associated with the fluids separated from the hydrocarbon feedstock by the one or more distillation columns;
  (dd) the operation of the one or more distillation columns; or
  (ee) the operation of one or more processing units positioned downstream or upstream of the one or more distillation columns.

25. The distillation unit control assembly of claim 24, wherein one or more of:

(a) analysis of the hydrocarbon feedstock sample is performed on-line and in real-time;
  (b) analysis of the hydrocarbon feedstock sample is performed off-line in a laboratory setting;
  (c) analysis of the unit material sample is performed on-line and in real-time; or
  (d) analysis of e the unit material sample is performed off-line in a laboratory setting.

26. The distillation unit control assembly of claim 22, wherein the operations controller is configured to control one or more parameters of the distillation operation, the one or more parameters comprising one or more of:
  (a) a flow rate of the hydrocarbon feedstock supplied to the one or more distillation columns;
  (b) a pressure of the hydrocarbon feedstock supplied to the one or more distillation columns; or
  (c) a preheating temperature of the hydrocarbon feedstock supplied to the one or more distillation columns.

27. The operation controller configured to perform the method of claim 12, the operation controller comprising:
  a first plurality of inputs each in signal communication with one of a plurality of sensors to measure a set of first parameters associated with aspects of the distillation operation;
  a second plurality of inputs each in signal communication with one or more analyzers to analyze and provide properties of samples of fluids input to and output from each of one or more distillation columns; and
  a first plurality of inputs/outputs each in signal communication with the one or more distillation columns and a plurality of distillation control devices.

28. The operation controller of claim 27, wherein the operation controller is further configured to:
  determine an adjusted one or more inputs or operating parameters based on application of data received from the plurality of sensors, the one or more analyzers, the one or more distillation columns, and the plurality of distillation control devices, and
  adjust a type and amount of fluid input into the one or more distillation columns and distillation control device parameters based on the adjusted one or more inputs or operating parameters, the controller further comprising:
  a second plurality of inputs/outputs each in signal communication with one of a plurality of other controllers each configured to control one of (a) a plurality of refining sub-operations or (b) a refining operation.

29. The operation controller of claim 28, wherein determination of the adjusted one or more inputs or operating parameters are further based on data received from each of the plurality of other controllers via the second plurality of inputs/outputs.

30. The method of claim 3, wherein the trained machine learning model comprises one or more of a machine learning model trained based on application of historical data to one or more non-linear functions or linear functions or an ensemble machine learning model.

* * * * *